US009220066B2

(12) United States Patent
Gerber et al.

(10) Patent No.: US 9,220,066 B2
(45) Date of Patent: Dec. 22, 2015

(54) BUNDLING DATA TRANSFERS AND EMPLOYING TAIL OPTIMIZATION PROTOCOL TO MANAGE CELLULAR RADIO RESOURCE UTILIZATION

(75) Inventors: Alexandre Gerber, Madison, NJ (US);
Zhuoqing Mao, Ann Arbor, MI (US);
Feng Qian, Bloomington, IN (US);
Subhabrata Sen, Westfield, NJ (US);
Oliver Spatscheck, Randolph, NJ (US);
Zhaoguang Wang, San Jose, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 753 days.

(21) Appl. No.: 13/164,112

(22) Filed: Jun. 20, 2011

(65) Prior Publication Data
US 2012/0324041 A1 Dec. 20, 2012

(51) Int. Cl.
*G06F 15/173* (2006.01)
*H04W 52/02* (2009.01)
*H04L 29/08* (2006.01)
*H04W 4/12* (2009.01)

(52) U.S. Cl.
CPC ........... *H04W 52/0251* (2013.01); *H04L 67/26* (2013.01); *H04W 4/12* (2013.01); *Y02B 60/46* (2013.01); *Y02B 60/50* (2013.01)

(58) Field of Classification Search
CPC .............. H04L 29/06; H04L 29/08072; H04L 29/0809
USPC ................................................ 709/217, 224
See application file for complete search history.

(56) References Cited

U.S. PATENT DOCUMENTS

| 5,678,036 | A | 10/1997 | Lin et al. |
|---|---|---|---|
| 5,764,641 | A | 6/1998 | Lin |
| 6,201,966 | B1 | 3/2001 | Rinne et al. |
| 6,438,573 | B1 | 8/2002 | Nilsen |
| 6,507,731 | B1 | 1/2003 | Hasegawa |
| 6,519,266 | B1 | 2/2003 | Manning et al. |

(Continued)

OTHER PUBLICATIONS

Sharma. Simplicity of LTE and its differences with UMTS RRC, posted online on Aug. 6, 2009. http://3g4g.blogspot.com/2009/08/simplicity-of-lte-and-its-differences.html, 2 pages.

(Continued)

*Primary Examiner* — Philip Chea
*Assistant Examiner* — Van Kim T Nguyen
(74) *Attorney, Agent, or Firm* — Amin, Turocy & Watson, LLP

(57) ABSTRACT

Techniques for increasing power and resource efficiency of a mobile device are presented herein. In the mobile device, with regard to periodic or one-time data transfers, a communication management component can analyze information comprising data transfer parameter information, including jitter information, associated with each application of a subset of applications used by the device and can desirably schedule and/or bundle data transfers associated with the applications to reduce the number of separate data bursts to transfer that data to thereby reduce use of wireless resources and power consumption by the device. A push notification system can receive respective jitter information associated with each application from the mobile device, and the push notification system can desirably schedule and/or bundle push notifications to reduce the number of separate data bursts sent to the device to reduce use of wireless resources and power consumption by the device.

27 Claims, 22 Drawing Sheets

(56) References Cited

U.S. PATENT DOCUMENTS

| | | | |
|---|---|---|---|
| 6,553,031 B1 | 4/2003 | Nakamura et al. | |
| 6,584,331 B2 | 6/2003 | Ranta | |
| 6,978,143 B1 | 12/2005 | Vlalen | |
| 6,999,432 B2 | 2/2006 | Zhang et al. | |
| 7,058,826 B2 | 6/2006 | Fung | |
| 7,089,380 B1 | 8/2006 | Schober | |
| 7,181,667 B2 | 2/2007 | Argyropoulos et al. | |
| 7,206,286 B2 | 4/2007 | Abraham et al. | |
| 7,209,462 B2 | 4/2007 | Sayeedi | |
| 7,215,666 B1 * | 5/2007 | Beshai et al. | 370/380 |
| 7,295,119 B2 | 11/2007 | Rappaport et al. | |
| 7,317,732 B2 | 1/2008 | Mills et al. | |
| 7,349,371 B2 | 3/2008 | Schein et al. | |
| 7,349,433 B2 | 3/2008 | Ho | |
| 7,620,054 B2 | 11/2009 | Katayama | |
| 7,630,346 B2 | 12/2009 | Schein et al. | |
| 7,634,542 B1 | 12/2009 | Krause et al. | |
| 7,801,525 B2 | 9/2010 | Benco et al. | |
| 7,818,786 B2 | 10/2010 | Yoon et al. | |
| 7,855,951 B2 | 12/2010 | Kim et al. | |
| 7,860,063 B2 | 12/2010 | Low et al. | |
| 7,860,065 B2 | 12/2010 | Oishi et al. | |
| 7,864,794 B2 | 1/2011 | Diab et al. | |
| 7,912,455 B2 | 3/2011 | Adams et al. | |
| 7,934,658 B1 | 5/2011 | Bhatti et al. | |
| 8,054,791 B2 | 11/2011 | Vujcic | |
| 8,060,606 B2 | 11/2011 | Friedman et al. | |
| 8,073,908 B2 | 12/2011 | Heins et al. | |
| 8,089,925 B1 | 1/2012 | Uhlik et al. | |
| 8,155,022 B1 | 4/2012 | Ainsworth | |
| 8,180,550 B2 | 5/2012 | Oshima et al. | |
| 8,199,770 B2 | 6/2012 | Diab et al. | |
| 8,244,443 B2 | 8/2012 | Oshima et al. | |
| 8,281,060 B2 | 10/2012 | Supalov et al. | |
| 8,284,736 B2 | 10/2012 | Liu et al. | |
| 2003/0103475 A1 | 6/2003 | Heppe et al. | |
| 2003/0169755 A1 * | 9/2003 | Ternovsky | 370/412 |
| 2003/0214962 A1 | 11/2003 | Allaye-Chan et al. | |
| 2004/0252995 A1 * | 12/2004 | Ovadia et al. | 398/54 |
| 2005/0047533 A1 | 3/2005 | Ruelke et al. | |
| 2006/0056383 A1 * | 3/2006 | Black et al. | 370/350 |
| 2006/0187480 A1 | 8/2006 | Tsuchiya et al. | |
| 2006/0217118 A1 | 9/2006 | Benco et al. | |
| 2006/0234623 A1 * | 10/2006 | Wallis et al. | 455/3.01 |
| 2006/0270422 A1 | 11/2006 | Benco et al. | |
| 2007/0110105 A1 | 5/2007 | Usuki et al. | |
| 2007/0118316 A1 * | 5/2007 | Panis | 702/69 |
| 2007/0189205 A1 | 8/2007 | Terry et al. | |
| 2008/0260087 A1 * | 10/2008 | Liang et al. | 375/376 |
| 2009/0046631 A1 | 2/2009 | Meylan et al. | |
| 2009/0077256 A1 | 3/2009 | Madan et al. | |
| 2009/0129339 A1 | 5/2009 | Young et al. | |
| 2009/0185526 A1 * | 7/2009 | Barber et al. | 370/328 |
| 2009/0239545 A1 | 9/2009 | Lee et al. | |
| 2009/0259756 A1 | 10/2009 | Karlsson et al. | |
| 2009/0326769 A1 | 12/2009 | Oshima et al. | |
| 2009/0326777 A1 | 12/2009 | Oshima et al. | |
| 2009/0326779 A1 | 12/2009 | Oshima et al. | |
| 2010/0017077 A1 | 1/2010 | Oshima et al. | |
| 2010/0046543 A1 | 2/2010 | Parnaby | |
| 2010/0118752 A1 | 5/2010 | Suzuki et al. | |
| 2010/0136992 A1 | 6/2010 | Harada et al. | |
| 2010/0153804 A1 | 6/2010 | Cai et al. | |
| 2010/0161387 A1 | 6/2010 | Harrang et al. | |
| 2010/0188969 A1 | 7/2010 | Kim et al. | |
| 2011/0029664 A1 | 2/2011 | Harrang et al. | |
| 2011/0060927 A1 | 3/2011 | Fillingim et al. | |
| 2011/0179153 A1 | 7/2011 | Maspultra et al. | |
| 2011/0269463 A1 | 11/2011 | Wang et al. | |
| 2011/0280220 A1 | 11/2011 | Jia et al. | |
| 2011/0319064 A1 | 12/2011 | Lenart et al. | |
| 2012/0008496 A1 | 1/2012 | Saavedra | |
| 2012/0047505 A1 | 2/2012 | Branson et al. | |
| 2012/0052814 A1 | 3/2012 | Gerber et al. | |
| 2012/0140633 A1 * | 6/2012 | Stanwood et al. | 370/235 |
| 2012/0151041 A1 | 6/2012 | Gerber et al. | |
| 2012/0191309 A1 | 7/2012 | Oshima et al. | |
| 2012/0218983 A1 | 8/2012 | Noh et al. | |
| 2012/0230240 A1 * | 9/2012 | Nebat et al. | 370/312 |
| 2012/0265875 A1 | 10/2012 | Moran et al. | |
| 2012/0324041 A1 | 12/2012 | Gerber et al. | |
| 2013/0016736 A1 | 1/2013 | Parnaby | |
| 2013/0227060 A1 | 8/2013 | Sheynman et al. | |
| 2014/0095706 A1 | 4/2014 | Raleigh et al. | |

OTHER PUBLICATIONS

"UE "Fast Dormancy" Behaviour. 3GPP discussion and decision notes R2-075251, 2007. 3GPP TSG-RAN WG2, Jeju, South Korea, Nov. 5-9, 2007. http://ftp.3gpp.org/specs/html-info/TDocExMtg--R2-60--26016.htm. Last accessed Dec. 9, 2010, 12 pages."

"Configuration of Fast Dormancy in Release-8. 3GPP discussion and decision notes RP-090960, 2009, Seville, Spain Sep. 15-18, 2009. http://ftp.3gpp.org/specs/html-info/TDocExMtg--RP-45--26390. htm. Last accessed Dec. 9, 2010, 3 pages."

"System Impact of Poor Proprietary Fast Dormancy Implementations. 3GPP discussion and decision notes RP-090941, Seville, Spain, Sep. 15-18, 2009. http://3g4g.blogspot.com/2010/10/fast-dormancy-in-release-8.html. Last accessed Dec. 10, 2010, 2 pages."

"Anand, et al. Self-Tuning Wireless Network Power Management. Wireless Networks, 11(4), 2005, Proceedings of the 9th Annual International Conference on Mobile Computing and Networking, MobiCom'03. http://portal.acm.org/citation.cfm?id=939004&CFID=1282940&CFTOKEN=71026603. Last accessed Dec. 10, 2010, 14 pages."

"Balasubramanian, et al. Energy Consumption in Mobile Phones: A Measurement Study and Implications for Network Applications. IMC'09, Nov. 4-6, 2009, Chicago, Illinois, USA; ACM 978-1-60558-770-7/09/11 http://portal.acm.org/results.cfm?h=1&cfid=1282940&cftoken=71026603. Last accessed Dec. 10, 2010, 14 pages."

"Chatterjee, et al. Optimal MAC State Switching for cdma2000 Networks. IEEE 0-7803-7476-2/02, INFOCOM 2002. 2002.http://crewman.uta.edu/publicationfiles/cdma-mainak.pdf. Last accessed Dec. 10, 2010, 7 pages."

"System Parameter Recommendations to Optimize PS Data User Experience and UE Battery Life, Engineering Services Group, 80-W1112-1, Revision B, Mar. 2007. http://www.qualcomm.co.in/common/documents/white_papers/ESG_Optimizing_PS_Data_User_Experience_RevB.pdf. Last accessed Dec. 10, 2010, 9 pages."

"Ghaderi, et al. TCP-Aware Resource Allocation in CDMA Networks. MobiCom'06, Sep. 23-26, 2006, Los Angeles, California, USA. http://delivery.acm.org/10.1145/1170000/1161114/p215-ghaderi.pdf?key1=1161114&key2=4990991921&coll=DL&dl=ACM&CFID=1282940&CFTOKEN=71026603. Last accessed Dec. 10, 2010, 12 pages."

"Haverinen, et al. Energy Consumption of Always-On Applications in WCDMA Networks. Proceedings of IEEE Vehicular Technology Conference, 2007. http://www.pasieronen.com/publications/haverinen_siren_eronen_vtc2007.pdf. Last accessed Dec. 20, 2010, 5 pages."

"Liu, et al. Experiences in a 3G Network: Interplay between the Wireless Channel and Applications. MobiCom'08, Sep. 14-19, 2008, San Francisco, California, USA. http://citeseerx.ist.psu.edu/viewdoc/summary?doi=10.1.1.142.8214. Last accessed Dec. 20, 2010, 12 pages."

"Sridharan, et al. Distributed Uplink Scheduling in CDMA Networks. In Proceedings of IFIP—Networking 2007, May 2007. http://citeseerx.ist.psu.edu/viewdoc/summary?doi=10.1.1.86.5478. Last accessed Dec. 20, 2010, 12 pages."

Zhuang, et al. A3: Application-Aware Acceleration for Wireless Data Networks, MobiCom'06, Sep. 23-26, Los Angeles, CA.

Lee, et al. Impact of Inactivity Timer on Energy Consumption in WCDMA and cdma2000 http://ir.lib.nthu.edu.tw/bitstream/987654321/18573/112030228030019.pdf. Last accessed Dec. 20, 2010, 10 pages.

(56) References Cited

OTHER PUBLICATIONS

"Li, et al. Service Quality's Impact on Mobile Satisfaction and Intention to Use 3G Service. Proceedings of the 42nd Hawaii International Conference on System Sciences—2009, IEEE 978-0-7695-3450-3/09. http://www.computer.org/portal/web/csdl/doi/10.1109/HICSS.2009.902. Last accessed Dec. 20, 2010, 10 pages."

"Chuah, et al. Impacts of Inactivity Timer Values on UMTS System Capacity. In Wireless Communications and Networking Conference, 2002, vol. 2, pp. 897-903. http://ieeexplore.ieee.org/Xplore/login.jsp?url=http://ieeexplore.ieee.org/iel5/7793/21424/00993390.pdf%3Farnumber%3D993390&authDecision=-203".

"Liers, et al. Static RRC Timeouts for Various Traffic Scenarios. In Proceedings of International Symposium on Personal, Indoor and Mobile Radio Communications (PIMRC), Sep. 3-7, 2007, pp. 1-5. http://ieeexplore.ieee.org/articleSale/Sarticle.jsp?arnumber=4394275".

"Liers, et al. UMTS Data Capacity Improvements Employing Dynamic RRC Timeouts. In Proceedings of International Symposium on Personal, Indoor and Mobile Radio Communications, PIMRC, Sep. 11-14, 2005, vol. 4, pp. 2186-2190. http://ieeexplore.ieee.org/xpl/freeabs_all.jsp?arnumber=1651833&abstract-Access=no&userType=".

"Talukdar, et al. Radio Resource Control Protocol Configuration for Optimum Web Browsing. In Proceedings IEEE 56th Vehicular Technology Conference, 2002, vol. 3, pp. 1580-1584. http://ieeexplore.ieee.org/xpl/freeabs_all.jsp?arnumber=1040482".

"Tan, et al. Measurement-based Performance Model of IP Traffic over 3G Networks. TENCON 2005, IEEE Region 10, pp. 1-5, Nov. 2005. http://ieeexplore.ieee.org/xpl/freeabs_all.jsp?arnumber=4085057".

"Yeh, et al. Comparative Analysis of Energy-Saving Techniques in 3GPP and 3GPP2 Systems. IEEE transactions on vehicular technology, 58(1):432-438, Jan. 2009. http://ieeexplore.ieee.org/Xplore/login.jsp?url=http://ieeexplore.ieee.org/iel5/25/4356907/04490170.pdf%3Farnumber%3D4490170&authDecision=-203".

300 Million UMTS Subscribers: Mobile Broadband Goes Global http://www.umts-forum.org/content/view/2522/110/. Downloaded Dec. 14, 2010, 1 page.

Configuration of Fast Dormancy in Release-8. 3GPP discussion and decision notes RP-090960, 3GPP TSG-RAN#45, Sevilla, Spain Sep. 15-18, 2009. Last accessed Feb. 11, 2011, 3 pages.

System Impact of Poor Proprietary Fast Dormancy Implementations. 3GPP discussion and decision notes RP-090941, TSG-RAN meeting #45 , Seville, Spain, Sep. 15-18, 2009. Last accessed Feb. 11, 2011, 2 pages.

Falaki, et al. A First Look at Traffic on Smartphones. IMC'10, Nov. 1-3, 2010, Melbourne, Australia. http://research.microsoft.com/en-us/um/people/ratul/papers/imc2010-smartphone-traffic.pdf. Last accessed Feb. 11, 2011, 7 pages.

"Balasubramanian, et al. Augmenting Mobile 3G Using WiFi. MobiSys'10, Jun. 15-18, 2010, San Francisco, California, USA. http://research.microsoft.com/en-us/um/people/ratul/papers/mobisys2010-wiffler.pdf. Last accessed Feb. 11, 2011, 13 pages."

Balasubramanian, et al. Energy Consumption in Mobile Phones: A Measurement Study and Implications for Network Applications. IMC'09, Nov. 4-6, 2009, Chicago, Illinois, USA. Last accessed Dec. 15, 2010, 14 pages.

Chakravorty, et al. WWW Performance over GPRS. In IEEE MWCN, 2002. http://www.cl.cam.ac.uk/research/srg/netos/coms/rc277/mwcn_cr.pdf. Last accessed Feb. 11, 2011, 5 pages.

"Hwang, et al. Anatomizing Application Performance Differences on Smartphones. MobiSys'10, Jun. 15-18, 2010, San Francisco, California, USA. http://research.microsoft.com/pubs/131377/MobiSys10-3GTest.pdf. Last accessed Feb. 11, 2011, 13 pages.".

Falaki, et al. Diversity in Smartphone Usage. MobiSys'10, Jun. 15-18, 2010, San Francisco, California, USA. http://portal.acm.org/citation.cfm?id=1814453&CFID=9592070&CFTOKEN=64926078. Last accessed Feb. 11, 2011, 16 pages.

Qian, et al. Characterizing Radio Resource Allocation for 3G Networks. IMC'10, Nov. 1-3, 2010, Melbourne, Australia. Last accessed Dec. 15, 2010, 14 pages.

Qian, et al. TOP: Tail Optimization Protocol for Cellular Radio Resource Allocation. In ICNP, 2010. http://www.eecs.umich.edu/~zmao/Papers/ICNP2010.pdf. Last accessed Feb. 11, 2011, 10 pages.

"Schulman, et al. Bartendr: A Practical Approach to Energy-aware Cellular Data Scheduling. MobiCom'10, Sep. 20-24, 2010, Chicago, Illinois, USA. http://www.cs.umd.edu/~schulman/docs/mobicom10-bartendr.pdf. Last accessed Feb. 11, 2011, 12 pages."

Shepard, et al. LiveLab: Measuring Wireless Networks and Smartphone Users in the Field. In Hot-Metrics, 2010. http://hotmetrics.cs.caltech.edu/pdfs/paper12_final.pdf. Last accessed Feb. 11, 2011, 5 pages.

"Zhang, et al. Accurate Online Power Estimation and Automatic Battery Behavior Based Power Model Generation for Smartphones. CODES+ISSS'10, Oct. 24-29, 2010, Scottsdale, Arizona, USA. http://www.eecs.umich.edu/~zhiyunq/pub/powertutor.pdf. Last accessed Feb. 11, 2011, 10 pages."

Qian et al. iMAP: Intelligent Mobile Application Profiling Tool. Last accessed Oct. 13, 2010, 14 pages.

iMAP: Intelligent Mobility Application Profiling Tool. Last accessed Sep. 16, 2010, 6 pages.

"Liers. Static RRC Timeouts for Various Traffic Scenarios. In PIMRC, 2007, IEEE 18th International Symposium on Personal, Indoor and Mobile Radio Communications, 2007, Sep. 3-7, 2007, Athens, pp. 1-5. http://ieeexplore.ieee.org/Xplore/login.jsp?url=http://ieeexplore.ieee.org/iel5/4393982/4393983/04394275.pdf%3Farnumber%3D4394275&authDecision=-203 ".

"Yeh, et al. Comparative Analysis of Energy-Saving Techniques in 3GPP and 3GPP2 Systems. IEEE Transactions on Vehicular Technology, Jan. 2009, vol. 58, Issue 1, pp. 432-448. http://ieeexplore.ieee.org/Xplore/defdeny.jsp?url=http://ieeexplore.ieee.org/stamp/stamp.jsp%3Ftp%3D%26arnumber%3D4490170%26userType%3D&denyReason=-134&arnumber=4490170&productsMatched=null&userType=".

U.S. Appl. No. 12/872,604 (not yet published)—"Tail Optimization Protocol for Cellular Radio Resource Allocation" Gerber et al.

U.S. Appl. No. 12/967,627 (not yet published)—"Intelligent Mobility Application Profiling Tool" Gerber et al.

Office Action dated Oct. 12, 2012 for U.S. Appl. No. 12/967,627, 19 pages.

Office Action dated Sep. 15, 2013 for U.S. Appl. No. 12/872,604, 53 pages.

Office Action dated Mar. 12, 2013 for U.S. Appl. No. 12/872,604, 27 pages.

Notice of Allowance dated May 1, 2013 for U.S. Appl. No. 12/967,627, 17 pages.

Notice of Allowance dated Oct. 22, 2014 for U.S. Appl. No. 13/956,028, 34 pages.

Office Action dated Jul. 16, 2014 for U.S. Appl. No. 13/528,423, 64 pages.

Office Action dated Jan. 26, 2015 for U.S. Appl. No. 13/528,423, 36 pages.

* cited by examiner

BUNDLING DATA TRANSFERS AND EMPLOYING TAIL OPTIMIZATION PROTOCOL TO MANAGE CELLULAR RADIO RESOURCE UTILIZATION

TECHNICAL FIELD

This disclosure relates generally to network communications and, more specifically to managing operation of devices utilized within a wireless communication network.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

In conventional wireless communication networks, data bursts between the user handset and the communication network occur frequently to transfer data between the user handset and communication network. Often, a first data burst is sent resulting the user handset being transitioned from an idle state to a high bandwidth active state to send or receive the data burst and then continuing to use wireless network resources until the tail time for releasing such resources is reached, wherein the user handset is transitioned back to the idle, only to be almost immediately followed by another data burst that results in the state transition process occurring all over again. Such inefficient scheduling of data bursts result in inefficient state transitions (e.g., transition of the user handset from idle state high power state, transition from high power active state to low power active state or to idle) by the user handset result in unnecessary allocation and use of wireless network resources and unnecessary power consumption by the user handset. Also, in various wireless network deployments, such as third generation (3G) cellular networks or the like, the release of radio resources can be controlled by inactivity timers. However, the timeout value itself (e.g., the tail time) can have a significantly long duration (e.g., up to 15 seconds) due to the necessity of trading off resource utilization efficiency for low management overhead and good stability. This, in turn, can result in a wastage of a considerable amount of radio resources and battery energy associated with respective user handsets.

Today, there is no way to effectively manage data transfers, particularly scheduling of data bursts, between a user handset and a communication network. The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of various aspects of the disclosed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed subject matter in a simplified form as a prelude to the more detailed description that is presented later.

Techniques for managing scheduling of communication of data bursts associated with a UE, and managing state transitions and tail time for the UE, to increase power and resource efficiency of the UE are presented herein. With regard to periodic or one-time data transfers by user equipment (UE), the UE can comprise a communication management component that can analyze information relating to periodicity, transfer start time, callback, and/or jitter, respectively, from each application of a subset of applications used by the UE. Based at least in part on the results of such analysis, the communication management component can desirably schedule and/or bundle (e.g., batch) data transfers associated with the applications to reduce the number of separate data bursts used to transfer that data to thereby reduce use of wireless resources and power consumption by the UE. In another aspect, the communication management component can employ fast dormancy and a tail optimization protocol (TOP) to manage the tail time associated with data transfers to reduce the amount of tail time, desirably manage state transitions by the UE, and reduce use of wireless resources and power consumption by the UE. In still another aspect, a push notification system can receive respective jitter information for each application from the UE. Based at least in part on the respective jitter information, the push notification system can desirably schedule and/or bundle push notifications being sent to the UE to reduce the number of separate data bursts, comprising the push notifications, sent to the UE to reduce use of wireless resources and power consumption by the UE. For example, the push notification system can delay the transmission of a first push notification being sent to the UE for a desired amount of time, in accordance with jitter information associated with the first push notification, and can bundle the first push notification with a second push notification so that they can be sent in a single data burst and can transmit that data burst to the UE.

In accordance with an aspect, the disclosed subject matter can include a method comprising the act of identifying a subset of data transfers to be bundled together into a single data burst based on a subset of data transfer parameters, comprising jitter information, associated with the subset of data transfers, wherein the subset of data transfers is associated with a mobile device. The method also can include the act of transmitting the single data burst, comprising the subset of data transfers In accordance with another aspect, the disclosed subject matter can include a system that can comprise a communication device configured to communicate data transfers in a communication network environment. The system can also include a communication management component configured to schedule communication of the data transfers and identify a subset of data transfers to be grouped together into a single data burst based on a subset of data transfer parameters, comprising jitter information, associated with the subset of data transfers, wherein the subset of data transfers is associated with a wireless communication device.

In accordance with a further aspect, the disclosed subject matter can comprise a computer program product, which can include a computer-readable medium is described herein, which can include a computer readable storage medium comprising computer executable instructions that, in response to execution by a computing system, cause the computing system to perform operations comprising: identifying a subset of data transfers to be grouped together into a single data burst based on a subset of data transfer parameters, comprising jitter parameter information, associated with the subset of data transfers, wherein the subset of data transfers is associated with a mobile communication device; and transmitting the single data burst, comprising the subset of data transfers.

The following description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
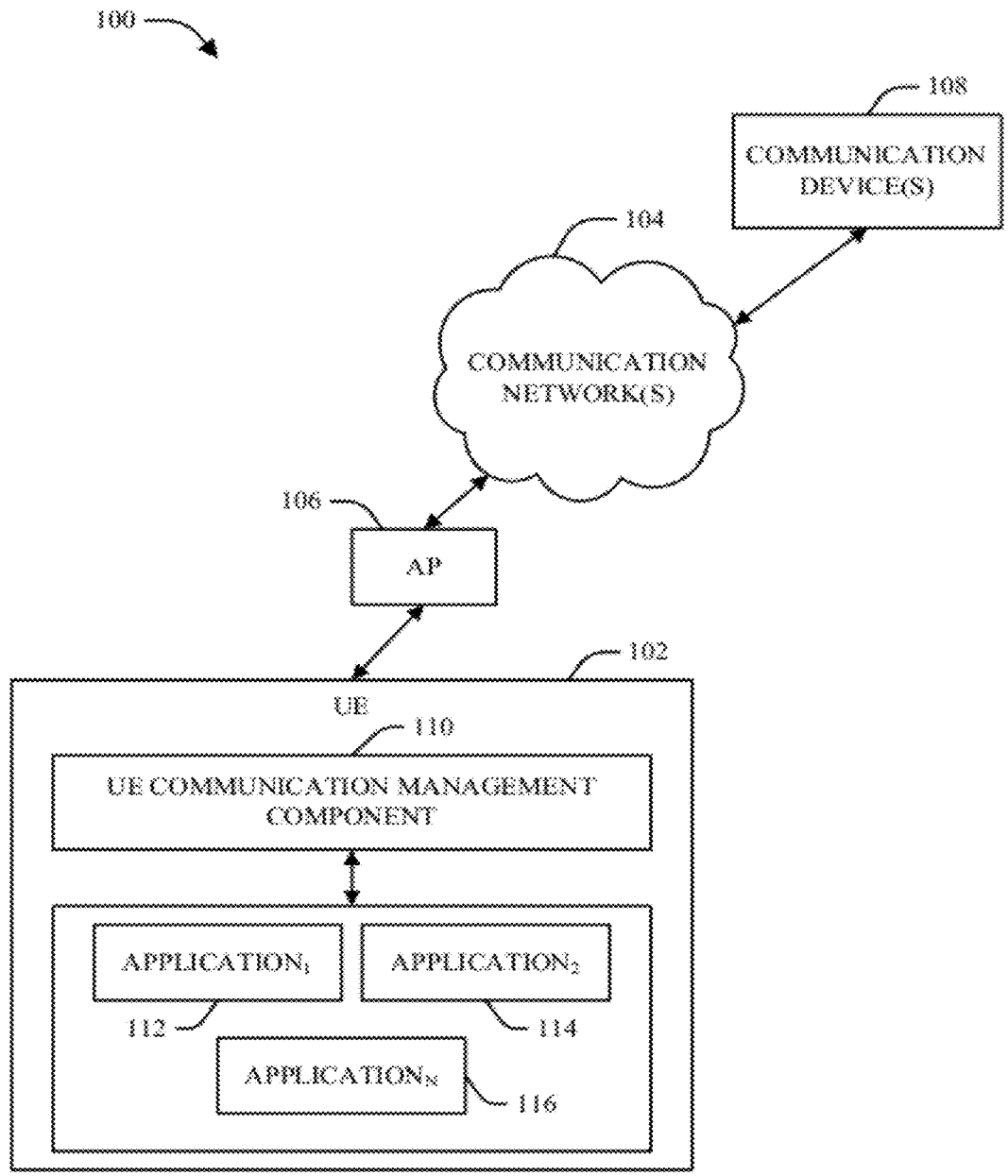
FIG. 1 illustrates a block diagram of an example system that can desirable control scheduling of data transfers associated with a network device (e.g., user equipment (UE)) in accordance with various aspects and embodiments described herein.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In conventional wireless communication networks, scheduling of communication of data bursts between the user equipment (UE) and the communication network are inefficiently managed. Such inefficient scheduling of data bursts results in inefficient state transitions (e.g., transition of the user handset from idle state high power state, transition from high power active state to low power active state or to idle) by the UE result in unnecessary allocation and use of wireless network resources and unnecessary power consumption by the UE. Also, in conventional wireless communication networks, the release of radio resources can be controlled by inactivity timers. However, the timeout value itself (e.g., the tail time) can have a significantly long duration (e.g., up to 15 seconds) due to the necessity of trading off resource utilization efficiency for low management overhead and good stability. This, in turn, can result in a wastage of a considerable amount of radio resources and battery energy associated with respective user handsets. Today, there is no way to effectively manage data transfers, particularly scheduling of data bursts, between a user handset and a communication network.

To that end, techniques for managing scheduling of communication of data bursts associated with a UE, and managing state transitions and tail time for the UE, to increase power and resource efficiency of the UE are presented herein. With regard to periodic or one-time data transfers by user equipment (UE), the UE can comprise a communication management component that can analyze information relating to periodicity, transfer start time, callback, and/or jitter, respectively, from each application of a subset of applications used by the UE. Based at least in part on the results of such analysis, the communication management component can desirably schedule and/or bundle (e.g., batch) data transfers associated with the applications to reduce the number of separate data bursts used to transfer that data to thereby reduce use of wireless resources and power consumption by the UE. In another aspect, the communication management component can employ fast dormancy and a tail optimization protocol (TOP) to manage the tail time associated with data transfers to reduce the amount of tail time, desirably manage state transitions by the UE, and reduce use of wireless resources and power consumption by the UE. In still another aspect, a push notification system can receive respective jitter information for each application from the UE. Based at least in part on the respective jitter information, the push notification system can desirably schedule and/or bundle push notifications being sent to the UE to reduce the number of separate data bursts, comprising the push notifications, sent to the UE to reduce use of wireless resources and power consumption by the UE.

As used in this application, the terms "component," "system," "platform," "layer," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

Referring now to the drawings, FIG. 1 illustrates a block diagram of an example system 100 that can desirable control scheduling of data transfers associated with a network device (e.g., UE) in accordance with various aspects and embodiments described herein. The system 100 can comprise a UE 102 (e.g., mobile and/or wireless communication device, such as a mobile phone (e.g., 3GPP Universal Mobile Telecommunications System (UMTS) phone), personal digital assistant (PDA), computer, set-top box, electronic notebook, electronic pad or tablet (e.g., iPad), portable electronic gaming device, etc.) that can operate and communicate in a communication network environment. In an aspect, the UE 102 can be communicatively connected via a wireless communication connection(s) to a communication network 104 via an AP 106.

In an aspect, as the UE 102 is moved through a wireless communication network environment, at various times, the UE 102 can be connected (e.g., wirelessly connected) to one of a plurality of APs (e.g., macro or cellular AP, femto AP, pico AP, Wi-Fi AP, Wi-Max AP, etc.), such as an AP 106, that can operate in the wireless communication network environment. An AP (e.g., 106) can serve a specified coverage area to facilitate communication by the UE 102 or other UEs in the wireless communication network environment. The AP 106 can serve a respective coverage cell (e.g., macrocell, femtocell, picocell, etc.) that can cover a respective specified area, and the AP 106 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 106 and incoming voice and data traffic can be paged and routed to the UE 102 through the AP 106, and outgoing voice and data traffic from the UE 102 can be paged and routed through the AP 106 to other communication devices (e.g., another UE) in the communication network environment. In an aspect, the UE 102 can be connected and can communicate wirelessly using virtually any desired wireless technology, including, for example, cellular, Wi-Fi, Wi-Max, wireless local area networks (WLAN), etc.

In another aspect, the communication network 104 (e.g., Third Generation (3G), Fourth Generation (4G), or x Generation (xG) network, where x can be virtually any desired integer or real value) can facilitate wireless connection with the UE 102 connected to the AP 106 and facilitate communication by or between a UE 102 and another UE(s) or other type of communication device(s) (e.g., computer, server (e.g., push notification system or server, application server, content server that can be provide video content, audio content, and/or other content comprising other types of information), etc.), such as communication device 108 associated with the communication network 104 in the communication network environment. The communication network 104 (e.g., a core network, or network comprising a core network, and/or IP-based network) can facilitate routing voice and data communications between a communication device(s) (e.g., UE 102) and other communication devices (e.g., another UE, a server) associated with the communication network 104 in the communication network environment. The communication network 104 also can allocate resources to the UE 102 or other UEs in the communication network 104, convert or enforce protocols, establish and enforce Quality of Service (QoS) for the UEs, provide applications or services in the communication network 104, translate signals, and/or perform other desired functions to facilitate system interoperability and communication in the communication network 104 (e.g., wireless portion of the communication network 104 or wireline portion of the communication network 104). The communication network 104 further can include desired components, such as routers, nodes, switches, interfaces, controllers, etc., that can facilitate communication of data between communication devices in the communication network environment.

In conventional wireless communication networks, scheduling of communication of data bursts, comprising data transfers (e.g., data packets), between a conventional UE and a conventional communication network are inefficiently managed. Such inefficient scheduling of data bursts in communications to or from the conventional UE results in inefficient state transitions (e.g., transition of a UE from an idle state to high power active communication state, transition of the UE from high power active communication state to a low power active communication state or to the idle state) by the conventional UE result in unnecessary allocation and use of wireless network resources and unnecessary power consumption by the conventional UE. Also, in conventional wireless communication networks, the release of radio resources can be controlled by inactivity timers. However, the timeout value itself (e.g., the tail time) can have a significantly long duration (e.g., up to 15 seconds) due to the necessity of trading off resource utilization efficiency for low management overhead and good stability. This, in turn, can result in a wastage of a considerable amount of radio resources and battery energy associated with a conventional UE. Other examples and illustrations relating to data bursts, state transitions, and inefficiencies of conventional systems and devices are contained, for example, in FIGS. 2, 4, 5, 7, and 8 and the descriptions relating thereto in the subject specification. The disclosed subject matter can overcome such deficiencies of conventional UEs and conventional systems (e.g., conventional servers, such as conventional push notification servers) and methods.

To that end, in accordance with various aspects and embodiments, the UE 102 can comprise a UE communication management component 110 that can desirably (e.g., optimally) control scheduling and/or batching (e.g., grouping, bundling, piggybacking) of data transfers, including data transfers relating to one or more applications, such as application$_1$ 112, application$_2$ 114 through application$_N$, associated with the UE 102, based at least in part on a subset of data transfer parameters, comprising jitter parameter information, in accordance with predefined communication criteria, to reduce the number of data bursts employed to communicate data between the UE 102 and the communication network 104, wherein N can be virtually any desired integer number. In another aspect, the UE communication management component 110 can be part of or can operate in conjunction with the operating system (OS) of the UE 102 to facilitate controlling scheduling and/or batching of data transfers associated with the UE 102.

For instance, the UE communication management component 110 can be utilized to control scheduling and/or batching of data transfers relating to periodic data transfers or non-periodic data transfers, including one-time data transfers. One example of a periodic data transfer can include a "keep alive" data transfer (e.g., comprising a "keep alive" data packet) that can be periodically sent by the UE 102 to maintain a communication connection on a communication channel, wherein the periodic time for transmission of the "keep alive" data transfer can be based on the length of time the communication connection can remain active without data transfers occurring on the channel. This type of data transfer can be useful, for example, when there is a firewall between communication devices on the Internet to maintain an active communication state on the firewall. Another example of a periodic data transfer can be a data transfer that relates to measurement of consumption or user tracking of consumption of an entity's content (e.g., in relation to an application), so that the entity can have information regarding how long the UE user has been viewing the entity's web page or viewing/listening to its video/audio content. Still another example of a periodic transfer is a logging data transfer, which can communicate logging information to a server (e.g., application server), wherein the logging information can indicate what the UE user was consuming during the period of time to which the logging data transfer relates. Yet another example of a periodic data transfer can relate to advertisements that can be periodically communicated between the application server and the UE 102, for example, when an application is open. Another example of a periodic data transfer can be a pull data transfer relating to an application, wherein the pull data transfer can be periodically transmitted by the UE 102 to an application server to see if information is available or to try to obtain information from the application server. There are other types of periodic data transfers that are not included herein for reasons of brevity, however, all types of periodic data transfers are contemplated by and are considered part of the subject specification.

Periodic data transfers are data transfers that are communicated between the UE 102 and the communication network 104 (and/or servers, such as application servers, communicatively connected to the communication network 104) on a periodic time basis, for example, while an application (e.g., 112, 114, 116) is opened on the UE 102. Periodicity is a term that means or relates to the period or amount of time between two periodic data transfers (e.g., associated with an application), and a periodicity parameter can be one type of data transfer parameter for an application. For example, one application can have a periodic data transfer that has a periodicity of 5 minutes, wherein, except as otherwise specified by other data transfer parameters (e.g., jitter), the application requests that a data transfer occur every 5 minutes, while another application can have a periodicity of 30 minutes, wherein this other application requests that a data transfer occur every 30 minutes. In an aspect, if it is desired to have a one-time data transfer, the periodicity parameter of the data transfer can be set to 0 seconds, and as a result, the data transfer will be executed one time in accordance with the other data transfer parameters (e.g., transfer start time parameter).

In another aspect, to facilitate improving operations relating to data transfers by the UE 102, it can be desirable to specify a longer periodicity time as opposed to a shorter periodicity time, as the longer periodicity time can result in less periodic data transfers associated with an application, which can result in less data bursts associated with data transfers associated with an application. The time length of the periodicity can be set in accordance with the predefined communication criteria, and typically can be set by the application developer and/or updated and modified via an application update.

Another type of data transfer parameter can be a jitter parameter. The jitter parameter can specify the amount of time before and/or after the nominal transfer start time, which can be based at least in part on the periodicity parameter, the data transfer can be communicated. This is essentially the amount of leeway (e.g., the margin of deviation) from the scheduled time (e.g., nominal transfer start time) the application is able to accept in relation to communication of the data transfer. For instance, if a data transfer associated with an application has a nominal transfer start time at time $t_0$, and the jitter parameter is +/−30 seconds, the data transfer can occur at any time from $t_0$−30 seconds through $t_0$+30 seconds.

In yet another aspect, to facilitate improving operations relating to data transfers by the UE 102, it can be desirable to specify a longer jitter time as opposed to a shorter jitter time, as the longer jitter time can result in the UE communication management component 110 having more flexibility in scheduling data transfers that have a longer jitter time, which can result in more opportunities to bundle data transfers together and consequently result in less data bursts associated with data transfers. The time length of the jitter parameter can be set in accordance with the predefined communication criteria, and typically can be set by the application developer and/or updated and modified via an application update.

Still another type of data transfer parameter can be a transfer start time parameter (also referred to herein as "transferstarttime"). The transfer start time parameter can specify a time, $t_0$, that can be the desired or nominal start time to perform the data transfer. The transfer start time parameter can be based at least in part on the periodicity parameter. For example, if the periodicity parameter is set to 5 minutes, and the last data transfer relating to the application was performed at $t_0$−5 minutes, the transfer start time parameter can be set to $t_0$.

Yet another type of data transfer parameter can be a call back parameter (also referred to herein as "callback"). The call back parameter can be set to a value (e.g., name, alphanumeric value) of a function that is desired to be called and/or executed in relation to the data transfer. Some examples of functions include a "keep alive" function that can be called or executed to facilitate performing a "keep alive" data transfer to maintain a communication connection, or an advertisement function that can be called periodically to facilitate performing a data transfer relating to advertisements.

In an aspect, when a first data transfer, which can be a periodic data transfer or one-time data transfer, associated with a first application (e.g., application$_1$ 112) is to be scheduled for transmission by the UE communication management component 110 (e.g., based at least in part on the periodicity of the first application), the UE communication management component 110 can analyze data transfer parameters (e.g., a jitter parameter, a periodicity parameter and/or a transfer start time parameter) associated with the first data transfer, and also can analyze respective data transfer parameters of one or more other data transfers respectively associated with one or more other applications (e.g., application$_2$ 114, application$_N$ 116) or the first application to determine whether any of the one or more other data transfers can be transmitted during the same data burst as the first data transfer to mitigate (e.g., reduce, minimize) the number of data bursts communicated to send all of the data transfers analyzed by the UE communication management component 110 and/or mitigate the number or type of communication state transitions associated with the UE 102 in performing such data transfers. Depending in part on the type of data transfer (e.g., periodic, aperiodic), the other data transfers can be associated with the same type or different types of data transfer parameters as the first data transfer. For example, for an aperiodic data transfer (e.g., audio content), there can be a transfer start time, which can be the time the aperiodic data transfer is to be performed, but no jitter parameter (or a jitter parameter equal to 0 seconds), to indicate that the aperiodic data transfer is to be performed at the transfer start time.

For example, it can be desired to communicate the first data transfer, comprising a specified number of data packets, associated with the first application (e.g., application$_1$ 112) in accordance with a first set of data transfer parameters, wherein the periodicity parameter is 5 minutes, transfer start time parameter is set to $t_0$, the call back parameter is set to "advertisement", and the jitter parameter is set to +/−30 seconds. In preparing to schedule the first data transfer associated with the first application (e.g., application$_1$ 112), the UE communication management component 110 can analyze the first set of data transfer parameters, and the data transfer parameters of any other data transfers of which the UE communication management component 110 is aware. For instance, the UE communication management component 110 can identify a second data transfer associated with a second application (e.g., application$_2$ 114), wherein the second data transfer (e.g., an aperiodic data transfer) is scheduled to be communicated at time $t_0$+15 seconds based at least in part on a second set of data transfer parameters; a third data transfer associated with a third application (e.g., application$_3$), wherein the third data transfer (e.g., another aperiodic data transfer) is scheduled to be communicated at time $t_0$−33 seconds based at least in part on a third set of data transfer parameters; and a fourth data transfer associated with a fourth application (e.g., application$_4$), wherein the fourth data transfer (e.g., a periodic data transfer) has the following fourth set of data transfer parameters, comprising a periodicity parameter set to 15 minutes, a transfer start time parameter set to $t_0$+40 seconds, a call back parameter set to "pull data" (e.g., to pull data from an application server associated with the fourth application), and a jitter parameter set to +/−30 seconds.

The UE communication management component 110 can analyze the first set of data transfer parameters, the second set of data transfer parameters, the third set of data transfer parameters, and the fourth set of data transfer parameters. As part of the analysis, the UE communication management component 110 can determine that the first data transfer can be grouped (e.g., batched, bundled, piggybacked) with the second data transfer because the second data transfer is scheduled to be communicated at time $t_0$+15 seconds, which is within the jitter time window of the first data transfer, wherein the jitter time window for the first data transfer spans from time $t_0$−30 seconds through time $t_0$+30 seconds; can determine that the first data transfer cannot be grouped with the third data transfer because the third data transfer is scheduled to be communicated at time $t_0$−33 seconds, which is outside of the jitter time window of the first data transfer; can determine that the fourth data transfer can be grouped with the second data transfer (and the first data transfer) because the second data transfer is scheduled to be communicated at time $t_0$+15 seconds, which is within the jitter time window of the fourth data transfer, wherein the jitter time window for the fourth data transfer spans from time $t_0$+10 seconds (e.g., $t_0$+40 seconds−30 seconds jitter) through $t_0$+70 seconds (e.g., $t_0$+40 seconds+30 seconds jitter).

Based at least in part on the results of this analysis, the UE communication management component 110 can group together the first data transfer and fourth data transfer with the second data transfer, and these data transfers can be communicated by the UE 102, employing the UE communication management component 110, in a single data burst at time $t_0$+15 seconds. The UE communication management component 110 can place the first data transfer, second data transfer, and fourth data transfer in a specified order in the queue (e.g., data transfer queue), and these data transfers can be communicated by the UE communication management component 110 at time $t_0$+15 seconds. The UE communication management component 110 also can determine that the third data transfer is to be communicated as part of another data burst, the third data transfer can be inserted in a desired place in the queue, and it can be communicated at time $t_0$−33 seconds.

As can be seen, the UE communication management component 110 can facilitate performing the four data transfers in only two data bursts, as compared to conventional systems and devices, which would use four data bursts to perform the four data transfers. As a result, the system 100 can reduce the number of data bursts needed to communicate these data transfers, reduce the amount of network resources used or allocated to the UE 102 in relation to these data transfers, reduce the number of state transitions associated with the UE 102 in relation to communication of these data transfers, and reduce the power consumption of the UE 102 in relation to communication of these data transfers to the UE 102, as compared to conventional communication systems and conventional UEs.

In an aspect, to facilitate identifying respective data transfer parameters and bundling of data transfers, the system 100 can employ a desired data transfer Application Programming Interface (API) that can identify or specify the data transfer parameters associated with an application(s) (e.g., application$_1$ 112, application$_2$ 114, application$_N$). The data transfer API can be initialized by an application and can be called, for example, when the application is opened up (e.g., activated) on the UE 302. The data transfer API also can specify a periodicity parameter to indicate the periodic times (e.g., every 5 minutes) that the data transfer API is to be run and an associated specified data transfer is to be executed. The data transfer API can be installed on the UE 302 when the associated application is installed on the UE 302, or at another desired time, and can be updated and modified (e.g., modified to add or change data transfer parameters, modified to add or change functions), as desired. The UE communication management component 110 can utilize the data transfer APIs of respective applications to facilitate identifying the data transfer parameters associated with respective data transfers associated with the applications, and facilitate controlling the scheduling and bundling of data transfers, in accordance with the predefined communication criteria.

In an embodiment, the data transfer API can be RegPeriodicTolerantTransfer(periodicity, transferstarttime, callback, jitter), wherein such data transfer API can be used to register periodic tolerant transfers of data in accordance with the data transfer parameters, including periodicity parameter, transfer start time parameter, call back parameter, and jitter parameter, contained in RegPeriodicTolerantTransfer(periodicity, transferstarttime, callback, jitter). It is to be appreciated that RegPeriodicTolerantTransfer(periodicity, transferstarttime, callback, jitter) is but one example of a data transfer API, and, in accordance with other embodiments, other types of data transfer APIs (e.g., having different data transfer parameters, having a different data transfer API name, etc.) can be utilized in accordance with the disclosed subject matter, and all such data transfer APIs are contemplated by and are part of the disclosed subject matter.

In accordance with still another aspect, the UE communication management component 110 can employ fast dormancy and TOP to efficiently manage the tail time (e.g., reduce tail time) associated with these four data transfers. The tail time is an amount of time that network radio resources can continue to be allocated to the UE 102, for instance, to have the UE 102 remain in the higher communication state (e.g., DCH state) in case there is going to be further communication of data between the UE 102 and the communication network 104. One purpose of the tail time is to facilitate controlling (e.g., to mitigate) the number of state transitions of the UE 102 due to the overhead incurred by the communication network 104 and UE 102 each time there is a state transition by the UE 102. However, as the UE 102 is continuing to utilize network radio resources during the tail time, it can be desirable for the UE 102 to actively release the network radio resources, using fast dormancy, to signal the communication network 104 (e.g., RNC in the communication network 104) to transition the UE 102 from the high power active communication state to the idle state, wherein in the idle state, there will be no network radio resources allocated to the UE 102, and the UE 102 will consume little or no power in relation to the association of UE 102 with the communication network 104.

The system 100 and its respective components and/or other associated entities can implement TOP, which is an application-layer protocol that can bridge the gap between applications and fast dormancy support provided by the communication network 104. In accordance with one aspect, TOP can be implemented at UE 102 via modifications to the OS (e.g., software update) and/or associated applications, taking into account the implication of multiple concurrent communication connections and/or multiple concurrent communications using fast dormancy.

For example, with regard to the third data transfer, assume the communication of the data itself (that is, not including communication state transitions, etc.) will take approximately 4 seconds. Also, in this example, the only identified data transfers are the first, second, third, and fourth data transfers for a specified time period being analyzed by the UE communication management component 110. The UE communication management component 110 can know that the state transition time for the UE 102 to transition from the idle state to the high power active communication state can take approximately 2 seconds, the communication of the data in the third data transfer can take approximately 4 seconds, and, after communication of the data, the tail time (e.g., the time for the UE 102 to transition back to the idle state from the high power active communication state) is approximately 17 seconds.

The UE communication management component 110 can know from its analysis and decisions that the UE 102 is communicating the third data transfer at $t_0-33$ seconds, and is communicating another data burst, comprising the first, second and fourth data transfers, at time 6+15 seconds; can determine that, under standard operating conditions with no fast dormancy, the UE 102 is scheduled to be transitioned from the high power active communication state to the idle state by the communication network 104 at (approximately) time $t_0-10$ seconds (e.g., $t_0-33$ seconds+state transition time for state promotion of 2 seconds+time for data communication of 4 seconds+tail time of 17 seconds). The UE communication management component 110 can identify that no other communication is expected between approximately $t_0-27$ seconds (e.g., $t_0-33$ seconds+state transition time for state promotion of 2 seconds+time for data communication of 4 seconds) and time $t_0+15$ seconds when the first, second and fourth data transfers are sent in a single data burst.

Based at least in part on this analysis, the UE communication management component 110 can determine that the tail time (e.g., from time $t_0-27$ seconds through time $t_0-10$ seconds) after the third data transfer (as part of the first occurring data burst) is unnecessary since there are no communications expected by the UE 102 during the tail time. As a result, in accordance with TOP, the UE communication management component 110 can determine that fast dormancy is to be implemented, and the UE communication management component 110 can generate a tail termination signal and can transmit the tail termination signal to the communication network 104 (e.g., associated RNC), and the communication network 104 can terminate the tail by immediately transitioning the UE 102 from the high power active communication state to the idle state, wherein in the idle state the UE 102 will no longer have network radio resources allocated to it by the communication network 104, until another data communication is desired and resources are again allocated. The system 100, by employing fast dormancy in accordance with TOP, can thereby further reduce the use (e.g., unnecessary use) of network radio resources by the UE 102, which can reduce power consumption by the UE 102 and also can free up network radio resources for other UEs associated with the communication network 104.

Figure 2:
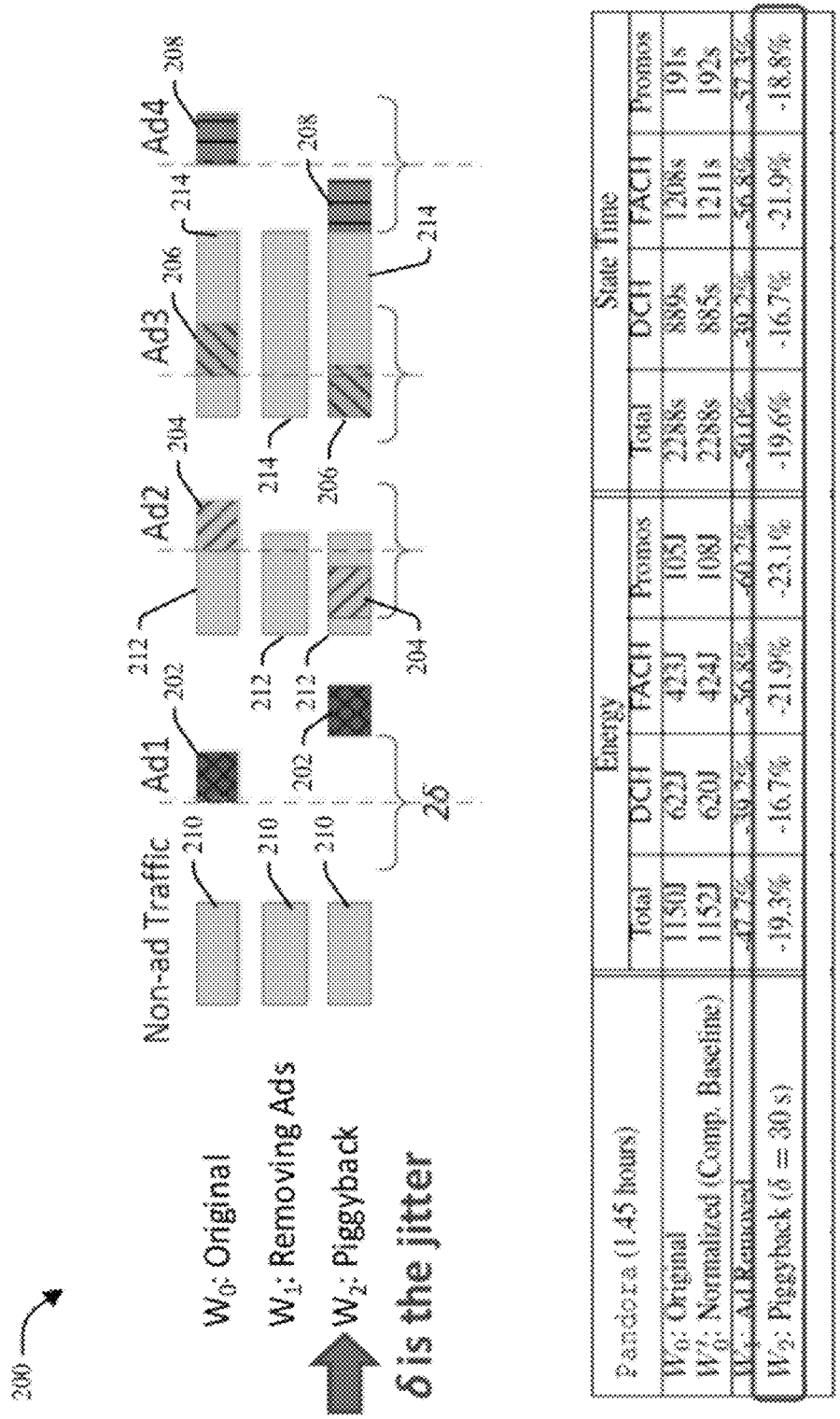
FIG. 2 depicts an illustration of an example data traffic flow and associated results relating to bundling of data transfers associated with a UE in accordance with various aspects.

Referring briefly to FIG. 2 (along with FIG. 1), FIG. 2 depicts an illustration of an example data traffic flow 200 and associated results relating to bundling of data transfers associated with UE 102 in accordance with various aspects. As shown in data traffic flow 200, $W_0$ depicts the original, unmodified scheduling of data traffic, comprising periodic data transfers, including Ad1 202, Ad2 204, Ad3 206 and Ad4 208, which can be, for example, respective advertisements over a specified period of time. In $W_0$, Ad1 202 is scheduled to occur at time $t_1$ in accordance with the nominal transfer start time for Ad1 202, Ad2 204 is scheduled to occur at time $t_2$ in accordance with the nominal transfer start time for Ad2 204, Ad3 206 is scheduled to occur at time $t_3$ in accordance with the nominal transfer start time for Ad3 206, and Ad4 208 is scheduled to occur at time $t_4$ in accordance with the nominal transfer start time for Ad4 208. These periodic transfers can be respectively associated with one or more applications and each can have a jitter parameter of +/−30 seconds (e.g., the jitter, $\delta$=30 seconds, wherein the total jitter (or jitter time window)=$2\delta$ can span 30 seconds before a nominal transfer start time and 30 seconds after the nominal transfer start time). The data traffic flow 200 also can include non-advertisement traffic (e.g., audio streamed data), such as data 210, data 212, and data 214, for which transmission can occur at aperiodic times. For reference and clarity, since there is some overlap of the data traffic, in $W_1$, the data 210, data 212, and data 214 are depicted by themselves with no advertisements.

In accordance with various aspects, the UE communication management component 110 of UE 102 can analyze the data transfer parameters of the respective data traffic, Ad1 202, Ad2 204, Ad3 206, Ad4 208, data 210, data 212, and data 214, and can determine whether any of the respective pieces of data traffic can be bundled together in a single data burst instead of being communicated in separate data bursts, in accordance with predefined communication criteria. For instance, the UE communication management component 110 can analyze the data transfer parameters of the data 210 and/or the data transfer parameters of Ad1 202 or other data transfers, and can determine that there is no data transfer that can be bundled with the data 210, in accordance with the predefined communication criteria. As a result, the UE communication management component 110 can transmit the data 210 at its scheduled time in a data burst without bundling any other data transfers with the data 210, as shown in $W_2$, which is the data traffic flow illustrating the bundling (e.g., piggybacking) of certain data transfers (as shown in FIG. 2), in accordance with the predefined communication criteria.

In analyzing the respective data transfer parameters of the data traffic, the UE communication management component 110 can determine that Ad1 202 cannot be bundled with any other data transfer, because there is no data transfer scheduled between time $t_1-30$ seconds and time $t_1+30$ seconds. The UE communication management component 110 can wait to transmit Ad1 202 until after the jitter time window associated with the Ad1 202 has expired, for example, in case the UE communication management component 110 identifies another piece of data that is to be or can be transferred during the jitter time window associated with the Ad1 202. As a result, the UE communication management component 110 can communicate Ad1 202 at time $t_1+30$ seconds, as shown in $W_2$.

As part of the analysis of the respective data transfer parameters of the data traffic, the UE communication management component 110 can determine that Ad2 204 can be bundled with data 212, since the data 212 is scheduled to be communicated during the jitter time window (e.g., jitter time period) associated with Ad2 204. As desired, the UE communication management component 110 can schedule the data transfer for the Ad2 204 at any desired time in its jitter time window (or at the tail end of its jitter time window). For instance, since the data transfer for Ad2 204 is expected to go beyond the end of the data transfer for data 212, the data transfer for Ad2 204 can be modified, as shown in $W_2$. As a result of the bundling of Ad2 204 with the data 212 in the same data burst, the UE communication management component 110 can perform the data transfer of the data burst, comprising the Ad2 204 and data 212 beginning at the scheduled time for data transfer of the data 212.

As part of the analysis of the respective data transfer parameters of the data traffic, the UE communication management component 110 can determine that the Ad3 206 and Ad4 208 can be bundled with data 214, in accordance with the predefined communication criteria, as the UE communication management component 110 can identify that the data 214 is scheduled to be communicated during a jitter time window associated with Ad3 206, and the data transfer of the data 214 is scheduled to continue until the beginning of the jitter time window associated with Ad4 208 (as shown in $W_2$), so, if the transfer time of Ad4 208 is shifted to the beginning of its jitter time window, the data burst can span to the end of the transfer of Ad4 208. As a result, the UE communication management component 110 can bundle Ad3 206 and Ad4 208 with data 214, and they can be communicated in a single data burst, as shown in $W_2$.

As a result of bundling of data transfers, as shown in $W_2$, as compared to the original scheduling of data transfers, as shown in $W_0$, the system 100 can realize energy savings and time savings relating to state transitions relating to the UE 102. For example, there can be energy reduction of 19.3% by the UE 102 by bundling data transfers as shown in $W_2$, as compared to the original scheduling of data transfers, as shown in $W_0$; and time savings in state transitions of 19.6% associated with the UE 102 by bundling data transfers as shown in $W_2$, as compared to the original scheduling of data transfers, as shown in $W_0$. Further, as a result of bundling of data transfers, the disclosed subject matter can reduce the amount of signal loading associated with the UE (e.g., by the UE, by the communication network), as compared to conventional communication systems. Other aspects of grouping data transfers, fast dormancy, and TOP will be described herein with regard to the disclosed subject matter of the other figures.

Figure 3:
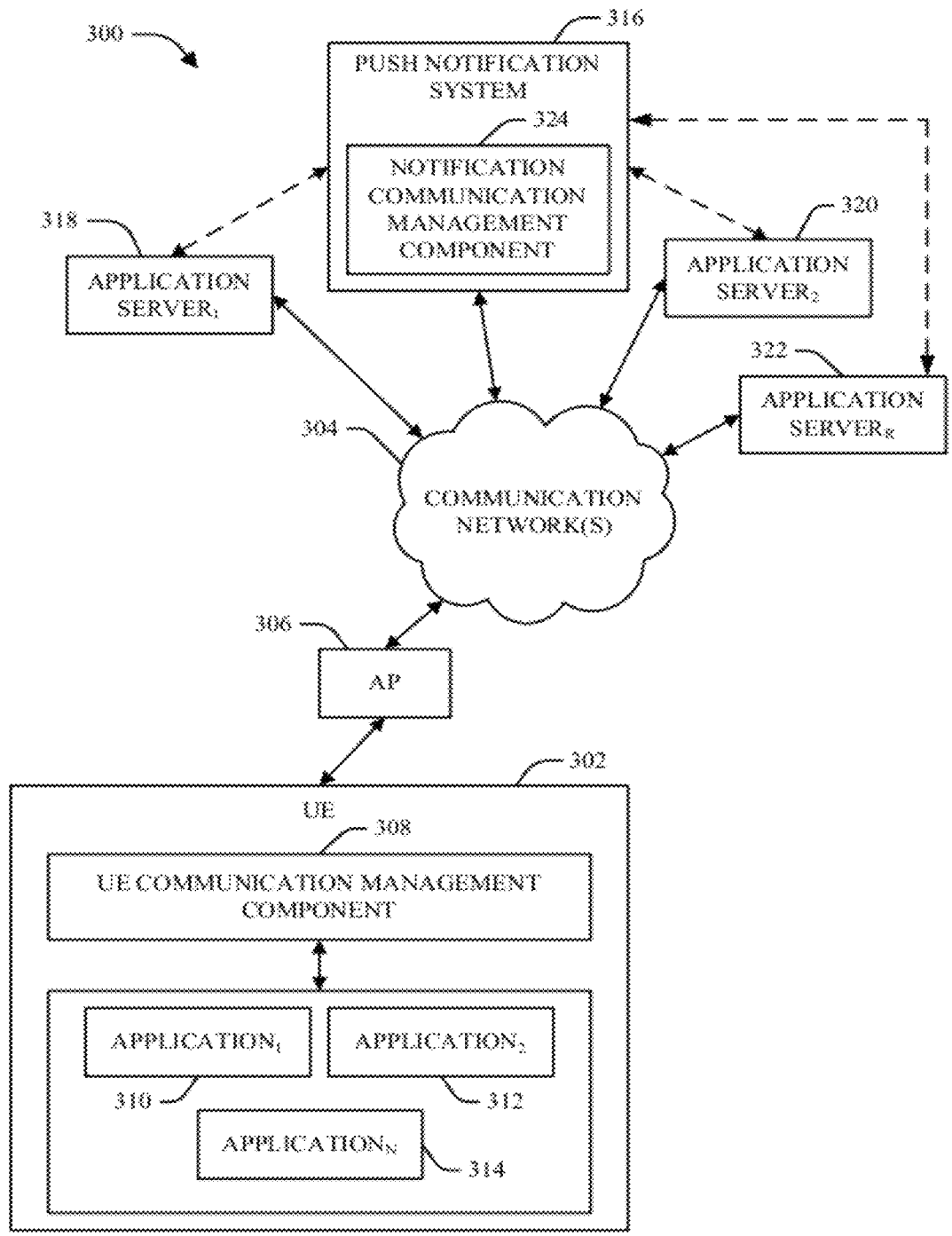
FIG. 3 illustrates a block diagram of an example system that can desirably control scheduling of data transfers relating to a network device (e.g., UE) in accordance with various aspects and embodiments described herein.

FIG. 3 illustrates a block diagram of an example system 300 that can desirably control scheduling of data transfers relating to a network device (e.g., UE) in accordance with various aspects and embodiments described herein. In accordance with various aspects, the system 300 can be employed to bundle data transfers associated with push notifications relating to one or more applications associated with a UE, in accordance with the predefined communication criteria. The system 300 can include a UE 302 that can be communicatively connected to a communication network 304 via a communication connection with AP 306, which can be communicatively connected with the communication network. The UE 302 can include a UE communication management component 308, and a plurality of applications, comprising $application_1$ 310, $application_2$ 312, up to $application_N$ 314, that can be used by the UE 302 and UE user to perform a variety of desired functions and/or provide desired information to the UE user. The UE 302, communication network 304, AP 306, UE communication management component 308, and the plurality of applications, $application_1$ 310, $application_2$ 312, up to $application_N$ 314, each can be the same as or similar to, or can comprise the same or similar functionality as, respective components (e.g., respectively named components), such as described herein with regard to the disclosed subject matter.

In an aspect, the system 300 can comprise a push notification system 316, which can be or can comprise a push notification server, that can manage communication of push notifications relating to various applications associated with communication devices, such as UE 302, operating in the communication network environment, in accordance with the predefined communication criteria, as described herein. The push notification system 316 can be communicatively connected to the communication network 304 to facilitate communication between the push notification system 316 and communication devices, such as UE 302.

The system 300 also can contain a plurality of application servers, such as $application\ server_1$ 318, $application\ server_2$ 320, up through $application\ server_R$ 322, wherein each application server can be respectively associated with one or more applications to provide, for example, video content, audio content, e-mail, information relating to a social network, news information, or provide (or receive) other information or perform other functions for or in relation to communication devices, such as UE 302, and wherein R can be virtually any desired integer number. The plurality of application servers, such as $application\ server_1$ 318, $application\ server_2$ 320, up through $application\ server_R$ 322, can be communicatively connected to the communication network 304 via respective communication channels to facilitate data communications between respective application servers and communication devices, such as UE 302 and the push notification system 316, and, optionally, can have a direct communication path with the push notification system 316.

Conventionally, when setting up push notifications relating to an application for a UE, the UE (e.g., the client) registers push-notification service by sending a message to the push notification server. The message contains application-specific information (e.g., login information for the e-mail account) and a callback function that is called when the UE is notified. The push notification server communicates with the application server (e.g., e-mail server) by providing the application-specific information to the application server. The push notification server establishes a TCP connection with the UE. Keep-alive messages are periodically exchanged between the push notification server and UE to ensure that the TCP connection does not time out by the cellular firewall. All applications running on the same UE share a single TCP connection. When a new message (e.g., e-mail) associated with the UE and/or UE user) is received by the application server, the application server sends a message to notify the push notification server that a new message has been received, and the push notification server then immediately transmits a push notification, which provides notice of the new message, to the UE. When receiving the notification, the UE application decides what to do next (e.g., fetch the entire email content, or take other action). As desired, the UE user can use the UE to turn off the push notification services, or switch to pull-based mode for querying new messages or other information.

In conventional systems, push notifications of an application are immediately sent to the UE when there is information to be pushed to the UE, and thus the push notifications are sent to the UE without regard to scheduling of sending push notifications associated with other applications to the UE. Because of this, there often can be instances where a push notification relating to one application is sent in one data burst to the UE, and in close proximity to the time that the data burst ended, another data burst, comprising another push notification relating to another application, is sent to the UE. As disclosed herein, separate data bursts can result in separate state transitions by, and separate operations to allocate network radio resources for, the UE. As a result of sending a push notification without regard to the scheduling of sending other push notifications, there can be unnecessary data bursts and state transitions associated with the UE, unnecessary signaling between the UE and the communication network, unnecessary use of network radio resources by the UE, unnecessary operations performed by the UE and communication network, and unnecessary power consumption by the UE. The disclosed subject matter can overcome these and other deficiencies of conventional communication systems and devices.

In accordance with various aspects and embodiments, the push notification system 316 can comprise a notification communication management component 324 that can desirably (e.g., optimally) control scheduling and/or batching (e.g., grouping, bundling, piggybacking) of data transfers, including push notifications, relating to one or more applications (e.g., application$_1$ 310, application$_2$ 312, application$_N$ 314) utilized by the UE 102 and respectively associated with the application servers (e.g., application server$_1$ 318, application server$_2$ 320, application server$_R$ 322), based at least in part on a subset of data transfer parameters, comprising jitter parameter information (e.g., associated with the respective applications), in accordance with predefined communication criteria, to reduce the number of data bursts employed to communicate data (e.g., push notifications) between the UE 102 and the communication network 104 (and the push notification system 316). In another aspect, the notification communication management component 324 can be part of or can operate in conjunction with the operating system (OS) of the push notification system 316 to facilitate controlling scheduling and/or bundling of data transfers associated with the push notification system 316.

For each application (e.g., application$_1$ 310, application$_2$ 312, application$_N$ 314), when setting up push notifications relating to an application for a UE 302, the UE 302 can register push notification service by sending a message requesting to register push notification service for the application to the push notification system 316. The message can include application-specific information (e.g., login or authentication information for an account associated with the UE and/or UE user, wherein the account can be maintained or managed by the application server) and a callback function that can be called when the UE 302 is to be sent a push notification. The push notification system 316, employing the notification communication management component 324, can communicate with the application server (e.g., application server$_1$ 318, application server$_2$ 320, application server$_R$ 322) by providing the application-specific information to the application server. The push notification system 316 can establish a TCP connection with the UE 302. Keep-alive messages can be periodically exchanged between the push notification system 316 and the UE 302 to ensure that the TCP connection does not time out by the cellular firewall. All applications, or at least a desired portion of the applications, running on the UE 302 can share a single TCP connection.

For instance, when a new message (e.g., e-mail) associated with the UE 302 (and/or UE user) is received by the application server (e.g., application$_1$ 310), the application server can communicate a notification message to notify the push notification system 316 that a new message has been received by the application server. In accordance with various aspects, and as more fully disclosed herein, the push notification system 316, utilizing the notification communication management component 324, can analyze data transfer parameters, including a jitter parameter, associated with the message (and/or associated with the application and/or application server) to determine whether transmission of the push notification relating to the message to the UE 302 can be delayed and, if so, the amount of time that the push notification can be delayed, in accordance with the jitter parameter. For example, if the jitter parameter associated with the message (and application) is set to j seconds, the notification communication management component 324 can determine that the push notification (e.g., first push notification) can be transmitted to the UE 302 at any time from immediately at time $t_0$, through time $t_0+j$, wherein that time period can be a jitter time window. For instance, the notification communication management component 324 can schedule the push notification to be sent out at time $t_0+1$, and can wait to see if any other messages associated with the UE 302 are received from the same application server or another application server(s) (e.g., application server$_1$ 318, application server$_2$ 320, application server$_R$ 322) during the jitter time window. If any other messages associated with the UE 302 are received by the push notification system 316 from an application server(s) during the jitter time window, the notification communication management component 324 can bundle the push notification(s) relating to such other messages with the first push notification (associated with the jitter time window), wherein the notification communication management component 324 can transmit the bundled push notifications in a single data burst to the UE 302, and wherein the respective push notifications in the bundle can provide respective notice of respective messages or other information at or associated with the respective application servers. If no other message associated with the UE 302 is received during the jitter time window associated with the first push notification, the notification communication management component 324 can transmit the first push notification by itself to the UE 302 at time $t_0+j$.

After receiving the notification, the UE application can make a decision regarding what action, if any, to take next (e.g., fetch the entire e-mail content, or take other action). As desired, the UE user can use the UE 302 to turn off the push notification services, modify the jitter parameter (e.g., to modify the amount of delay in the sending of a push notification by the push notification system 316), or switch to pull-based mode for querying new messages (e.g., e-mail) or other information. For example, the UE 302 can transmit a request to modify the jitter parameter to the push notification system 316 to request that the push notification system 316 change the jitter parameter from a first jitter parameter value to a second (e.g., different) jitter parameter value.

In accordance with various aspects, the data transfer parameters associated with push notifications can include, for example, an application data parameter (also referred to herein as "appdata"), a call back parameter (also referred to herein as "callback"), and a jitter parameter (also referred to herein as "jitter"). The application data parameter can specify the type(s) or amount(s) of application data that is to be included in the push notification.

The call back parameter can be used to specify which function(s) (e.g., push notification, type of push notification, etc.) is to be called or performed in relation to a data transfer associated the application. The call back parameter can be set to a value (e.g., name or alphanumeric value) associated with (e.g., that identifies) a function (e.g., a specified push notification function) that can be called to facilitate performing a desired data transfer, such as a desired push notification.

The jitter parameter can specify the amount of time that the data transfer can be delayed. The jitter is essentially the amount of leeway (e.g., the margin of deviation) from the scheduled transfer time (e.g., scheduled for immediate transfer) the application or associated UE 302 is able to accept in relation to communication of the data transfer (e.g., push notification). For instance, if a push notification associated with an application is received by the push notification system 316, and/or is ready for transmission to the UE 302, at time $t_0$, and the jitter parameter is 30 seconds, the push notification can be transmitted at any time from time $t_0$ through $t_0+30$ seconds. Typically, the notification communication management component 324 will transmit the push notification to the UE 302 at time $t_0+j$, although, as desired, the notification communication management component 324 can transmit the push notification to the UE 302 prior to time $t_0+j$, when such a different transmission time is specified by the predefined communication criteria. In an aspect, respective jitter parameters can be associated with respective applications (e.g., application$_1$ 310, application$_2$ 312, application$_N$ 314), wherein, for example, a first application (e.g., application$_1$ 310) can be associated with a first jitter parameter (e.g., 30 seconds of delay), and a second application (e.g., application$_2$ 312) can be associated with a second jitter parameter (e.g., one minute of delay), which can be different than or the same as the first jitter parameter.

In yet another aspect, to facilitate improving operations relating to push notifications by the push notification system 316 to communication devices, such as the UE 302, it can be desirable to specify a longer jitter time as opposed to a shorter jitter time, as the longer jitter time can result in the notification communication management component 324 having more flexibility in scheduling data transfers that have a longer jitter time, which can result in more opportunities to bundle data transfers together and consequently result in less data bursts associated with data transfers. The time length of the jitter parameter can be set in accordance with the predefined communication criteria, and typically can be set by the application developer and/or the UE user via the UE 302, and/or can be updated and modified via an application update or a request to modify the jitter parameter from the UE 302 to the push notification system 316.

In an aspect, the push notification system 316 can receive push notifications from the various application servers associated with the communication network environment. The notification communication management component 324 can analyze data transfer parameters respectively associated with each of the received push notifications to facilitate scheduling and/or bundling of the push notifications (or other types of data transfers) to communicate the push notifications to the UE 302 or other communication devices associated with the push notification system 316 to which the respective push notifications are to be delivered, in accordance with the predefined communication criteria.

In another aspect, when a first data transfer (e.g., first push notification) associated with a first application (e.g., application$_1$ 310) and first application server (e.g., application server$_1$ 318) is to be scheduled for transmission to the UE 302 by the notification communication management component 110, the notification communication management component 324 can analyze data transfer parameters (e.g., a jitter parameter) associated with the first data transfer, and also can analyze respective data transfer parameters of one or more other data transfers (e.g., other push notifications) respectively associated with one or more other applications (e.g., application 312, application$_N$ 314) or the first application and/or associated with one or more other application servers (e.g., application server$_2$ 320, application server$_R$ 322) to determine whether any of the one or more other data transfers can be transmitted during the same data burst as the first data transfer to mitigate (e.g., reduce, minimize) the number of data bursts communicated to send all of the data transfers analyzed by the notification communication management component 324, mitigate the number or type of communication state transitions associated with the UE 302 in performing such data transfers, reduce signal loading associated with the UE 302, reduce power consumption by the UE 302, etc.

Depending in part on the type of data transfer, the other data transfers can be associated with the same type or different types of data transfer parameters as the first data transfer.

For example, it can be desired to communicate the first data transfer, comprising a specified number of data packets in accordance with a first set of data transfer parameters, wherein the application data parameter is set to a value to indicate the type or amount of data to include in the data transfer, the transfer start time parameter is set to time $t_0$, the call back parameter is set to "push notification" associated with a push notification function(s), and the jitter parameter is set to 30 seconds, which means the amount of acceptable delay in transmitting the push notification to the UE is 30 seconds. As a result, if the push notification is ready for communication to the UE 302 at time $t_0$, the push notification can be delayed for up to 30 seconds from that time and can be sent as late as time $t_0+30$ seconds. In preparing to schedule the first data transfer, the notification communication management component 324 can analyze the first set of data transfer parameters, and the data transfer parameters of any other data transfers that are to be communicated to the UE 302 of which the notification communication management component 324 is aware.

For instance, at time $t_0+15$ seconds, the notification communication management component 324 can receive a second message relating to a second push notification associated with a second application (e.g., application 312) and second application server (e.g., application server$_2$ 320), wherein the second push notification is associated with a second set of data transfer parameters, wherein the application data parameter is set to a value to indicate the type or amount of data to include in the data transfer, the call back parameter is set to "push notification", and the jitter parameter is set to 30 seconds; at time $t_0+25$ seconds, can receive a third message relating to a third push notification associated with a third application (e.g., application$_3$) and associated with a third application server (e.g., application server$_3$), wherein the third push notification is associated with a third set of data transfer parameters, wherein the application data parameter is set to a value to indicate the type or amount of data to include in the data transfer, the call back parameter is set to "push notification", and the jitter parameter is set to 30 seconds; and at time $t_0+40$, can receive a fourth message relating to a fourth push notification associated with a fourth application (e.g., application$_4$) and fourth application server (e.g., application server$_4$), wherein the fourth push notification is associated with a fourth set of data transfer parameters, comprising an application data parameter set to a value to indicate the type or amount of data to include in the data transfer, the call back parameter set to "push notification", and the jitter parameter set to 30 seconds.

The notification communication management component 324 can analyze the first set of data transfer parameters and can determine that the first push notification can be sent to the UE 302 as late as time $t_0+30$ seconds. Based at least in part on the analysis, the notification communication management component 324 can determine that the first data transfer (e.g., first push notification) can be grouped (e.g., batched, bundled, piggybacked) with the second data transfer (e.g., second push notification) because the second data transfer was received at time $t_0+15$ seconds, which is within the jitter time window of the first data transfer; and can determine that the first data transfer can be grouped with the third data transfer (e.g., third push notification) because the third data transfer was received by the notification communication management component 324 (and/or processed for transmission to the UE 302) at time $t_0+25$ seconds which is within the jitter time window of the first data transfer.

Based at least in part on the results of this analysis, the notification communication management component 324 can bundle together the first data transfer, second data transfer, and third data transfer, and these data transfers can be communicated by the notification communication management component 324 to the UE 302 in a single data burst at time $t_0+30$ seconds (or another desired time within the jitter time window associated with the first data transfer). The notification communication management component 324 can place the first data transfer, second data transfer, and third data transfer in a specified order in the queue (e.g., data transfer queue), and these data transfers can be communicated by the notification communication management component 324 at the scheduled time (e.g., time $t_0+30$ seconds). Since the fourth data transfer was not received and processed by the notification communication management component 324 prior to time $t_0+30$ seconds, the notification communication management component 324 can communicate the fourth data transfer as part of a separate data burst, the fourth data transfer can be inserted in a desired place in the queue, and it can be communicated at a desired time, which can be as late as time $t_1+30$ seconds, with time $t_1$ being time $t_0+40$ seconds, although typically the fourth data transfer will be transmitted at time $t_1+30$ seconds so that the notification communication management component 324 can wait to see if another data transfer can be grouped with the fourth data transfer in the same data burst, in accordance with the predefined communication criteria.

As can be seen, the notification communication management component 324 can facilitate performing the four data transfers in only two data bursts, as compared to conventional systems and devices, which would use four data bursts to perform the four data transfers. As a result, the system 300 can reduce the number of data bursts needed to communicate these data transfers, reduce the amount of network resources used or allocated to the UE 302 in relation to these data transfers, reduce the number of state transitions associated with the UE 302 in relation to communication of these data transfers, reduce signal loading associated with the UE 302, and reduce the power consumption of the UE 302 in relation to communication of these data transfers, as compared to conventional communication and push notification systems.

In an aspect, to facilitate identifying respective data transfer parameters and bundling of data transfers, the system 300 can employ a desired data transfer API (e.g., push notification API) that can identify or specify the data transfer parameters associated with an application(s) (e.g., application$_1$ 310, application$_2$ 312, application$_N$ 314) or application server(s) (e.g., application server$_1$ 318, application server$_2$ 320, application server$_R$ 322). In another aspect, a data transfer API can be communicated to and received by the notification communication management component 324 by the UE 302 (e.g., via the UE communication management component 308) when an associated application is being set up on the UE 302 and/or when the data transfer API has been updated or modified. The notification communication management component 324 can initialize, call, and/or run the data transfer API, for example, when the notification communication management component 324 receives a data transfer (e.g., push notification) associated with an application and destined for the UE 302. In an aspect, the data transfer API can specify the various data transfer parameters relating to the data transfers associated with the application. For instance, the data transfer API can specify an application data parameter to indicate the type(s) or amount of data to be included in the data transfer; can specify a call back parameter that can indicate a function to call or perform in relation to executing a data transfer; and/or can specify a jitter parameter that can indicate the allowed or acceptable amount of delay in transmitting the data transfer (e.g., push notification) from the push notification system 316 to the UE 302. The notification communication management component 324 can utilize the data transfer APIs of respective applications to facilitate identifying the data transfer parameters associated with respective data transfers associated with the applications, and facilitate controlling the scheduling and bundling of data transfers, in accordance with the predefined communication criteria.

In an embodiment, the data transfer API can be RegisterPushNotification(appdata, callback, jitter), wherein such data transfer API can be used to register push notifications in accordance with the data transfer parameters, including an application data parameter, call back parameter, and jitter parameter, contained in RegisterPushNotification(appdata, callback, jitter). It is to be appreciated that RegisterPushNotification(appdata, callback, jitter) is but one example of a data transfer API, and, in accordance with other embodiments, other types of data transfer APIs (e.g., having different data transfer parameters, having a different data transfer API name, etc.) can be utilized in accordance with the disclosed subject matter, and all such data transfer APIs are contemplated by and are part of the disclosed subject matter.

Figure 4:
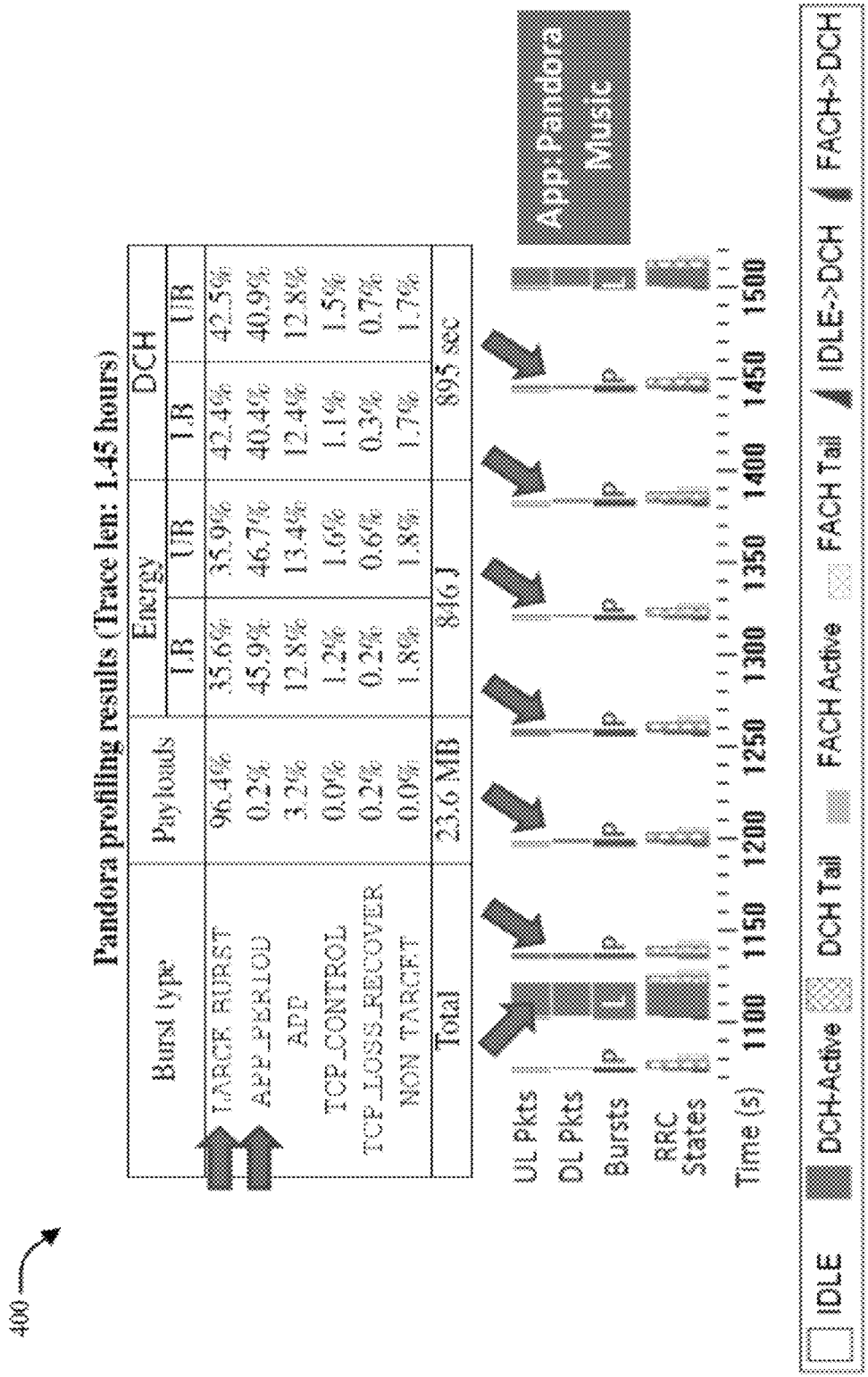
FIG. 4 illustrates a diagram of example profiling results associated with periodic transfers associated with an application.

FIG. 4 illustrates a diagram of example profiling results 400 associated with periodic transfers associated with an application (e.g., music provider application). As shown in the profiling results 400, there can be a number of periodic data transfers (P) communicated via respective data bursts at periodic times. For each data burst, the UE can transition from an IDLE state to a DCH-active state (e.g., high power active communication state), wherein there can be a "ramp up" time involved with that state promotion. The data burst can be communicated while the UE is in the DCH-active state, wherein there can be a DCH tail of a specified tail time after the data burst is communicated. The UE can be transitioned to the FACH-active state after the DCH tail expires, wherein there can be a FACH tail having its own specified tail time. After the FACH tail time expires, the UE can be transitioned to the IDLE state. As can be seen in the profiling results 400, including the accompanying data results, conventionally there can be high resource overhead relating to the periodic bursts (e.g., periodic audience measurements).

The disclosed subject matter, by controlling the scheduling of data transfers (e.g., delaying or advancing the scheduling of data transfers) and/or bundling of data transfers (e.g., bundling data transfers with other more time-sensitive data transfers) into single data bursts, and/or employing fast dormancy in accordance with TOP, in accordance with the predefined communication criteria, can facilitate mitigating resource overhead associated with periodic data transfers.

Figure 5:
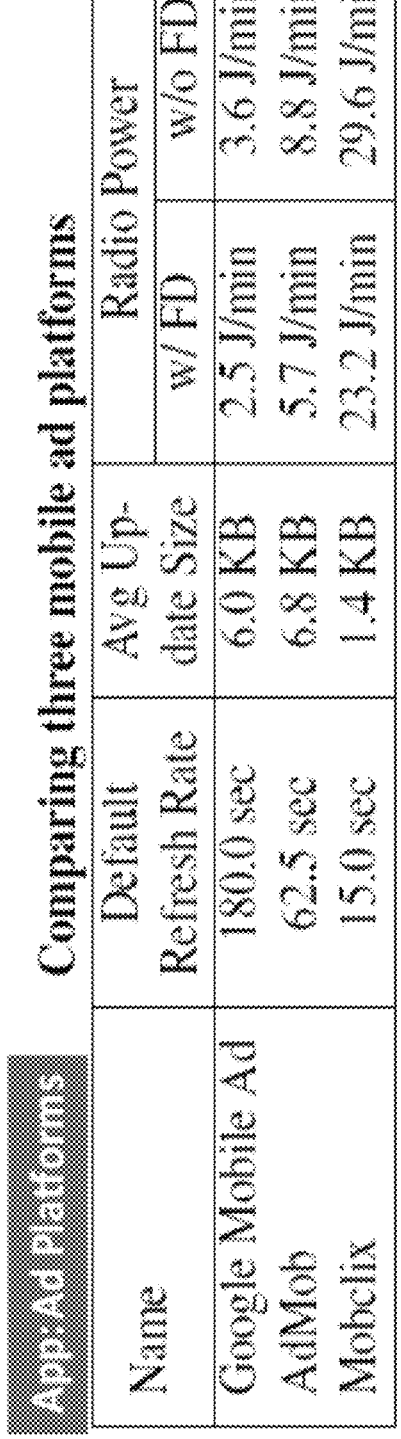
FIG. 5 depicts a diagram of example results relating to respective performance of certain mobile advertisement platforms with regard to periodic data transfers involving advertisements.
Figure 5:
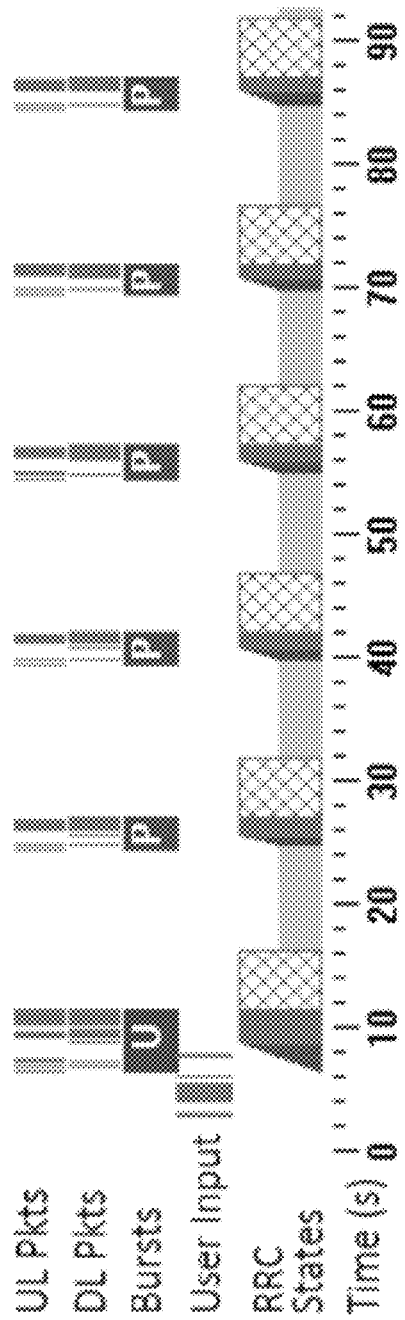

FIG. 5 depicts a diagram of example results 500 relating to respective performance of certain mobile advertisement (ad) platforms with regard to periodic data transfers involving advertisements. The results 500 illustrate the periodic transmitting of periodic data bursts (P), wherein the results 500 show the transition of the UE from the IDLE state to the DCH-active state, the DCH tail time, the transition to the FACH-active state, and the transition from the FACH-active state back to the DCH-active state when the next periodic data burst is communicated. As can be seen in the results 500, the aggressive advertisement refresh rates of the respective mobile ad platforms can result in the UE persistently occupying radio channels (e.g., DCH channel or FACH channel).

As a result the UE is being used inefficiently and is unnecessarily consuming too much power and too much network radio resources.

The disclosed subject matter, by controlling the scheduling of data transfers (e.g., delaying or advancing the scheduling of data transfers) and/or bundling or batching of data transfers (e.g., bundling data transfers with other more time-sensitive data transfers) into single data bursts, and/or employing fast dormancy in accordance with TOP, in accordance with the predefined communication criteria, can facilitate reducing the amount of power consumed by the UE and the amount of network radio resources used by the UE with regard to periodic data transfers. In another aspect of the disclosed subject matter, advertisement refresh rates can be controlled (e.g., increasing periodicity associated with advertisement refresh), as more fully disclosed herein to facilitate more efficient operation of a UE.

Figure 6:
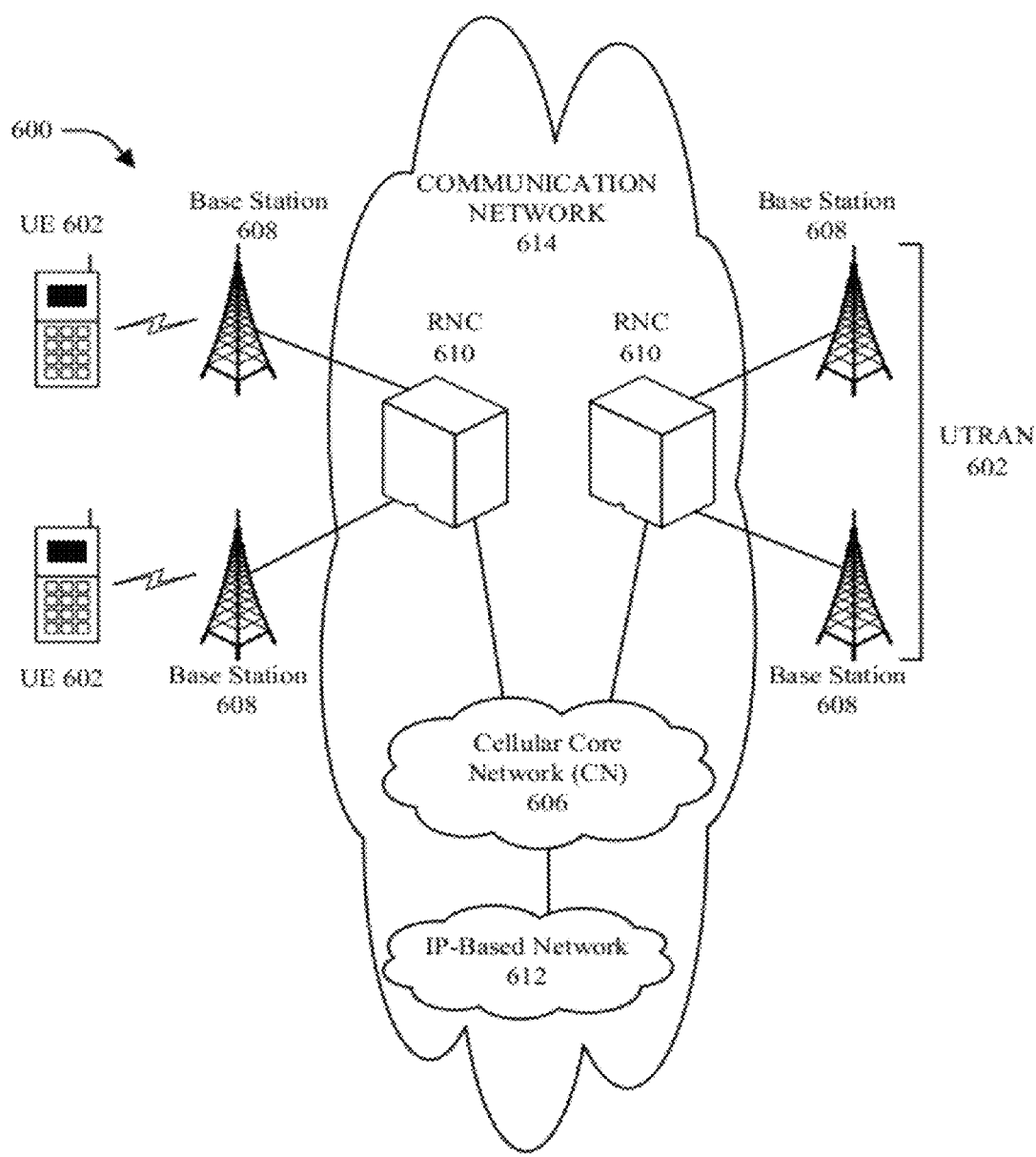
FIG. 6 illustrates a diagram of an example wireless network environment in which various aspects described herein can function.

Referring briefly to FIG. 6, depicted is a diagram of an example UMTS network 600 that can facilitate desired operation of a UE in accordance with various aspects and embodiments. The UMTS network 600 can be employed to facilitate the scheduling and/or bundling of data transfers associated with communication devices (e.g., UEs), the implementation of fast dormancy and TOP, and/or other techniques for managing operations of a UE (e.g., the operating state of a UE) in a communication network environment.

As illustrated by FIG. 6, the UMTS network 600 can include three subsystems: UEs 602, the UMTS Terrestrial Radio Access Network (UTRAN) 604, and the Core Network (CN) 606. As used in UMTS network 600, UEs 602 can be mobile handsets that interact with end users, and/or any other suitable device(s). In one example, UTRAN 602 can enable connectivity between UE 602 and CN 606. UTRAN 602 can include two components: base stations 608, and Radio Network Controllers (RNCs) 610, which provide control functionalities for multiple base stations 608. In one example, a substantial number of the features of UTRAN 602 (e.g., packet scheduling, radio resource control, handover control, etc.) can be implemented at the RNC 610. In another example, the centralized CN 606 can be regarded as the backbone of the cellular network and can serve as an interface to other networks, such as an Internet Protocol (IP)-based network 612 (e.g., Internet), wherein the CN 606 and IP-based network 612 can be part of a communication network 614.

Returning briefly to FIG. 1 and FIG. 3 in the context of UMTS network 600, the term "radio resource" as used herein can refer to the Wideband CDMA (WCDMA) code space, the UTRAN transmission power, and/or other factors that are potential bottlenecks of the network. To efficiently utilize the limited radio resources, the UMTS radio resource control (RRC) protocol can introduce a state machine associated with each UE (e.g., UE 102, UE 302). By way of example, the RRC state machine can utilize three RRC states—IDLE, CELL_FACH, and CELL_DCH, as shown by diagrams 502 and 504 in FIG. 7.

Figure 7:
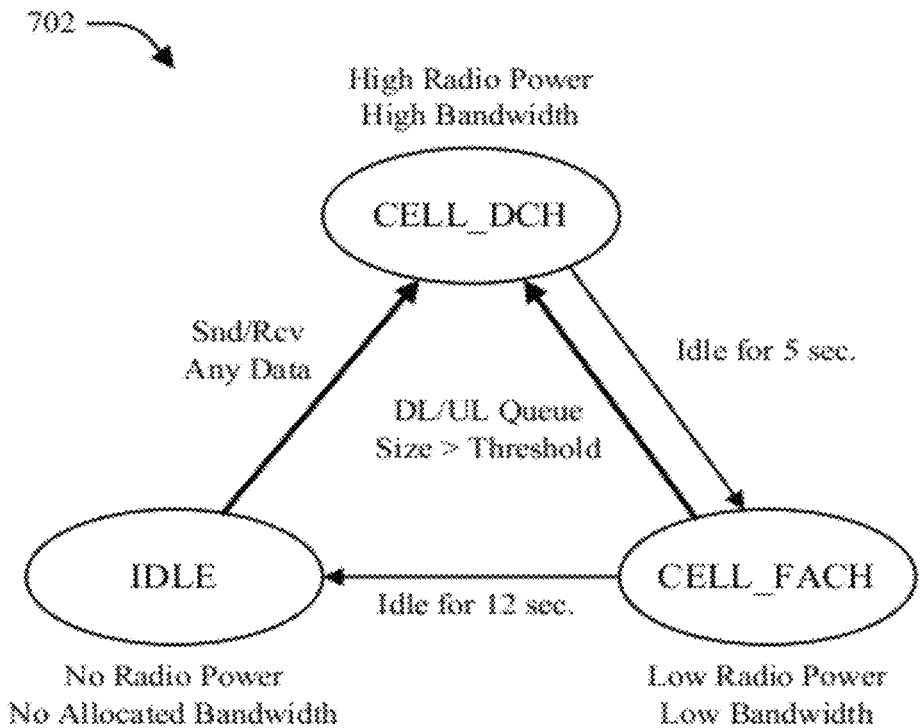
FIG. 7 illustrates a diagram of example state transition schemes that can be utilized by a wireless terminal in accordance with various aspects.
Figure 7:
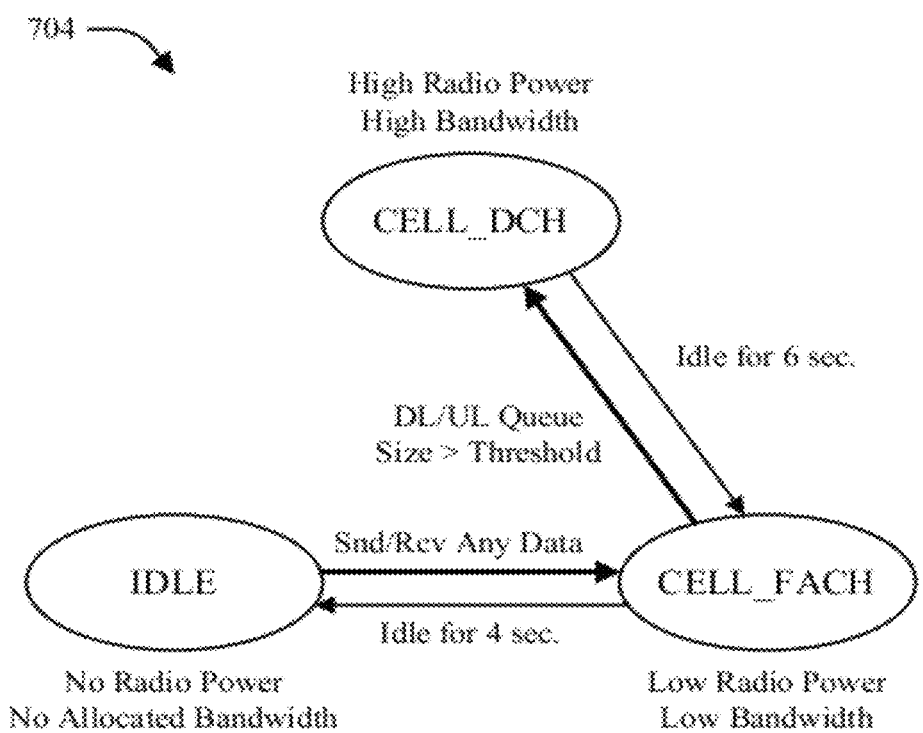

Referring to FIG. 7, as shown in diagrams 702 and 704, IDLE can be the default state of the UE when the UE is turned on. In this state, the UE (e.g., 102) has not established an RRC connection with the RNC; thus, no radio resource is allocated and the UE cannot transfer any data.

In the CELL_DCH state (also referred to herein as a "high power active communication state" or "DCH state"), the RRC connection is established and a UE can be allocated dedicated DCH transport channels in both DL, e.g., RNC to UE, and UL, e.g., UE to RNC. The DCH state can allow the UE to fully utilize the radio resources for user data transmission. In one example, when a large number of UEs are in the DCH state, the radio resources can in some cases be exhausted due to the lack of channelization codes in the cell. As a result, some UEs may be required to use low-speed shared channels, although in such a case their RRC states can remain at the DCH state.

In the CELL_FACH state (also referred to herein as a "low power active communication state", or "FACH state"), the RRC connection is established but there is no dedicated channel allocated to the UE. Instead, the UE can only transmit user data through shared low-speed channels (e.g., less than 20 kbps). The FACH is generally designed for applications requiring very low data throughput rate.

In accordance with one aspect, the various RRC states (also referred to herein as communication states or transition states) can impact the radio energy consumption of a UE. For example, as shown by diagrams 702 and 704, a UE at the IDLE state can consume almost no energy from its wireless network interface. While a device (e.g., UE) operates within the same state, the radio power can be substantially stable regardless of the data throughput. In one example, the RRC state machine can be maintained at both the UE and the RNC. In such a case, the two peer entities can be synchronized via control channels except, e.g., during transient and error situations. In another example, both the DL and the UL can utilize the same state machine.

According to another aspect, there can be two types of RRC state transitions. State promotions, including IDLE state to FACH state, IDLE state to DCH state, and FACH state to DCH state, wherein an RNC can switch or transition an associated UE from a state with lower radio resources and UE energy utilization to another state (e.g., higher communication state) consuming more resources and UE energy. Conversely, state demotions, including DCH state to FACH state, FACH state to IDLE state, and DCH state to IDLE state, go in the reverse direction to demote the communication state of the UE and cause the UE to utilize less resources and consume less power. Depending on the starting state, a state promotion can be triggered by differing means. For example, if the UE is at the IDLE state, a state promotion can be triggered by either any user data (as opposed to control data) transmission activity. If the UE is at the FACH state, a state promotion can be triggered by the per-UE queue size, called the Radio Link Controller (RLC) buffer size, exceeding a threshold in either direction, for example.

In another example, state demotions can be triggered by inactivity timers maintained by the RNC. For example, a timer controlling demotion from the DCH state to the FACH state is referred to herein as $\alpha$, and a timer controlling FACH state to IDLE state demotions is referred to herein as $\beta$. At the DCH state, the RNC can reset the $\alpha$ timer to a fixed threshold T whenever it observes any UL/DL data frame. Accordingly, if there is no user data transmission for T seconds, the $\alpha$ timer times out and the communication state of the UE can be demoted from the DCH state to the FACH state. A similar scheme can be used for the $\beta$ timer. As shown by diagrams 702 and 704, the threshold T assigned to timers $\alpha$ and $\beta$ can depend in part on implementation. For example, diagram 702 illustrates a system with $\alpha$ set to 5 seconds (also referred to herein as "sec" or "s") and $\beta$ set to 12 seconds, while diagram 704 illustrates a system with $\alpha$ set to 6 seconds and $\beta$ set to 4 seconds.

It can be appreciated that state promotions can involve more work than state demotions for both the UE and RNC. In particular, state promotions can incur a long "ramp-up" latency of up to 2 seconds, during which tens of control messages are exchanged between a UE and RNC for resource allocation. Excessive state promotions can thus increase the processing overhead at the RNC and degrade user experience, especially for short data transfers.

Diagrams 702 and 704 in FIG. 7 depict state transition diagrams for respective UMTS carriers, herein denoted "Carrier 1" and "Carrier 2," whose state machine parameters (under good signal strength conditions) are listed in Table I below. In accordance with one aspect, such data and/or other information collected via system analysis can be utilized to characterize the tail effect of a system.

TABLE I

Inferred state machine parameters for two example carriers.

|  | Carrier 1 | Carrier 2 |
| --- | --- | --- |
| Inactivity timer |  |  |
| α: DCH to FACH | 5 sec | 6 sec |
| β: FACH to IDLE | 12 sec | 4 sec |
| Promotion time |  |  |
| IDLE to FACH | N/A | 0.6 sec |
| IDLE to DCH | 2 sec | N/A |
| FACH to DCH | 1.5 sec | 1.3 sec |
| RLC Buffer threshold |  |  |
| FACH to DCH (UL) | 543 ± 25 B | 151 ± 14 B |
| FACH to DCH (DL) | 475 ± 23 B | 119 ± 17 B |
| State radio power |  |  |
| DCH/FACH/IDLE | 800/460/0 mW | 600/400/0 mW |
| Promotion radio power |  |  |
| IDLE to FACH | N/A | 410 mW |
| IDLE to DCH | 550 mW | N/A |
| FACH to DCH | 700 mW | 480 mW |

Figure 8:
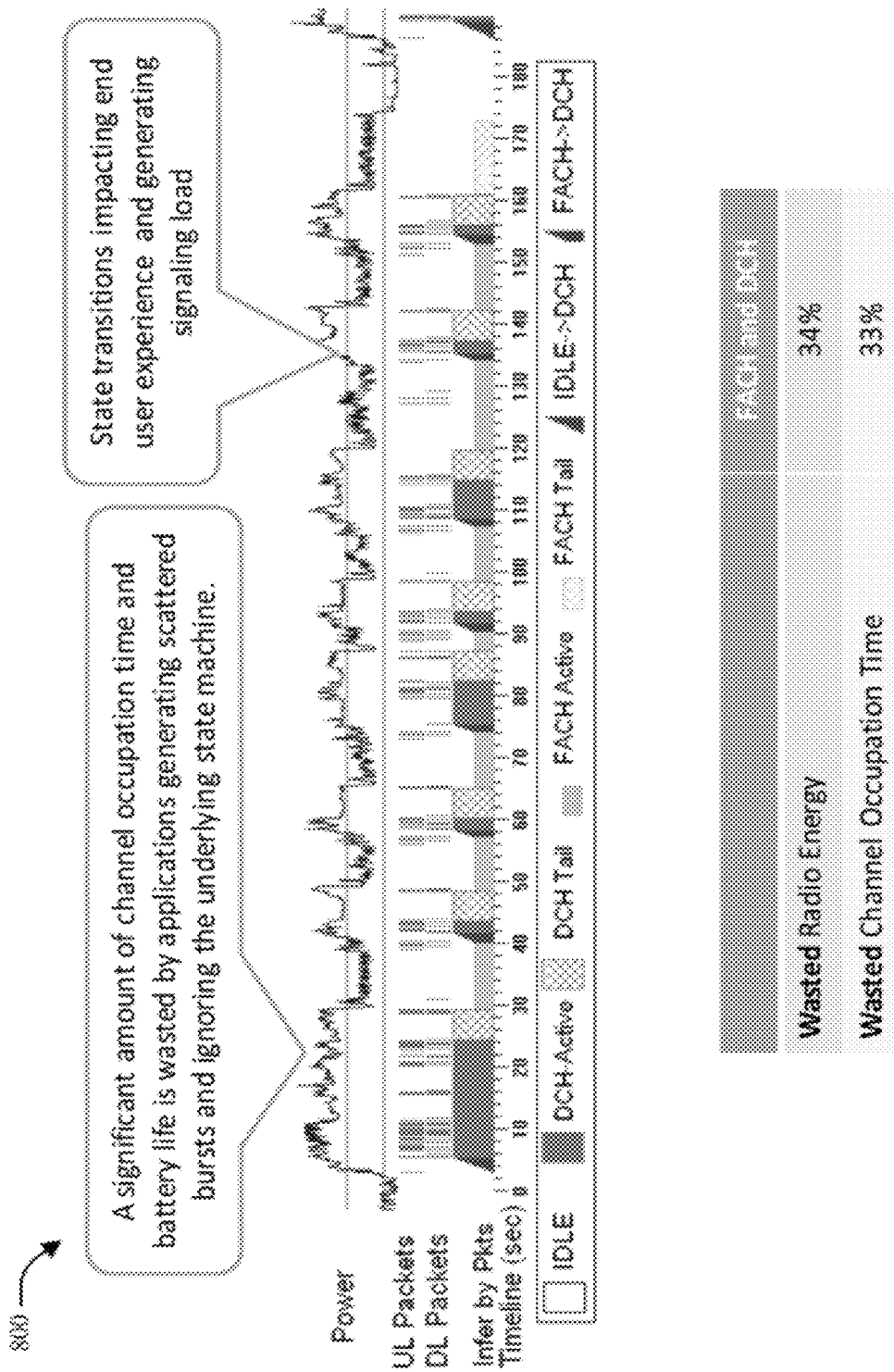
FIG. 8 depicts a diagram of example analysis results showing inefficiencies in resource utilization relating to a conventional wireless communication system.

FIG. 8 depicts a diagram of example analysis results 800 showing inefficiencies in resource utilization relating to a conventional wireless communication system. As can be seen in the example analysis results 800, a significant amount of channel occupation time and battery life associated with a conventional UE is wasted by applications generating many scattered data bursts and ignoring the underlying state machine (e.g., RRC state machine). The analysis results 800 also illustrate how communication state transitions can negatively impact end user experience and generate signaling load. The analysis results 800 indicate that the percentage of wasted energy involving FACH and DCH for the UE was 34% and the percentage of wasted channel occupation time for the UE in relation to FACH and DCH was 33%.

The disclosed subject matter, by controlling the scheduling of data transfers (e.g., delaying or advancing the scheduling of data transfers) and/or bundling or batching of data transfers (e.g., bundling data transfers with other more time-sensitive data transfers) into single data bursts, and/or employing fast dormancy in accordance with TOP, in accordance with the predefined communication criteria, can facilitate reducing the amount of power consumed by the UE and the amount of network radio resources used by the UE, the amount of wasted radio energy, and the amount of wasted channel occupation time with regard to data transfers.

Figure 9:
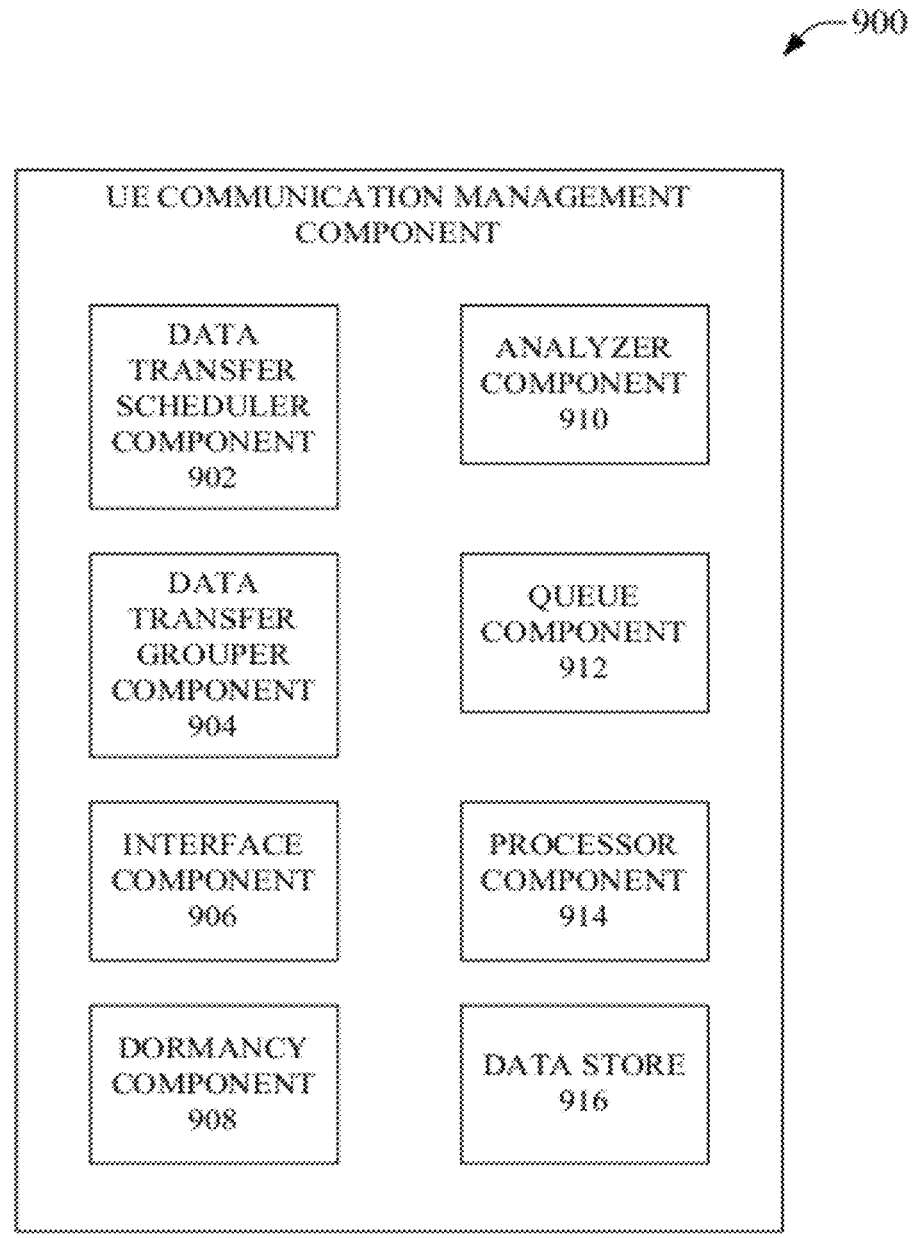
FIG. 9 illustrates a block diagram of an example UE communication management component in accordance with various aspects and embodiments of the disclosed subject matter.

FIG. 9 illustrates a block diagram of an example UE communication management component 900 in accordance with various aspects and embodiments of the disclosed subject matter. The UE communication management component 900 can include a data transfer scheduler component 902 that can be employed to schedule data transfers associated with applications utilized by the UE. The data transfer scheduler component 902 can schedule a data transfer to be executed at its nominal transfer start time or at another desired time (e.g., a time before or after the nominal transfer start time), in accordance with data transfer parameters, comprising jitter information, associated with the data transfer. The scheduling of the data transfers can facilitate bundling a data transfer with another data transfer(s) into a single data burst to facilitate reducing the number of data bursts communicated between the UE and communication network.

In another aspect, the UE communication management component 900 can include a data transfer grouper component 904 that can group or bundle a data transfer with another data transfer(s) into a single data burst when permitted in accordance with the respective data transfer parameters of the respective data transfers and the predefined communication criteria. The data transfer grouper component 904 can operate in conjunction with the data transfer scheduler component 902 to facilitate efficient scheduling and/or bundling of data transfers associated with the UE.

In still another aspect, the UE communication management component 900 can contain an interface component 906 that can be utilized to facilitate interfacing with, interacting with, and/or utilizing a desired API, such as a data transfer API associated with an application or a tail removal API that can be employed as part of a fast dormancy operation in accordance with TOP, to facilitate identifying or obtaining information relating to, and/or facilitate performance of, a data transfer(s) or a dormancy operation. In another aspect, the UE communication management component 900 can comprise a dormancy component 908 that can employ fast dormancy in accordance with TOP to facilitate reducing the amount of tail time (e.g., unnecessary tail time) for the UE during communication operations by the UE, as more fully disclosed herein.

In yet another aspect, the UE communication management component 900 can include an analyzer component 910 that can analyze information, including information relating to data transfer parameters, data transfer requests, application related information, predefined communication criteria (e.g., and corresponding predefined communication rules), etc., to identify or determine when to schedule a data transfer, identify or determine if a data transfer can be bundled with another data transfer(s), identify whether fast dormancy is to be utilized to manage tail time, etc.

In still another aspect, the UE communication management component 900 can include a queue component 912 that can employ one or more queues, including a data transfer queue, wherein respective data packets associated with respective data transfers can be inserted in a specified order to facilitate communication of the data packets in accordance with the scheduling of data transfers, as specified by the data transfer scheduler component 902. The data transfer scheduler component 902 can operate in conjunction with the queue component 912 to insert, order, or re-order data packets in the desired order in the queue component 912, and retrieve data packets from the queue component when its time for such data packets to be communicated.

In another aspect, the UE communication management component 900 can comprise a processor component 914 that can work in conjunction with the other components (e.g., data transfer scheduler component 902, data transfer grouper component 904, interface component 906, dormancy component 908, analyzer component 910, queue component 912, etc.) to facilitate performing the various functions of the UE communication management component 900. The processor component 914 can employ one or more processors, microprocessors, or controllers that can process data, such as information relating to data transfers associated with the UE, information relating to operations of the UE communication management component 900, and/or other information, etc., to facilitate operation of the UE communication management component 900, as more fully disclosed herein, and control data flow between the UE communication management component 900 and other components (e.g., communication network, base station, a server or other communication device, etc.) associated with the UE communication management component 900.

The UE communication management component 900 also can include a data store 916 that can store data structures (e.g., user data, metadata), code structure(s) (e.g., modules, objects, hashes, classes, procedures) or instructions, information relating to data transfers, information relating to operations of the UE communication management component 900, predefined communication criteria (and corresponding predefined communication rules), etc., to facilitate controlling operations associated with the UE communication management component 900. In an aspect, the processor component 914 can be functionally coupled (e.g., through a memory bus) to the data store 916 in order to store and retrieve information desired to operate and/or confer functionality, at least in part, to the data transfer scheduler component 902, data transfer grouper component 904, interface component 906, dormancy component 908, analyzer component 910, queue component 912, and/or substantially any other operational aspects of the UE communication management component 900.

Figure 10:
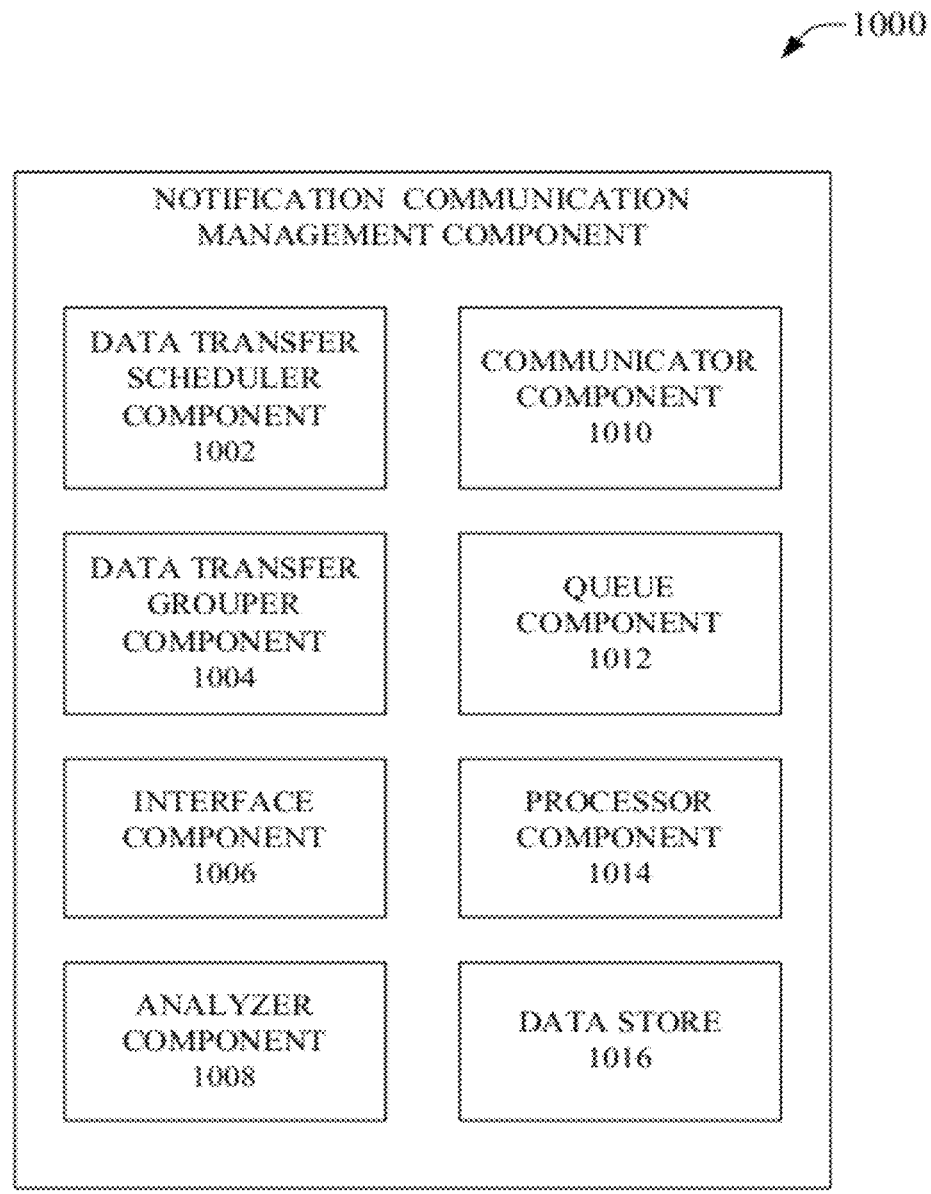
FIG. 10 presents a block diagram of an example notification communication management component in accordance with various aspects and embodiments of the disclosed subject matter.

FIG. 10 presents a block diagram of an example notification communication management component 1000 in accordance with various aspects and embodiments of the disclosed subject matter. The notification communication management component 1000 can include a data transfer scheduler component 1002 that can be employed to schedule data transfers (e.g., push notifications) associated with applications utilized by one or more UEs in a communication network environment. The data transfer scheduler component 1002 can schedule a data transfer to be executed at a desired time (e.g., a time within the jitter time window associated with the data transfer), in accordance with data transfer parameters, comprising jitter information, associated with the data transfer. The scheduling of the data transfers can facilitate bundling a data transfer with another data transfer(s) into a single data burst to facilitate reducing the number of data bursts communicated between the push notification system and the UE via the communication network.

In another aspect, the notification communication management component 1000 can include a data transfer grouper component 1004 that can group or bundle a data transfer with another data transfer(s) into a single data burst when permitted in accordance with the data transfer parameters (e.g., jitter parameter) of the data transfer and the predefined communication criteria. The data transfer grouper component 1004 can operate in conjunction with the data transfer scheduler component 1002 to facilitate efficient scheduling and/or bundling of data transfers to be sent to a UE.

In still another aspect, the notification communication management component 1000 can contain an interface component 1006 that can be utilized to facilitate interfacing with, interacting with, and/or utilizing a desired API, such as a data transfer API associated with an application, to facilitate identifying or obtaining information relating to, and/or facilitate performance of, a data transfer(s). In yet another aspect, the notification communication management component 1000 can include an analyzer component 1008 that can analyze information, including information relating to data transfer parameters, data transfer requests, application related information, predefined communication criteria (e.g., and corresponding predefined communication rules), etc., to identify or determine when to schedule a data transfer, identify or determine if a data transfer can be bundled with another data transfer(s), etc.

In an aspect, the notification communication management component 1000 can include a communicator component 1010 that can establish one or more communication connections to enable the notification communication management component 1000 to transmit data to or receive data from other communication devices in the communication network environment. The communicator component 1010 can communicate via a wireline or wireless communication connection or channel.

In still another aspect, the notification communication management component 1000 can include a queue component 1012 that can employ one or more queues, including a data transfer queue (e.g., push notification queue), wherein respective data packets associated with respective data transfers can be inserted in a specified order to facilitate communication of the data packets in accordance with the scheduling of data transfers, as specified by the data transfer scheduler component 1002. The data transfer scheduler component 1002 can operate in conjunction with the queue component 1012 to insert, order, or re-order data packets in the desired order in the queue component 1012, and retrieve data packets from the queue component when its time for such data packets to be communicated In another aspect, the notification communication management component 1000 can comprise a processor component 1014 that can work in conjunction with the other components (e.g., data transfer scheduler component 1002, data transfer grouper component 1004, interface component 1006, analyzer component 1008, communicator component 1010, queue component 1012, etc.) to facilitate performing the various functions of the notification communication management component 1000. The processor component 1014 can employ one or more processors, microprocessors, or controllers that can process data, such as information relating to data transfers associated with one or more UEs, information relating to operations of the notification communication management component 1000, and/or other information, etc., to facilitate operation of the notification communication management component 1000, as more fully disclosed herein, and control data flow between the notification communication management component 1000 and other components (e.g., communication network, base station, a server, UE, etc.) associated with the notification communication management component 1000.

The notification communication management component 1000 also can include a data store 1016 that can store data structures (e.g., user data, metadata), code structure(s) (e.g., modules, objects, hashes, classes, procedures) or instructions, information relating to data transfers, information relating to operations of the notification communication management component 1000, predefined communication criteria (and corresponding predefined communication rules), etc., to facilitate controlling operations associated with the notification communication management component 1000. In an aspect, the processor component 1014 can be functionally coupled (e.g., through a memory bus) to the data store 1016 in order to store and retrieve information desired to operate and/or confer functionality, at least in part, to the data transfer scheduler component 1002, data transfer grouper component 1004, interface component 1006, analyzer component 1008, communicator component 1010, queue component 1012, and/or substantially any other operational aspects of the notification communication management component 1000.

Figure 11:
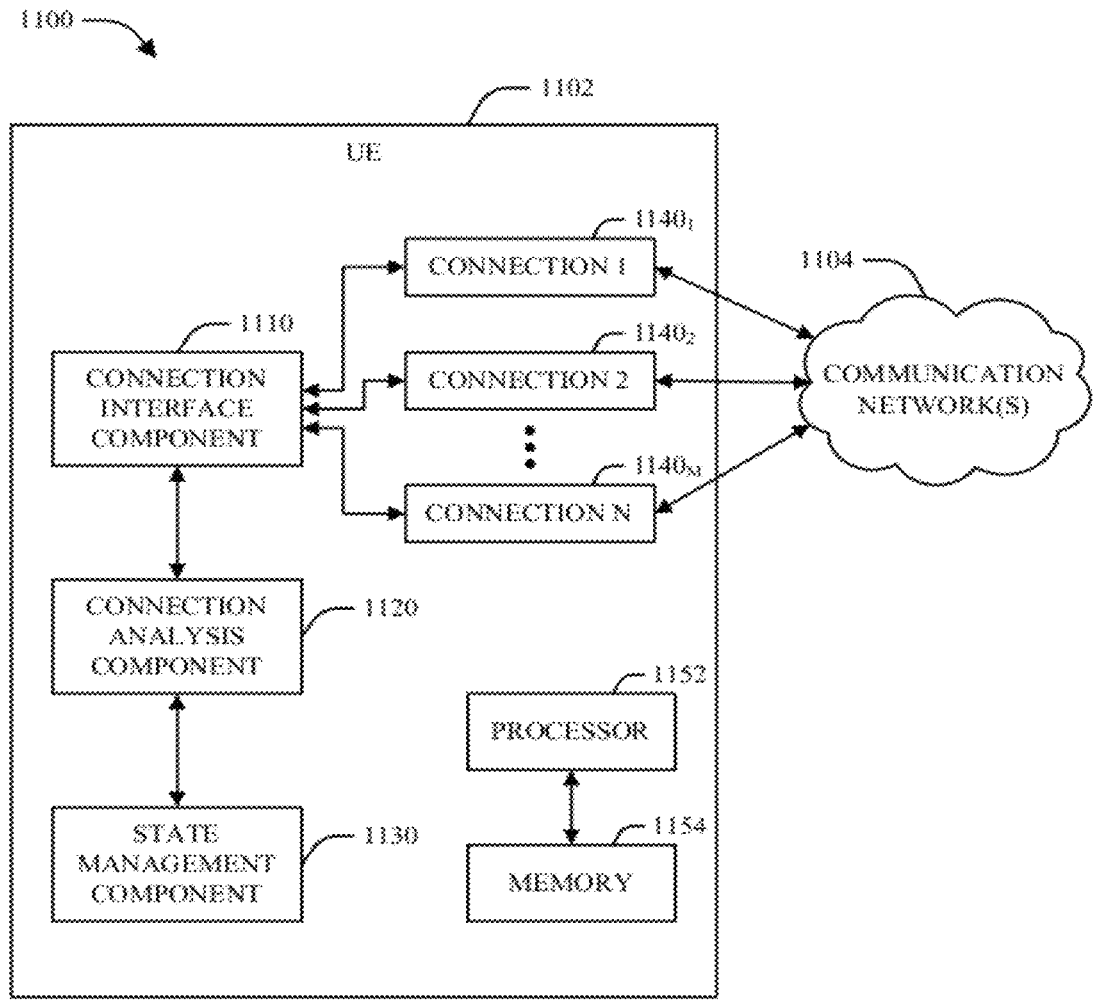
FIG. 11 is a block diagram of a system for optimizing operation of a network device in accordance with various aspects described herein.
Figure 12:
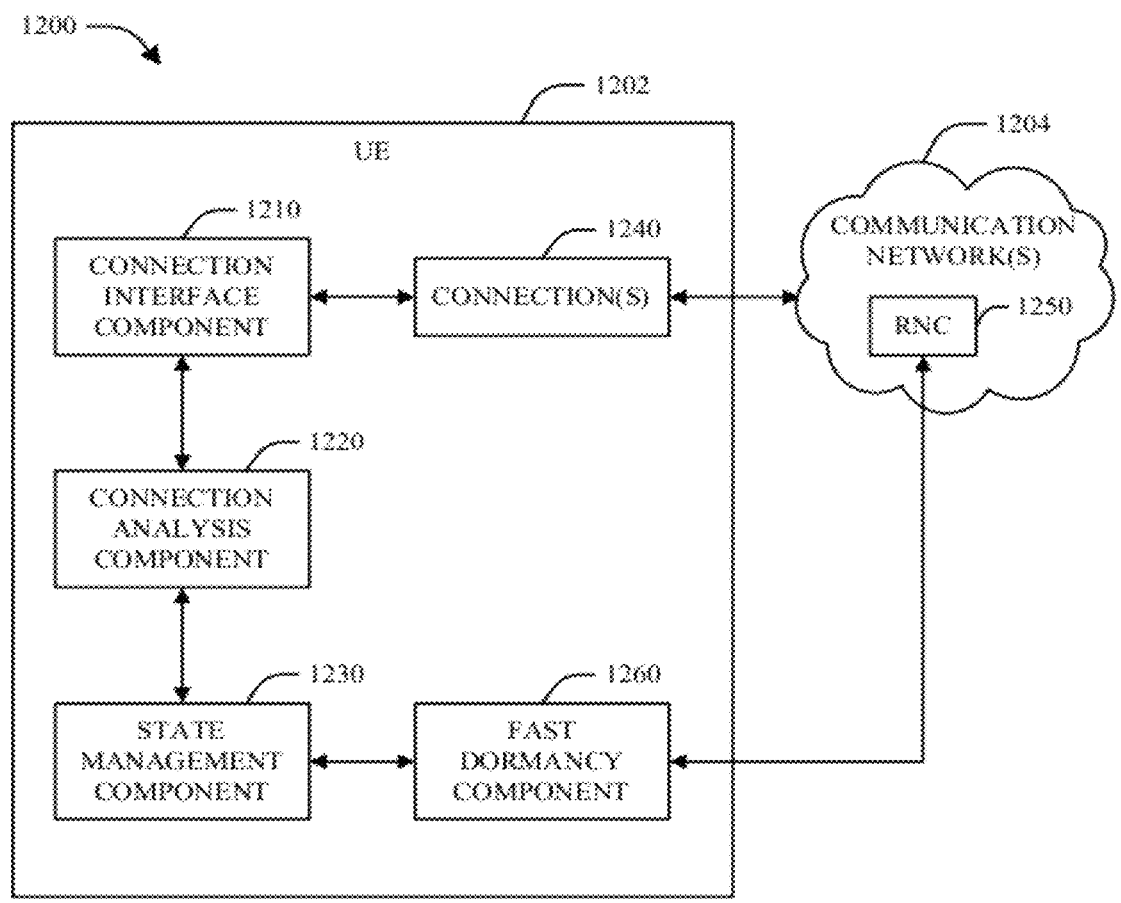
FIG. 12 is a block diagram of a system for leveraging a fast dormancy mechanism to expedite operating state transitions relating to a user device in accordance with various aspects.

FIGS. 11-18 describe other aspects and embodiments relating to fast dormancy and TOP. FIG. 11 depicts a system 1100 for optimizing operation of a network device, such as a UE 1102, in accordance with various aspects described herein. All or a desired portion of the components in UE 1102 can be part of a UE communication management component. As FIG. 11 illustrates, UE 1102 can include a connection interface component 1110, which can facilitate retrieval of information relating to one or more connections 1140 utilized by UE 1102 for communication within a wireless communication system. For example, as shown in system 1100, respective connections 1140 (e.g., connection 1 $1140_1$, connection 2 $1140_2$, connection M $1140_M$ (wherein M can be virtually any desired integer number)) utilized by UE 1102 can be utilized to facilitate communicate data with one or more communication networks 1104, which can in turn provide one or more communication services (e.g., voice, data, multimedia, etc.) for UE 1102.

As further shown by system 1100, UE 1102 can include a connection analysis component 1120, which can identify respective predicted data arrival times indicated by connection(s) 1140 via connection interface component 1110 and estimate an inter-transfer time for connection(s) 1140 as a function of the respective predicted data arrival times. In another aspect, the UE 1102 can further include a state management component 1130, which, based at least in part on this information (e.g., predicted data arrival times, estimated inter-transfer time), can determine whether to initiate a transition to an idle state independently of timing requirements (e.g., a tail time and/or other delay intervals as described herein) associated with the transition to the idle state at least in part by comparing the inter-transfer time for connection(s) 1140 as computed by connection analysis component 1120 to a tail threshold. For example, state management component 1130 can initiate a transition to an idle state if the inter-transfer time for connection(s) 1140 is substantially greater than the tail threshold.

In one example, operation of connection interface component 1110, connection analysis component 1120, state management component 1130, and/or any other mechanisms associated with connections 1140 or other aspects of UE 1102 can be implemented wholly or in part and/or otherwise facilitated by a processor 1152, which can be coupled to a memory 1154 for storing data, program codes to be executed by processor 1152, and/or other information. Operation of UE 1102 in the context of at least the above components is described in further detail below.

In cellular communication networks and/or other communication networks 1104 with which UE 1102 in system 1100 can be associated, the release of radio resources can be controlled by inactivity timers. However, the timeout value itself, also known as the tail time, can have a substantially long duration (e.g., 15 seconds (or longer or shorter than 15 seconds)). In one example, the tail time can be empirically chosen to balance the tradeoff among radio resource utilization, user experiences, energy consumption, and the network processing overhead, based at least in part on observed traffic patterns. Further, as the tail time is an idle time period corresponding to the inactivity timer value before radio resources are released, observation of the tail time can lead to waste in radio resources and battery energy of UEs 1102 (e.g., mobile phones, etc.). By way of illustration, based at least in part on analysis of data collected from one or more cellular providers, a significant portion of the time occupying high-speed dedicated transmission channels (e.g., 20-25%) is wasted on the tail, as a result of the bursty nature of the traffic.

In the following description, focus is placed on the UMTS 3G network; however, it should be appreciated that the aspects described herein can be applied to any suitable network technology or combination thereof. In one example, to manage radio resources and UE energy, a UMTS network can maintain an RRC state machine for each UE. Thus, for example, a UE can be in one of three states (e.g., IDLE state, DCH state, FACH state), each with different amount of radio resources allocated affecting user performance and the UE energy consumption. In such an example, a UE can be configured to always experience a tail, which is formally defined as the idle time period matching the inactivity timer value before a state demotion, whenever the state is demoted from a state with larger amount of resource to one consuming less resource. However, frequent state transitions, particularly state promotions, can in some cases lead to unacceptably long delays for the UEs due to additional processing overhead for the radio access network. In view of at least the above, techniques are provided herein for mitigating the tail effect in UMTS networks and other suitable telecommunication networks.

Existing approaches for tail removal can be classified into various categories. In a first example, inactivity timer tuning can be performed using analytical models by considering the radio resource utilization, the UE energy consumption, the service quality, and the processing overhead of the radio access network. However, it can be appreciated that mitigation of the tail effect in this manner requires reducing the inactivity timers, which invariably causes the number of state transitions to increase. In a specific illustrative example, aggressively reducing the most critical timer from 5 seconds to 0.5 seconds can reduce the tail time by 50%; however, in the same example the state promotion delay increases by about 300%. It can be appreciated that this is undesirable, as the increase in state promotions introduces significant processing overhead for the radio access network.

Alternatively, a second example involving UE-based approaches can be utilized, in which the UE alters traffic patterns based on the inferred dynamic behavior of the RRC state machine. For delay-tolerant applications such as Email and Really Simple Syndication (RSS) feeds, the transfers can be delayed and batched using such an approach to reduce the tail time. However, it can be appreciated that such an approach is not applicable to most real-time traffic (e.g., Web browsing), and as a result the users corresponding to such traffic can in some cases experience delays in the processing of their requests.

In another alternative, a third example involving cooperation between the UE and the network can be utilized. For example, in some cases a UE application may be able to predict the end of a data transfer based on the application logic. Accordingly, if an idle time period that lasts at least as long as the inactivity timer value is predicted, the UE can send a message to notify the network, which then immediately releases the allocated resources. It can therefore be appreciated that such an approach can completely eliminate the tail if the prediction is accurate, without incurring additional promotion delays. Various network features, such as fast dormancy, can be utilized within communication networks (e.g., 3GPP networks, etc.) to help realize such an approach. However, while various UEs have adopted fast dormancy and/or similar mechanisms, there has been no investigation into how to make use of such mechanisms from the perspective of the UE. Further, traditional smartphone applications do not use fast dormancy and/or other similar mechanisms, due to a lack of operating system (OS) support and other factors. Based at least in part on measuring device power consumption, it can be observed that one or more recently released mobile handset devices can utilize fast dormancy in an application-agnostic manner, such that, for example, the device can transition to the idle state from an active state (e.g., DCH state, FACH state) faster than conventional phones do for the same carrier. Equivalently, it can be observed that these devices use shorter inactivity timers as controlled by the device in order to improve battery life. However, as noted above, the incurred drawbacks using such an approach include extra state promotions that can cause additional RNC processing overhead and worsen user experience.

In view of at least the above, UE 1102 in system 1100 and its respective components and/or other associated entities can implement TOP, which is an application-layer protocol that bridges the gap between applications and fast dormancy support provided by the communication network 1104. In accordance with one aspect, TOP can be implemented at UE 1102 via modifications (e.g., via software update) to the OS and/or associated applications, taking into account the implication of multiple concurrent connections using fast dormancy. By way of example, TOP can be utilized to address at least three issues associated with allowing network applications to benefit from this support.

In a first example, various aspects described herein provide a simple interface for different applications to leverage fast dormancy and/or other similar features. For example, a framework can be provided in which applications define their logical transfers and perform predictions of inter-transfer time. Subsequently, an application can invoke a tail removal API and/or other means provided by TOP that automatically coordinates concurrent traffic of multiple applications, as state transitions are determined by the aggregated traffic of all applications. By implementing TOP in this fashion, it can be appreciated that the overhead for tail removal experienced by applications can be substantially minimized. While various examples are provided herein for the case of a UMTS network, it should be appreciated that a framework constructed in this manner can be applicable to any other suitable communication system, such as 3G Evolution-Data Optimized (EvDO), 4G Long Term Evolution (LTE) cellular networks, and/or any other suitable network(s) that also use inactivity timers for releasing radio resources and therefore have the tail effect.

In a second example, by using cellular traces collected from carrier data, the tail effect can be quantified for a substantially large number of user sessions. By doing so, it can be observed that for the two RRC states, a significant amount of time (e.g., 20-25% and 50-55%, respectively) can be spent on the tail. By using these traces, various techniques described herein can additionally be utilized to empirically derive critical parameters used by TOP to properly balance the tradeoff between resource saving and state transition overhead.

In a third example, the benefits of TOP can be demonstrated using real traces collected from carriers and/or devices operating via such carriers. Based on these data and assuming reasonable prediction accuracy, TOP can save overall the radio energy (e.g., up to approximately 17%) and the radio resources (e.g., up to approximately 14%) by reducing the tail time (e.g., by up to approximately 60%). Further, for some applications such as multimedia streaming, TOP can achieve more significant savings of the radio energy (e.g., up to approximately 60%) and the radio resources (e.g., up to approximately 50%).

In accordance with one aspect, a network device and/or other entity can utilize TOP to invoke fast dormancy support and/or other suitable mechanisms to directly trigger a DCH state to IDLE state demotion or a FACH state to IDLE state demotion without experiencing timeout periods, in order to save radio energy and radio resources. For example, as illustrated by system 1200 in FIG. 12, a UE 1202 can utilize a fast dormancy component 1260 in cooperation with a state management component 1230 as described herein to initiate a transition to an idle state at least in part by conducting a fast dormancy messaging procedure with an associated network management entity, such as a RNC 1250 associated with communication network(s) 1204. All or a desired portion of the components contained in UE 1202 can be part of a UE communication management component.

However, it can be appreciated that triggering state demotions aggressively can in some cases incur unacceptably long delay of state promotions, worsening user experiences and increasing the processing overhead at RNC 1250. Accordingly, TOP and/or other techniques that can be utilized by UE 1202 can employ a set of techniques to address at least this issue. In one example, the techniques described herein can be implemented without requiring changes at the firmware or hardware of UE 1202 given that fast dormancy and/or other suitable procedures are widely deployed and transparent to the radio access network.

According to an aspect, TOP and/or other techniques as described herein can leverage the knowledge of applications that predict the idle period after each data transfer. The definition of a data transfer can be made dependent on the application. In one example, fast dormancy is not invoked if the predicted idle period is smaller than a predefined threshold (e.g., the tail threshold) in order to prevent unnecessary state promotions. By leveraging this knowledge of respective applications (and/or their corresponding connections 1240), an interface can be provided by which applications and/or the UE can intelligently predict an idle period, such that fast dormancy is only invoked when the idle period is longer than the tail threshold.

According to another aspect, the value of the tail threshold and other parameters used by TOP can be tuned by empirically measuring traces collected from a network carrier, in order to well balance the tradeoff between the incurred state promotion overhead and the resource savings.

According to a further aspect, RRC state transitions can be determined by the aggregated traffic of all applications running on a UE 1202. However, as respective applications may be capable only of predicting their own transfer times, a global coordination algorithm can be utilized in connection with TOP to handle concurrent network activities. In another example, TOP and/or other suitable techniques utilized by UE 1202 as described herein can consider legacy applications that are unaware of such techniques. Various examples by which the above aspects can be realized are described in further detail below. For example, a non-limiting example coordination algorithm that can be utilized according to various aspects herein is shown below in Table III.

In the DCH or FACH states, when there is no user data transmission in either direction for at least T seconds (e.g., the inactivity timer value), the RRC state can be demoted as noted above to save radio resources and UE energy. However, during the wait time of T seconds, it can be appreciated that an associated UE 1202 still can occupy the transmission channel and the WCDMA codes, and the radio power consumption is kept at the corresponding level of the state. As used herein, a "tail" is defined as the idle time period matching the inactivity timer value before a state demotion. Further, any non-tail time is defined herein as "active." In typical UMTS and/or other networks, each UE 1202 can be allocated a dedicated channel, whose radio resources can be substantially wasted during the tail time. By way of example relating to High-Speed Downlink Packet Access HSDPA, which is a UMTS extension with higher downlink speed, occupying the high speed transport channel during the tail time can potentially prevent other UEs from using the high speed channel despite the fact that the channel is shared by only a limited number of UEs (e.g., 32). Furthermore, it can be appreciated that staying in DCH or FACH during the tail time can waste the radio energy of the UE, which can contribute to a significant portion (e.g., at least half) of the total battery energy consumption at a UE or other such device.

From the perspective of a network carrier, it can be noted that one option for mitigating the tail effect is to reduce the inactivity timer values. However, doing so can increase the number of state transitions. As described above, completing a state promotion can take, e.g., up to 2 seconds, during which tens of control messages are exchanged between a UE and the RNC. Such a delay can degrade end user experiences and increase the CPU processing overhead of the RNC, which is much higher for handling state transitions than for performing data transmission.

In order to quantify the tradeoff among the factors of the radio resource consumption, the UE energy consumption, the state promotions, and the end user experiences, a series of metrics can be computed: $D^T$, D, S, and E, as shown in Table II below. In particular, the DCH tail time $D^T$ captures the radio resources (the WCDMA codes) wasted on tails that can potentially be saved. Second, the total DCH time D consists of DCH tail time ($D^T$) and DCH active time (e.g., non-tail time). It quantifies the overall radio resources consumed by the UE on dedicated DCH channels (e.g., ignoring the radio resources allocated for shared low-speed FACH channels). Third, the total promotion delay S is the total duration of all promotions. It abstracts the overhead brought by the state promotions that can worsen the user experience and increase the processing overhead at the RNC. In one example, the state demotion overhead can be ignored because it is negligible compared to the state promotion overhead. Fourth, the radio energy consumption E is the total radio energy consumed in all states and state promotions.

TABLE II

| Radio resource operation tradeoffs. | |
| --- | --- |
| Increase α and β timers | Decrease α and β timers |
| $\Delta D^T$ and $\Delta D$ increase | $\Delta D^T$ and $\Delta D$ decrease |
| Increase tail time | Decrease tail time |
| Waste radio resources | Save radio resources |
| $\Delta S$ decreases | $\Delta S$ increases |
| Reduce state promotions | Increase state promotions |
| Reduce RNC overhead | Increase RNC overhead |
| Improve user experience | Degrade user experience |
| $\Delta E$ increases | $\Delta E$ decreases |
| Waste UE radio energy | Save UE radio energy |

According to an aspect, $D^T$, D, S and E can be computed using the simulation-based approach described above and, e.g., the parameters listed in Table II above. When changing the inactivity timer values or using a new technique for tail removal, the relative change of $D^T$, D, S and E can be analyzed as compared to the default setting where the default state machine parameters (e.g., as shown in Table I) are used without removing tails. Let $D_1^T$ and $D_0^T$ be the DCH tail time in the new setting and in the default setting, respectively. Accordingly, the relative change of $D^T$, denoted as $\Delta D^T$, can be computed by $\Delta D^T=(D_1^T-D_0^T)/D_0^T$. Similar definitions can be used for $\Delta D$, $\Delta S$ and $\Delta E$, which are further utilized below.

With reference again to FIG. 12, it can be appreciated that the fundamental reason why inactivity timers are traditionally necessary is that a communication network 1204 does not have an easy way of predicting network idle time of the UE 1202. Therefore, the RNC 1250 conservatively appends a tail to every network usage period. To avoid this, applications at the UE 1202, and/or their corresponding connections 1240, can be configured to determine the end of a network usage period by making use of application knowledge useful for predicting network activities. Once an imminent tail is predicted, the UE 1202 can notify the RNC 1250 via fast dormancy component 1260, which can prompt a substantially immediate release of resources by RNC 1250.

Based on the concepts above, a feature called fast dormancy has been proposed for inclusion in various communication system specifications (e.g., 3GPP Release 7 and Release 8, etc.). Using fast dormancy, the UE 1202 can send an RRC message, referred to herein as a T message, to the RNC 1250 through the control channel. Upon the reception of a T message, the RNC 1250 can release the RRC connection and can allow or enable the UE 1202 to transition to the IDLE state (or a hibernating state that has lower but still non-trivial promotion delay). While this feature has limited handset support, network device applications typically do not use fast dormancy in practice, partly due to a lack of OS support and/or a simple programming interface.

In accordance with one aspect, UE 1202 in system 1200 can be utilized to implement TOP, which is an application-layer protocol that leverages the support of fast dormancy to remove tails. In TOP, applications (e.g., applications associated with respective connections 1240) can define data transfers and predict the inter-transfer time at the end of each data transfer using a provided interface. If the predicted inter-transfer time is greater than a tail threshold, the application can inform the RNC 1250, e.g., via state management component 1230 and fast dormancy component 1260, to initiate fast dormancy. In accordance with various aspects, techniques for setting the tail threshold and handling concurrent network activities are described herein. It can be appreciated that the TOP design provided herein can be implemented with minimal required change to UE applications (and optionally server applications, as the server can provide the UE with hints about predicting a tail) and the UE OS, and minimal or no change at the firmware/hardware of the UE 1202. In an aspect, TOP can be transparent to the UTRAN (e.g., the base station 608 and the RNC 610, as shown in FIG. 6) and the cellular core network (e.g., CN 606 in FIG. 6). Therefore, it can be appreciated that TOP can be incrementally deployable. In another aspect, the T message as used herein can be pre-supported by the RNC 1250.

In accordance with one aspect, tail eliminations can be performed from the perspective of applications running at UE 1202 for each data transfer, which can be defined by the applications to capture a network usage period. For example, a data transfer can correspond to all packets belonging to the same Hypertext Markup Language (HTML) page. To use TOP, an application can be required only to ensure that the current data transfer has ended and to provide TOP with its predicted delay between the current and the next data transfer, denoted as the inter-transfer time (ITT), via a provided interface (e.g., implemented using connection interface component 110). In one example, ITT can be defined as the packet inter-arrival time between the last packet of a transfer and the first packet of the next transfer. In another example, DL and UL packets can be handled without differentiation as both use the same state machine.

By way of specific example, a scenario with no concurrent activities can be considered. In such a case, TOP, via state management component 1230 or the like, can send a T message (e.g., invoking fast dormancy via fast dormancy component 1260) to eliminate the tail if the predicted ITT is longer than a threshold herein referred to as a tail threshold (TT) that introduces the tradeoffs described above. For example, a large TT value limits the radio resource and energy saving achieved by TOP, while a small TT value incurs extra state promotions. Techniques for choosing the TT are provided in further detail below.

In accordance with one aspect, ITT prediction can be application-specific. For example, it can or may be easier to predict ITT for applications with regular traffic patterns, with limited or no user-interaction (e.g., video streaming), while it may be more difficult for user-interactive applications, such as Web browsing and map applications, as user behavior can inject randomness to the packet timing By way of example, in Web browsing, each transfer can correspond to downloading one HTML page with all embedded objects. As another example, an e-mail application can define a transfer as a request for checking for sending and/or receiving messages. In the example of a Web browser, the browser can have exact knowledge of when the page has been fully downloaded. However, the timing gap between two consecutive transfers can or may be shorter than the tail threshold (e.g., the user can quickly navigate between pages). Thus, the browser can selectively invoke TOP. By way of a second example, a multimedia streaming transfer can consist of a single burst of packets of video/audio content. A multimedia streaming application can usually predict termination of a streaming burst, and therefore TOP can be applied if the timing gap between two consecutive bursts (usually known by the application) is longer than the TT. As a third example, interactive map applications can or may involve continuous user-interactions; thus, TOP may not be applicable as it is difficult to define a transfer.

It can be appreciated that ITT prediction by respective applications and/or connections 1240 can be associated with various issues. As a first example, applications and/or connections 1240 may in some cases not predict ITT accurately: misprediction can lead to increased promotion overhead due to false positives (e.g., falsely predicting a short ITT that is less than the TT to be a long ITT that is greater than the TT) or missing opportunities for tail removal due to false negatives (e.g., falsely predicting a long ITT to be short). For simplicity of description, however, it is assumed herein that ITTs are predicted with a reasonable accuracy (e.g., 80% to 90%).

In a second example, the existence of concurrently running applications and independent components of the same application (e.g., a streaming application with an advertisement bar embedded) can further complicate tail prediction. Further, it can be appreciated that applications cannot predict the concurrent network activities of other applications that can that affect state transitions. Accordingly, TOP as utilized by system 1200 can assume responsibility for handling this concurrency, as described in further detail below.

In accordance with one aspect, unlike the applications as described above, TOP as implemented by a UE 1202 can in some cases be unaware of the way applications define their transfers. Instead, TOP can schedule tail removal requests at the connection level. A connection can be defined by five tuples: srcIP, dstIP, srcPort, dstPort, and protocol (Transmission Control Protocol/User Datagram Protocol or TCP/UDP). It can be appreciated that it is possible for either one connection to contain multiple transfers or for one transfer to involve multiple connections. At the end of a transfer, after the last packet is transmitted, an application can inform TOP via an API, such as a terminate tail API, also referred to herein as TerminateTail(c, $\delta$), wherein the predicted ITT of connection c is $\delta$. In other words, the next UL/DL packet of connection c belongs to the next transfer and will arrive after $\delta$ time. Let the real ITT be $\delta_0$ and the predicted ITT be $\delta$.

When user interactions are involved, it may be difficult for applications to predict the exact value of ITT. In such a case, an application can perform binary prediction, e.g., to predict whether ITT≤TT or ITT>TT. In such an example, the API is only called in the latter case: if ITT is predicted to be greater than TT, then TerminateTail(c, $\delta$) can be invoked with $\delta$ set to a fixed large value (e.g., 60 seconds). In one example, when no concurrent network activities exist, exact prediction of ITT can in some cases be unnecessary provided the binary prediction is correct. On the other hand, when concurrency exists, the predicted ITT value can or may affect how fast dormancy is invoked. For example, in an example wherein the real ITT is denoted by $\delta_0$ and the predicted ITT is denoted by $\delta$, it can be appreciated that underestimating $\delta_0$ ($\delta<\delta_0$) may in some cases prevent other concurrent applications from invoking fast dormancy while overestimating $\delta_0$ ($\delta>\delta_0$) may in some cases incur additional state promotions. However, as noted above, in the event that binary prediction is correct, the actual prediction value of ITT can be of lesser significance in some cases.

In one example, calling TerminateTail(c, $\delta$) can be used to indicate that the next transfer belongs to an established connection c. In addition, an application can start the next transfer by establishing a new connection that does not exist when TerminateTail is called. For example, a Web browser can use a new TCP connection for fetching a new page. Suppose that at the end of a connection c, the application makes a prediction that the next transfer initiates a new connection and the ITT is $\delta$. In that case, the application can make two consecutive calls. First, the application can call TerminateTail(null, $\delta$), indicating that a new connection will be established after $\delta$ time. The first parameter is null, as the application does not know about the future connection. Second, the application can call TerminateTail(c, $\infty$), indicating the termination of c and the termination of the current transfer. It can be appreciated that the two calls will trigger at most one T message. The rationale for performing the second call is described in further detail below.

Figure 13:
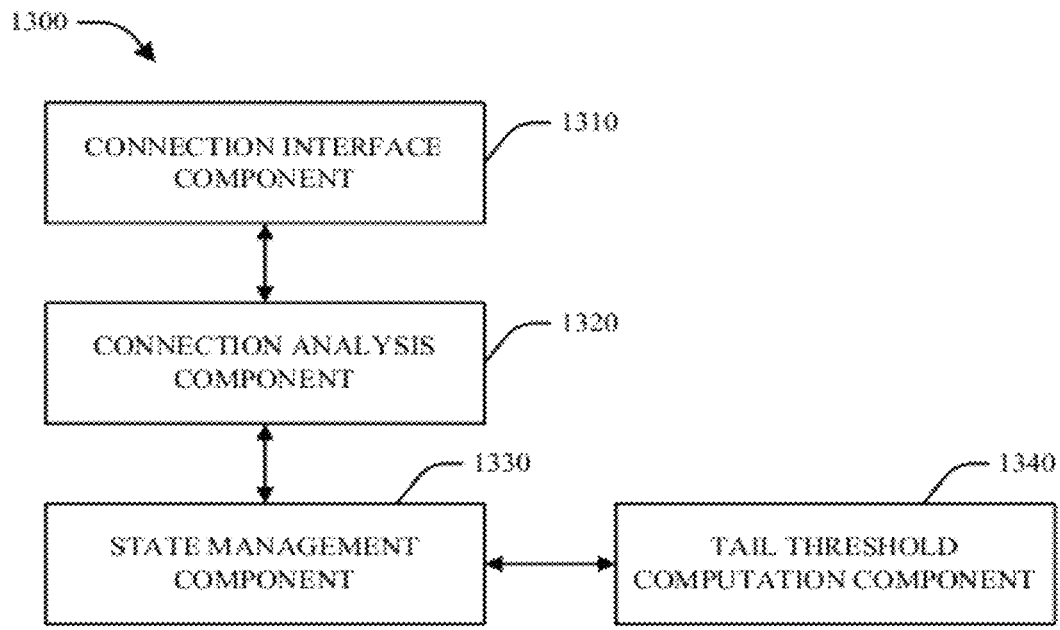
FIG. 13 is a block diagram of a system for computing a threshold time relating to operating state management for a device operable in a wireless communication system in accordance with various aspects.

Turning next to FIG. 13, a system 1300 for computing a threshold time relating to operating state management for a device operable in a wireless communication system in accordance with various aspects is illustrated. All or a desired portion of the components of the system 1300 can be can be part of a UE communication management component, which can be included in a UE. System 1300 can include a connection interface component 1310, a connection analysis component 1320, and a state management component 1330, which can operate in accordance with various aspects described herein. Further, state management component 1330 can be associated with a tail threshold computation component 1340, which can set and/or otherwise determine the tail threshold value utilized by TOP and/or other suitable mechanisms in various manners.

As defined above, a TT can be used by TOP and/or other suitable state management mechanisms to determine whether to send a T message when TerminateTail is called. When no concurrency exists, TOP can be configured to send a T message if and only if the predicted ITT is greater than the TT. Accordingly, it can be appreciated that a large TT may limit the radio resource and energy savings, while a small TT may incur extra state promotions.

In a typical use scenario, a UE is at DCH when a transfer ends. Assuming this, a T message can be used to trigger a DCH to IDLE demotion. However, in the event of state machine settings such as those illustrated by diagrams 702 and 704 in FIG. 7, a UE can experience two state demotions: DCH to FACH with duration of α, and FACH to IDLE with duration of β. Therefore, the default TT value can be set based on at least one of the DCH to FACH inactivity timer or the FACH to IDLE inactivity timer, e.g., a α/β, to match the original behavior. Thus, by way of example, assuming the predicted ITT is δ, to ensure no additional promotion (if predictions are correct), TOP can be configured to refrain from sending a T message if δ<α+β=TT. However, it can be appreciated that such a default value of TT is large (e.g., 17 seconds for Carrier 1 as shown in diagram 702 and 10 seconds for Carrier 2 as shown in diagram 704), which can potentially limit the effectiveness of TOP.

Figure 14:
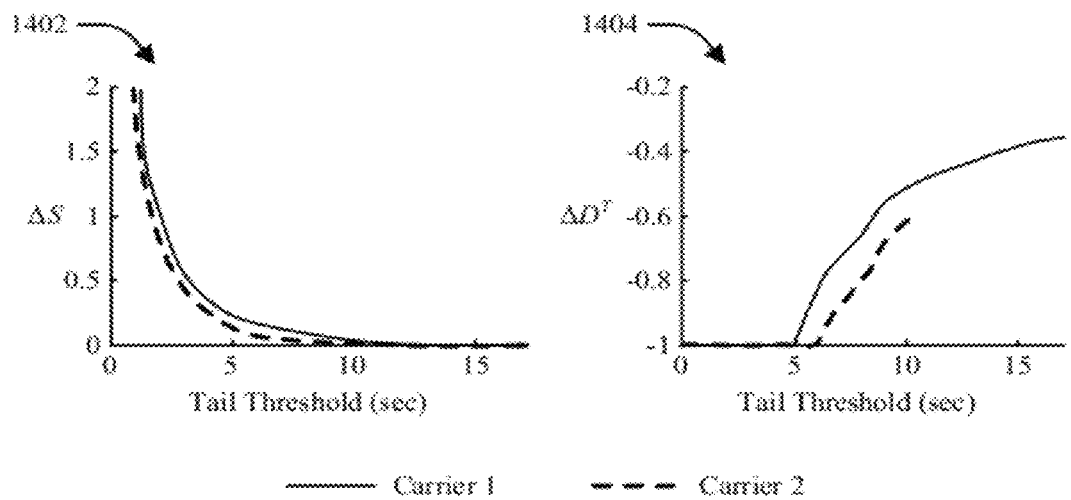
FIG. 14 illustrates example network data that can be considered in connection with various aspects described herein to facilitate optimized network device operation.
Figure 15:
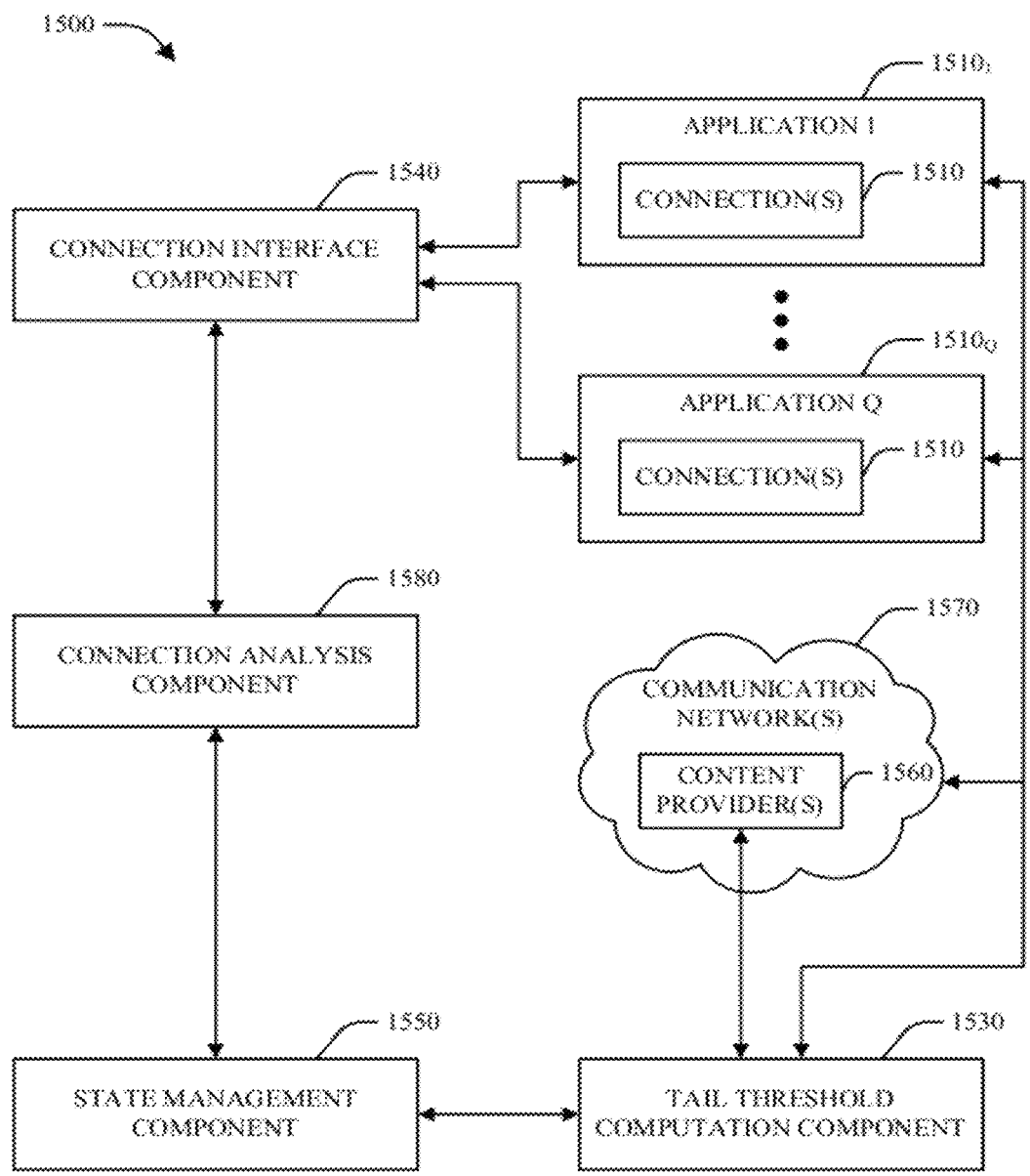
FIG. 15 is a block diagram of a system for identifying a tail threshold associated with a technique for device operating state management in a communication system in accordance with various aspects.
Figure 16:
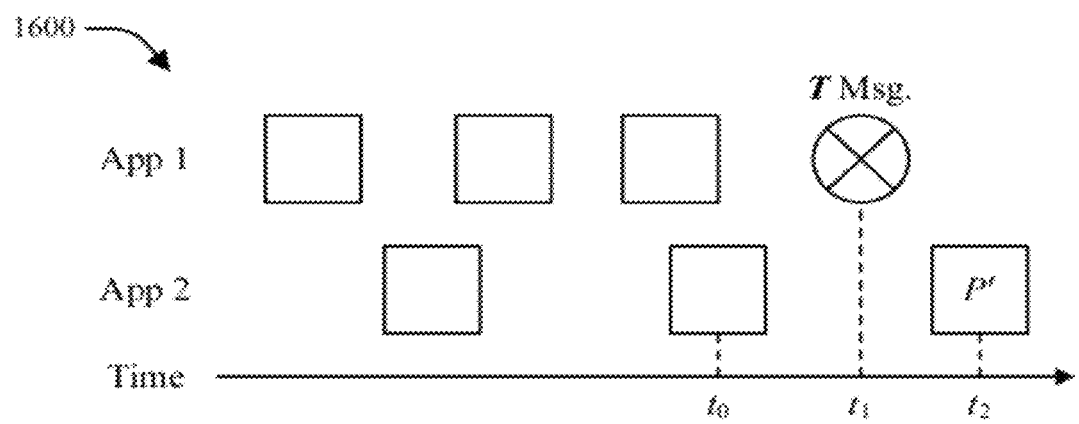
FIG. 16 illustrates an example of concurrent network activity in accordance with various aspects described herein.
Figure 17:
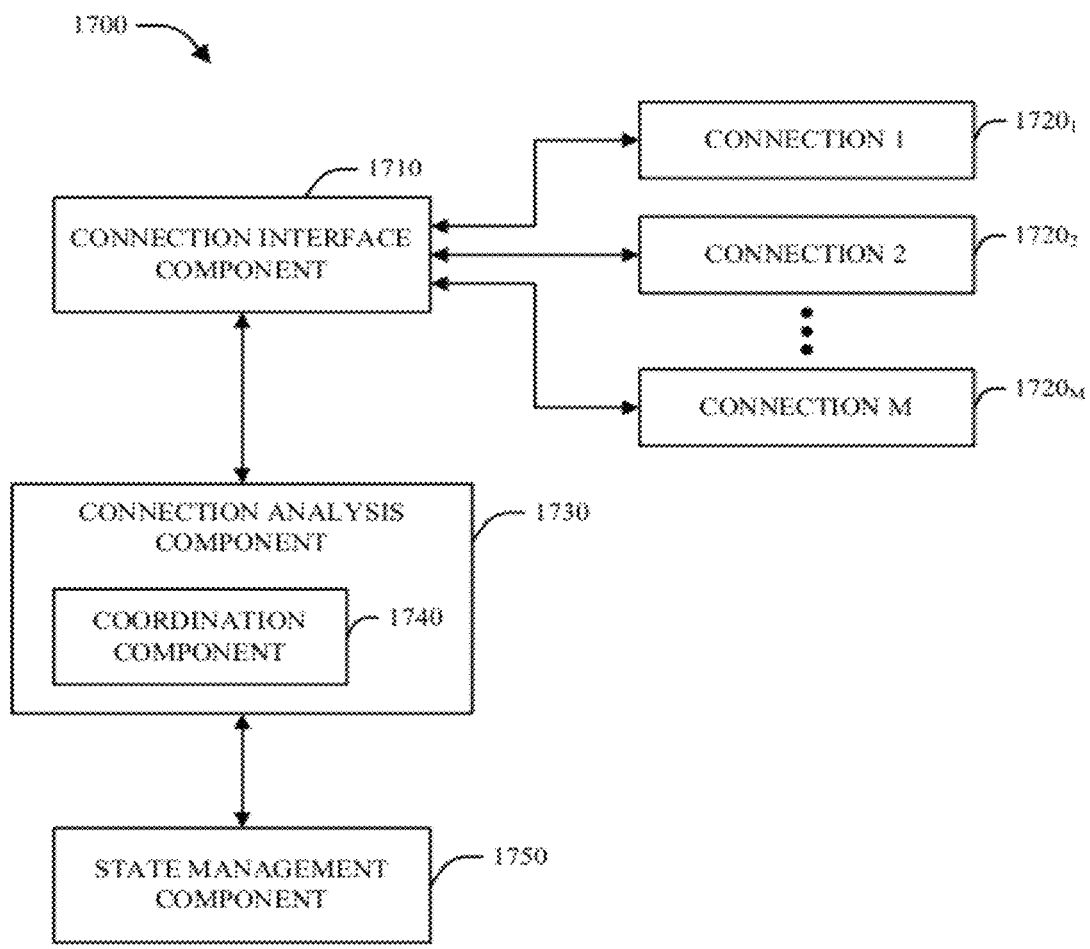
FIGS. 17 and 18 are block diagrams of respective systems for coordinating between multiple connections to facilitate optimized network device performance in a wireless communication system.
Figure 18:
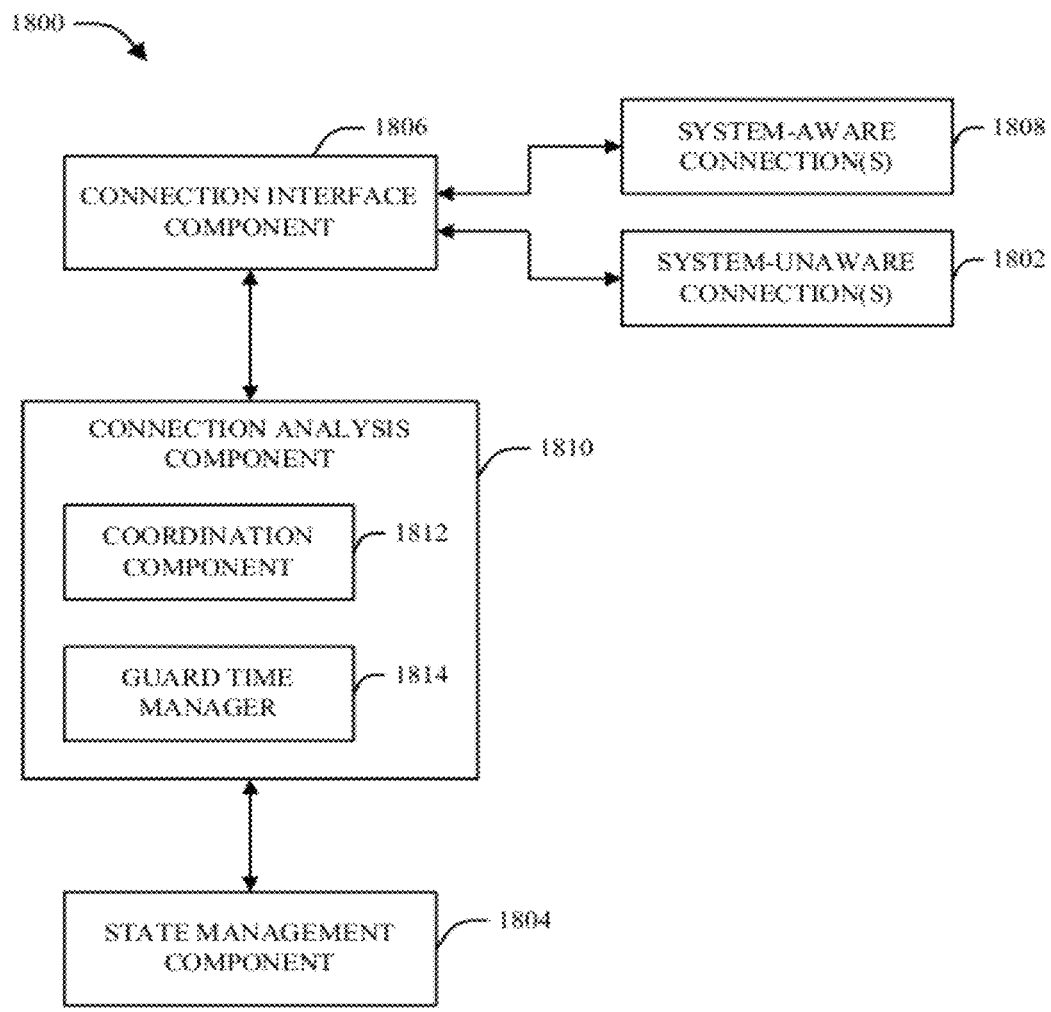

In accordance with one aspect, tail threshold computation component 1340 can operate based at least in part on empirical system measurement based on system traces, such as that shown in diagram 1402 in FIG. 14, which can be generated as follows. In one example, calibrated sessions can be replayed against respective state machines associated with one or more carriers with different TT values, assuming that a T message is sent whenever the packet inter-arrival time is greater than the TT. The change of the total duration of state promotions ΔS can then be measured. As shown by diagram 1402, ΔS monotonically decreases as TT increases, and reaches zero when TT=α+β. In addition, it can be observed from diagram 1402 that reducing TT to the value of α incurs limited promotion overhead, e.g., 22% and 7% for Carrier 1 and Carrier 2, respectively. For the example carriers used, it can be appreciated that given a fixed TT, Carrier 1 has a higher promotion overhead because it has a much longer β timer. On the other hand, as shown by diagram 1404 in FIG. 14, which plots the relationship between the TT and the change of the total DCH tail time $\Delta D^T$, setting TT to α+β saves only 35% and 61% of the DCH tail time for the two carriers while reducing TT to α eliminates all DCH tails. Accordingly, TT=α can be utilized to better balance the tradeoffs described above and illustrated by Table II.

According to another aspect, while tail threshold computation component 1340 can set a tail threshold based at least in part on empirical system trace information as described above, tail threshold computation component 1340 can utilize other factors in addition to, and/or in place of, such information in determining a tail threshold for network device state management. For example, as shown by system 1500 in FIG. 15, retrieval of information relating to one or more connections 1510 can be facilitated via respective applications 1520 (e.g., application 1 1520₁, application Q 1520_Q, wherein Q can be virtually any desired integer number) utilizing said connections 1510, as generally described above. In such an example, tail threshold computation component 1530 can set a tail threshold based at least in part on information relating to one or more connections 1510 provided by the respective applications 1520 (e.g., and obtained via the connection interface component 1540). For example, TOP and/or other state management mechanisms utilized by system 1500 can be configured such that respective applications 1520 can suggest and/or assign tail threshold times for use by state management component 1550 (which can be associated with connection analysis component 1580). Additionally or alternatively, tail threshold computation component 1530 can set the tail threshold based at least in part on data obtained from at least one content provider 1560 within communication network(s) 1570 providing communication services via connection(s) 1510. By way of example involving a Web browsing application, a content provider corresponding to a website can embed information relating to a desired tail threshold into a header and/or other elements of the website, such that the Web browsing application can obtain the information upon accessing the website. Upon obtaining such information, the Web browsing application can relay the information to one or more suitable components to facilitate setting of the tail threshold.

In accordance with a further aspect, it can be appreciated that tail elimination can be performed for each data transfer determined by an application 1520 and/or its corresponding connections 1510. As described above, an application 1520 may only ensure that the delay between consecutive transfers is longer than the tail threshold, without considering other applications 1520. However, RRC state transitions are determined by the aggregated traffic of all applications 1520. Therefore, it can be appreciated that allowing every application 1520 and/or connection 1510 to send T messages independently can cause problems, as illustrated by diagram 1600 in FIG. 16. As shown by diagram 1600, at time $t_1$, TOP can send a T message for Application 1 to cut or terminate its tail. However, P', a packet transmitted by Application 2 at $t_2$, will trigger an unnecessary promotion if $t_2-t_1$<TT.

It can be appreciated that if all connections 1510 can precisely predict the packet inter-arrival time, there can exist an optimal algorithm to determine whether to send a T message. The optimal algorithm aggregates prediction across connections by effectively treating all network activity as part of the same connection 1510. Accordingly, fast dormancy is triggered only when the combined ITT exceeds the TT. Thus, if $\alpha_1, \ldots, \alpha_n$ represents the predicted arrival time of the next packet for each connection 1510 at a given time t, then TOP can send a T packet if min $\{\alpha_i\}-t$>TT.

In practice, however, it can be appreciated that the above operation of TOP faces various challenges. First, as mentioned above, applications 1520 can perform the prediction at the transfer level. Therefore, no prediction information is available except for the last packet of a transfer. This may incur additional promotions if, for example, connection $c_1$ invokes fast dormancy when connection $c_2$ is in the middle of a transfer. Second, legacy applications are unaware of TOP, and some applications may not use TOP due to their particular traffic patterns. To handle at least these issues, simple and robust coordination techniques can be implemented as described below.

According to an aspect, a TOP algorithm and/or other algorithm can consider two cases to determine whether to send a T message, e.g., for fast dormancy. First, for all connections with ITT prediction information (e.g., TerminateTail is called before the arrival of the next packet), fast dormancy can be triggered only when the combined or aggregated ITT exceeds the tail threshold. This is illustrated by system 1700 in FIG. 17. It is noted that all or a desired portion of the components of the system 1700 can be can be part of a UE communication management component, which can be included in a UE. As system 1700 illustrates, connection interface component 1710 can facilitate retrieval of information relating to a plurality of connections 1720 (e.g., connection 1720₁, connection 1720₂, through connection 1720 (wherein M can be virtually any desired integer number)), based on which connection analysis component 1730 can utilize a coordination component 1740 and/or other suitable means to estimate the inter-transfer time for connection(s) 1720 at least in part by identifying a current timestamp, identifying an earliest predicted data arrival time indicated by connection(s) 1720, and computing the inter-transfer time for connection(s) 1720 as a time interval measured from the current timestamp to the earliest predicted data arrival time. The connection analysis component 1730 also can be associated with, and can operate in conjunction with, the state management component 1750, as more fully described herein.

Second, a specified heuristic can be applied to handle connections without ITT being predicted when TerminateTail is called, because either those connections are not at the end of the transfer or they do not use TOP. This is illustrated, for example, by system 1800 in FIG. 18. All or a desired portion of the components of the system 1800 can be can be part of a UE communication management component, which can be included in a UE. As shown by system 1800, if system-unaware connections 1802 exist that do not predict ITT, a T message is not sent (e.g., by state management component 1804) if any of the system-unaware connections 1802 has recent network activity within the past p seconds, where p is a predefined parameter (e.g., 5 seconds, etc.). Thus, connection interface component 1806 can facilitate retrieval of information relating to one or more system-aware connections 1808 that can indicate predicted data arrival time and one or more system-unaware connections 1802 that do not indicate predicted data arrival time. Based at least in part on such information, the connection analysis component 1810 can determine an amount of elapsed time following a most recent data arrival over the one or more system-unaware connections 1802 by utilizing a coordination component 1812 and/or other suitable means. Subsequently, the state management component 1804 can initiate a transition to an idle state if the inter-transfer time for the system-aware connections 1808 is substantially greater than a tail threshold and the elapsed time following the most recent data arrival over the system-unaware connection(s) 1802 is substantially greater than a predefined arrival window, which can be defined by a guard time (e.g., p) controlled by a guard time manager 1814 or the like.

It can be appreciated that the above measures can be taken due to the fact that, for an active connection, a recent packet transmission usually can indicate another packet transmission in the near future. Not sending a T message at such a case can reduce additional promotions. For example, referring back to diagram 1600 in FIG. 16 and assuming Application 2 does not use TOP, a T message should not be sent at $t_1$ for Application 1 if $t_1 - t_0 < p$. In one example, p can be set based on empirical measurement in a similar manner to that described above for tail threshold computation component 1340 in FIG. 13.

Returning to FIG. 17, an example coordination algorithm that can be implemented by coordination component 1740 and/or other entities in system 1700 is described in further detail with reference to the pseudo code listed in Table III below. As shown in Lines 2-3, the algorithm can maintain two states for each connection c: ts and predict, which can correspond to the timestamp of the last observed packet and the predicted arrival time of the next packet, respectively. The dummy state in Line 4 is explained further below. In one example as shown by Lines 27-30, whenever an incoming or outgoing packet of connection c arrives, c.ts can be updated to $ts_{cur}$, the current timestamp, and c.predict can be set to null, indicating that no prediction information is currently available for connection c. Further, after the last packet is transmitted at the end of a transfer, an application can call TerminateTail(c, δ). Subsequently, as shown by Line 19, TOP can update c.predict to $ts_{cur}+δ$. TOP can then send a T message as shown by Lines 20-25 if the conditions expressed by Equations (1) and (2) below hold:

$$\min_{c'}\{c'.predict \neq null\} > ts_{cur} + TT \quad (1)$$

$$\forall c' : c'.predict = null \rightarrow c'.ts < ts_{cur} - p \quad (2)$$

where c goes over all connections and "→" denotes implication. Equations (1) and (2) represent two aforementioned cases where connections are with and without prediction information, respectively. It can be noted that both the tail threshold in Equation (1) (e.g., as used in Line 21) and the p value in Equation (2) (e.g., as used in Line 22) are set to α. However, it should further be appreciated that any suitable values could be utilized for such parameters.

TABLE III

Example TOP coordination algorithm.

| | |
|---|---|
| 01 | struct CONNECTION { //per-conn. states maintained by TOP |
| 02 | TIME STAMP predict; |
| 03 | TIME STAMP ts; |
| 04 | BOOLEAN dummy; //false for any existing connection |
| 05 | } |
| 06 | TerminateTail(CONNECTION c, ITT δ) { |
| 07 | foreach conn in Connections { //handle out-of-date predictions |
| 08 | if (conn.predict < $ts_{cur}$) { //$ts_{cur}$ is the current timestamp |
| 09 | if (conn.dummy = true) |
| 10 | {Connections.remove(conn);} |
| 11 | else {conn.predict ← null;} |
| 12 | } |
| 13 | } |
| 14 | if (c = null) { //create a dummy connection established soon |
| 15 | c ← new CONNECTION; |
| 16 | c.dummy ← true; |
| 17 | Connections.add(c); |
| 18 | } |
| 19 | c.predict ← $ts_{cur}$ + δ; //update the prediction |
| 20 | foreach c' in Connections { //check the two constraints |
| 21 | if ((c'.predict ≠ null && c'.predict < $ts_{cur}$ + a) |
| 22 | ‖ (c'.predict = null && c'.ts > $ts_{cur}$ − a)) |
| 23 | {return;} //fast dormancy is not invoked |
| 24 | } |
| 25 | send T message; |
| 26 | } |
| 27 | NewPacketArrival(CONNECTION c) { |
| 28 | c.ts = $ts_{cur}$; |
| 29 | c.predict ← null; |
| 30 | } |

According to an aspect as provided above, for applications that are aware of TOP, TOP can attempt to aggregate the predicted tail times and invoke fast dormancy and/or other suitable procedures only if the aggregated tail time is greater than the tail threshold. Thus, for example, if a first application reports a tail time of 8 seconds and a second application reports a tail time of 5 seconds, the lowest reported tail time, 5 seconds, can be set as the aggregated tail time.

According to another aspect, the OS at a UE and/or other mechanisms suitable for implementing TOP can keep track of respective connections and collect information relating to predicted idle time for substantially all connections. To this end, an interface can be provided by which all applications that are aware of TOP can coordinate to report information to the OS and/or other mechanisms implementing TOP, such that TOP has a global view of substantially all connections and can perform scheduling based on such information. Accordingly, as noted above, TOP can be conducted by obtaining reports from respective applications, aggregating them, and comparing the tail time based on the aggregated reports to a tail threshold.

Referring again to FIG. 17, when the next transfer starts in a new connection, the corresponding application can call TerminateTail(null, δ) then TerminateTail(c, ∞) as described above at the end of connection c, which is also the end of the current transfer. Subsequently, TOP can handle the first call by creating a dummy connection $c_d$ (e.g., as performed in Lines 14-18 above) with $c_d$.predict=$ts_{cur}$+δ and adding $c_d$ to consideration according to Equation (1). Subsequently, the dummy connection $c_d$ is removed when its prediction is out-of-date, e.g., $ts_{cur}$>$c_d$.predict, as performed in Lines 9-10 above. As Line 11 above further provides, the prediction corresponding to an existing connection can be set to null (no prediction information) when the prediction is out-of-date. Further, a prediction can be removed, e.g., not considered by Equation (1) or (2), when the connection is closed by the application.

In accordance with one aspect, an application can in some cases call TerminateTail(null, δ) at $ts_{cur}$, immediately after the last packet of connection c is transmitted. However, it can in some cases be possible that at is $ts_{cur}$, c has not yet been removed by TOP, although no packet of c may appear. In this case, c.ts, the timestamp of the last packet of c, can be significantly close to $ts_{cur}$, causing Equation (2) to not hold. Thus, in this case a T message will never be sent. In one example, this can be addressed via a second call Terminate-Tail(c, ∞) that sets c.predict=∞. By making two calls in this manner, it can be substantially guaranteed that a T message is properly sent even if c is not timely removed.

According to another aspect, it can be appreciated that an application abusing fast dormancy can make a UE send a large amount of T messages, each of which may cause a state demotion to IDLE followed by a promotion triggered by a packet, in a short period. To prevent such a pathological case, TOP can be configured to send at most one T message for every t seconds, even if multiple T messages are allowed by the constraints of Equation (1) and (2). Stated another way, TOP can be configured to elect not to trigger a transition to an idle communicative state if previous triggering to the idle communicative state has occurred within a predetermined time interval. This guarantees that repeatedly calling TerminateTail is harmless, and that the frequency of the additional state promotions caused by TOP is no more than one per t seconds. By way of specific, non-limiting example, t can be set to, e.g., 6-10 seconds in order to have minimal impact on resource savings for normal usage of TOP.

Figure 19:
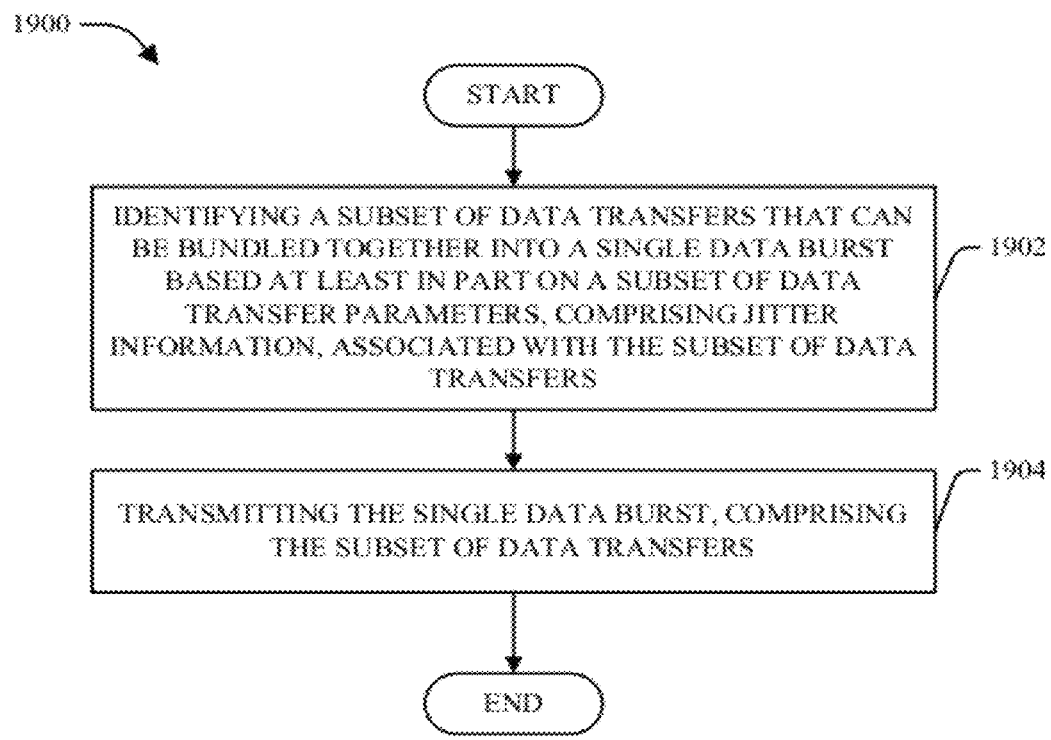
FIG. 19 illustrates a flow diagram of an example method for managing data transfers associated with a network device (e.g., UE), in accordance with various aspects and embodiments.
Figure 20:
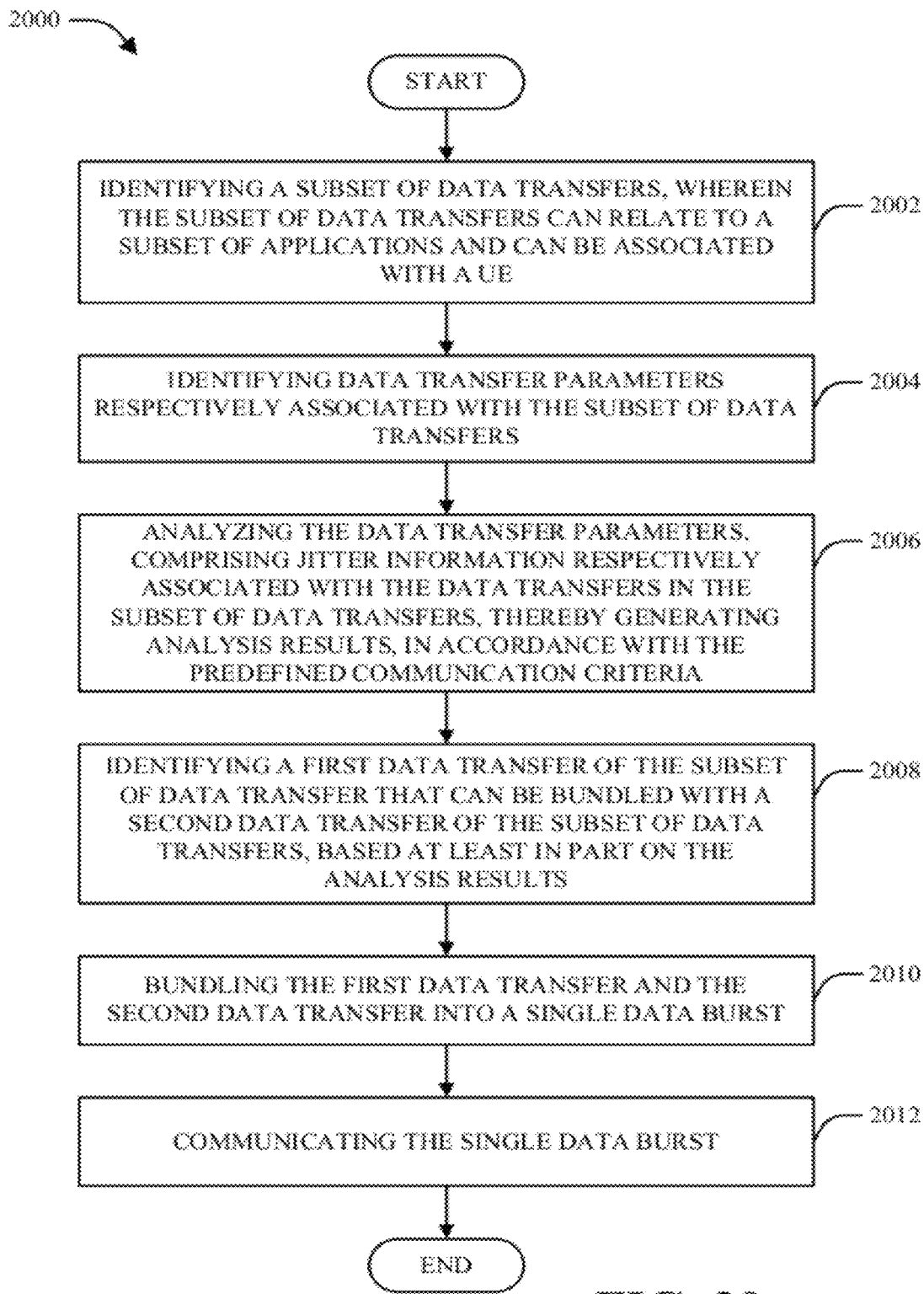
FIG. 20 depicts a flow diagram of an example method for managing scheduling of data transfers associated with a UE in accordance with various aspects and embodiments.
Figure 21:
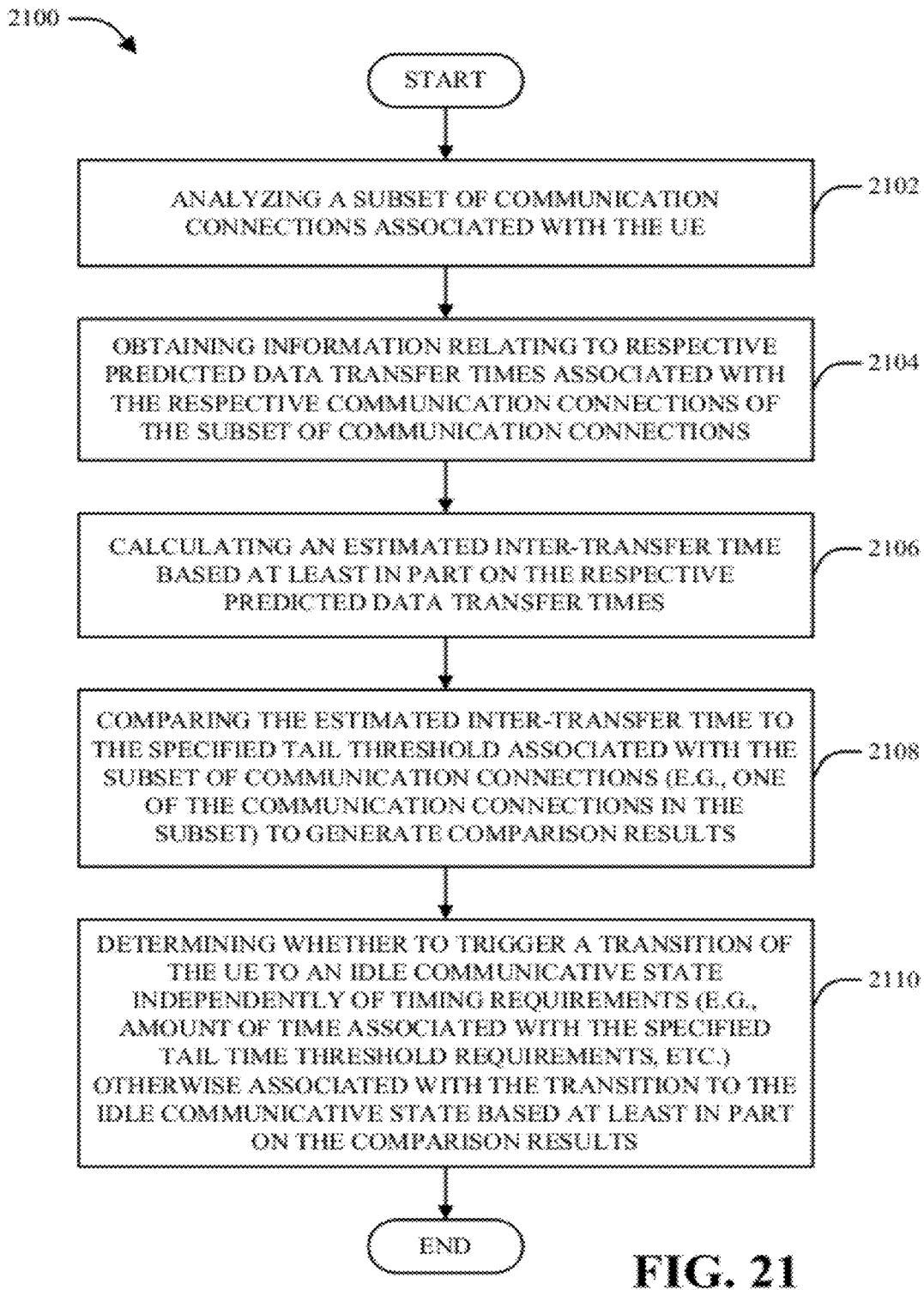
FIG. 21 is a flow diagram of an example method for employing fast dormancy in accordance with a specified protocol (e.g., Tail Optimization Protocol (TOP)) to manage tail time in relation to data communications associated with a UE in accordance with various aspects and embodiments.

Referring now to FIGS. 19-21, methods that can be performed in accordance with various aspects set forth herein are illustrated. While, for purposes of simplicity of explanation, the methods are shown and described as a series of acts, it is to be understood and appreciated that the methods are not limited by the order of acts, as some acts can, in accordance with one or more aspects, occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with one or more aspects.

With reference first to FIG. 19, illustrated is a flow chart of an example method 1900 for managing data transfers associated with a network device (e.g., UE 102), in accordance with various aspects and embodiments. In accordance with various aspects, the method 1900 can be utilized by a UE, employing a UE communication management component, and/or can be utilized by a push notification system, employing a notification communication management component. At 1902, a subset of data transfers that can be bundled together into a single data burst can be identified based at least in part on a subset of data transfer parameters, comprising jitter information, associated with the subset of data transfers. At 1904, the single data burst, comprising the subset of data transfers, can be transmitted. For instance, the UE can transmit or receive the single data burst to or from another communication device. As another example, the push notification system can transmit the single data burst, comprising a subset of push notifications associated with one or more applications, to the UE via the communication network.

Referring next to FIG. 20, depicted is a flow chart of an example a method 2000 for managing scheduling of data transfers associated with a UE in accordance with various aspects and embodiments. In accordance with various aspects, the method 2000 can be utilized by a UE, employing a UE communication management component, and/or can be utilized by a push notification system, employing a notification communication management component. At 2002, a subset of data transfers can be identified, wherein the subset of data transfers can relate to a subset of applications and can be associated with a UE. The subset of data transfers can comprise, for example, a periodic data transfer (e.g., advertisement, "keep alive" data packet, etc.), a one-time data transfer, and/or an aperiodic data transfer (e.g., push notification, audio stream, video stream, etc.).

At 2004, data transfer parameters respectively associated with the subset of data transfers can be identified. At 2006, the data transfer parameters, comprising jitter information respectively associated with the data transfers in the subset of data transfers, can be analyzed thereby generating analysis results, in accordance with the predefined communication criteria.

At 2008, identifying a first data transfer of the subset of data transfers that can be bundled with a second data transfer of the subset of data transfers, based at least in part on the analysis results. For instance, with regard to push notifications, a notification communication management component can determine that a first push notification associated with a UE has a jitter time window of time $t_0$ to time $t_0$+30 seconds based at least in part on the jitter parameter associated with the first push notification, and can receive a second push notification associated with the UE at time $t_1$+15 seconds. The notification communication management component can identify the second push notification as a data transfer that can be included in the same data burst as the first push notification.

At 2010, the first data transfer and the second data transfer can be bundled into a single data burst. The first data transfer and the second data transfer can be scheduled to be communicated as part of the same data burst to facilitate reducing the use of network radio resources, reduce state transition overhead, and reduce power consumption by the UE. At 2012, the single data burst can be communicated. For example, the single data burst can be communicated between the UE and another communication device via the communication network. As another example, the single data burst, comprising the first data transfer (e.g., first push notification associated with a first application) and the second data transfer (e.g., second push notification associated with a second application), can be transmitted from the push notification system to the UE via the communication network.

Turning to FIG. 21, illustrated is a flow chart of an example method 2100 for employing fast dormancy in accordance with a specified protocol (e.g., TOP) to manage tail time in relation to data communications associated with a UE in accordance with various aspects and embodiments. As desired, the method 2100 can be employed, for example, by the UE in relation to communication of one or more data bursts, including the single data burst (e.g., scheduled and communicated in accordance with the method 1900 or method 2000). At 2102, a subset of communication connections associated with the UE can be analyzed. For example, after the single data burst (e.g., from method 1900 or method 2000) has been communicated, the UE can remain in a DCH state as there can be a tail having a specified tail threshold amount of time, which if permitted to continue until it expires, after its expiration, the UE can be transitioned from the DCH state to the IDLE state by the communication network.

At 2104, information relating to respective predicted data transfer times associated with the respective communication connections of the subset of communication connections can be obtained (e.g., via a connection interface component). At 2106, an estimated inter-transfer time can be calculated (e.g., by a connection analysis component) based at least in part on the respective predicted data transfer times obtained at act 1104.

At 2108, the estimated inter-transfer time can be compared to the specified tail threshold associated with the subset of communication connections (e.g., one of the communication connections in the subset) to generate comparison results. At 2110, it can be determined (e.g., by a state management component) whether to trigger a transition of the UE to an idle communicative state (e.g., IDLE state) independently of timing requirements (e.g., amount of time associated with the specified tail time threshold requirements, etc.) otherwise associated with the transition to the idle communicative state based at least in part on the comparison results. For example, if the estimated inter-transfer time is greater than the specified tail threshold (e.g., greater than the specified tail threshold by a specified margin), the tail can be terminated, wherein a request to terminate the tail can be communicated by the UE to the communication network, and, in response, the communication network can terminate the tail and transition the UE from the higher communication state (e.g., DCH) to the IDLE state. As another example, if the estimated inter-transfer time is less than the specified tail threshold (or is not greater than the specified tail threshold by a specified margin), the tail can be maintained, and the UE can remain in the higher communication state (e.g., DCH) until the specified tail threshold expires, after which the communication network can transition the UE from the higher communication state to the IDLE state.

It is to be appreciated and understood that, if there are multiple communication connections associated with multiple applications, the respective estimated inter-transfer times of the respective communication connections can be compared to the specified tail threshold to generate comparison results, and the determination as to whether to trigger a transition of the UE to an idle communicative state (e.g., IDLE state) independently of timing requirements (e.g., amount of time associated with the specified tail time threshold requirements, etc.) otherwise associated with the transition to the idle communicative state can be based at least in part on the comparison results. For instance, the respective estimated inter-transfer time having the lowest amount of time can be compared to the specified tail threshold, and the determination regarding whether to terminate the tail can be based at least in part on the comparison results from that comparison.

Figure 22:
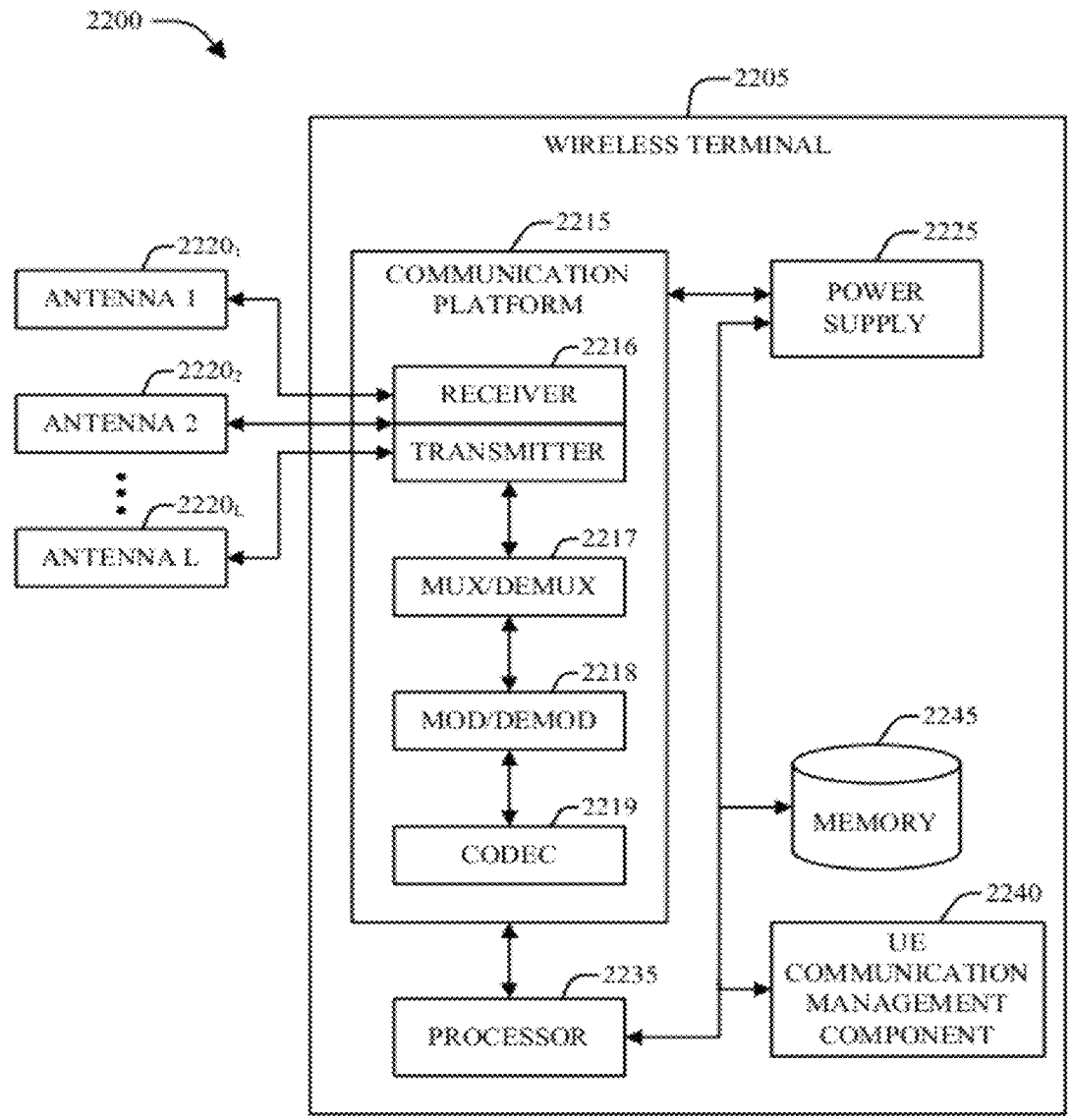
FIG. 22 illustrates an example network device that can be utilized to implement one or more of the various aspects described herein.

In order to provide further context for various aspects of the disclosed subject matter, FIG. 22 illustrates a non-limiting example system 2200 that can implement some or all of the aspects described herein. As FIG. 22 illustrates, system 2200 can include a wireless terminal 2205 (e.g., UE). In an embodiment, wireless terminal 2205 can receive and transmit signal(s) to and/or from wireless devices such as APs, access terminals, wireless ports and routers, or the like, through a set of L antennas 2220. In one example, antennas 2220 can be implemented as part of a communication platform 2215, which in turn can comprise electronic components and associated circuitry and/or other means that provide for processing and manipulation of received signal(s) and signal(s) to be transmitted.

In an aspect, communication platform 2215 can include a receiver/transmitter or transceiver 2216, which can transmit and receive signals and/or perform one or more processing operations on such signals (e.g., conversion from analog to digital upon reception, conversion from digital to analog upon transmission, etc.). In addition, transceiver 2216 can divide a single data stream into multiple, parallel data streams, or perform the reciprocal operation.

In another example, a multiplexer/demultiplexer (mux/demux) unit 2217 can be coupled to transceiver 2216. Mux/demux unit 2217 can, for example, facilitate manipulation of signal in time and frequency space. Additionally or alternatively, mux/demux unit 2217 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 2217 can scramble and spread information according to substantially any code generally known in the art, such as Hadamard-Walsh codes, Baker codes, Kasami codes, polyphase codes, and so on.

In a further example, a modulator/demodulator (mod/demod) unit 2218 implemented within communication platform 2215 can modulate information according to multiple modulation techniques, such as frequency modulation, amplitude modulation (e.g., L-ary quadrature amplitude modulation (L-QAM), etc.), phase-shift keying (PSK), and the like. Further, communication platform 2215 can also include a coder/decoder (codec) module 2219 that facilitates decoding received signal(s) and/or coding signal(s) to convey.

According to another aspect, wireless terminal 2205 can include a processor 2235 configured to confer functionality, at least in part, to substantially any electronic component utilized by wireless terminal 2205. As further shown in system 2200, a power supply 2225 can attach to a power grid and include one or more transformers to achieve a power level at which various components and/or circuitry associated with wireless terminal 2205 can operate. In one example, power supply 2225 can include a rechargeable power mechanism to facilitate continued operation of wireless terminal 2205 in the event that wireless terminal 2205 is disconnected from the power grid, the power grid is not operating, etc.

In still another aspect, the wireless terminal 2205 can include a UE communication management component 2240 that can be associated with (e.g., functionally connected) to the processor 2235, wherein the UE communication management component 2240 can be the same as or similar to, or can comprise the same or similar functionality as, similarly named components, as more fully disclosed herein.

In a further aspect, processor 2235 can be functionally connected to communication platform 2215 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 2235 can be functionally connected, via a data or system bus, to any other components or circuitry not shown in system 2200 to at least partially confer functionality to each of such components.

As additionally illustrated in system 2200, a memory 2245 can be used by wireless terminal 2205 to store data structures, code instructions and program modules, system or device information, code sequences for scrambling, spreading and pilot transmission, location intelligence storage, determined delay offset(s), over-the-air propagation models, and so on. Processor 2235 can be coupled to the memory 2245 in order to store and retrieve information necessary to operate and/or confer functionality to communication platform 2215 and/or any other components of wireless terminal 2205.

Figure 23:
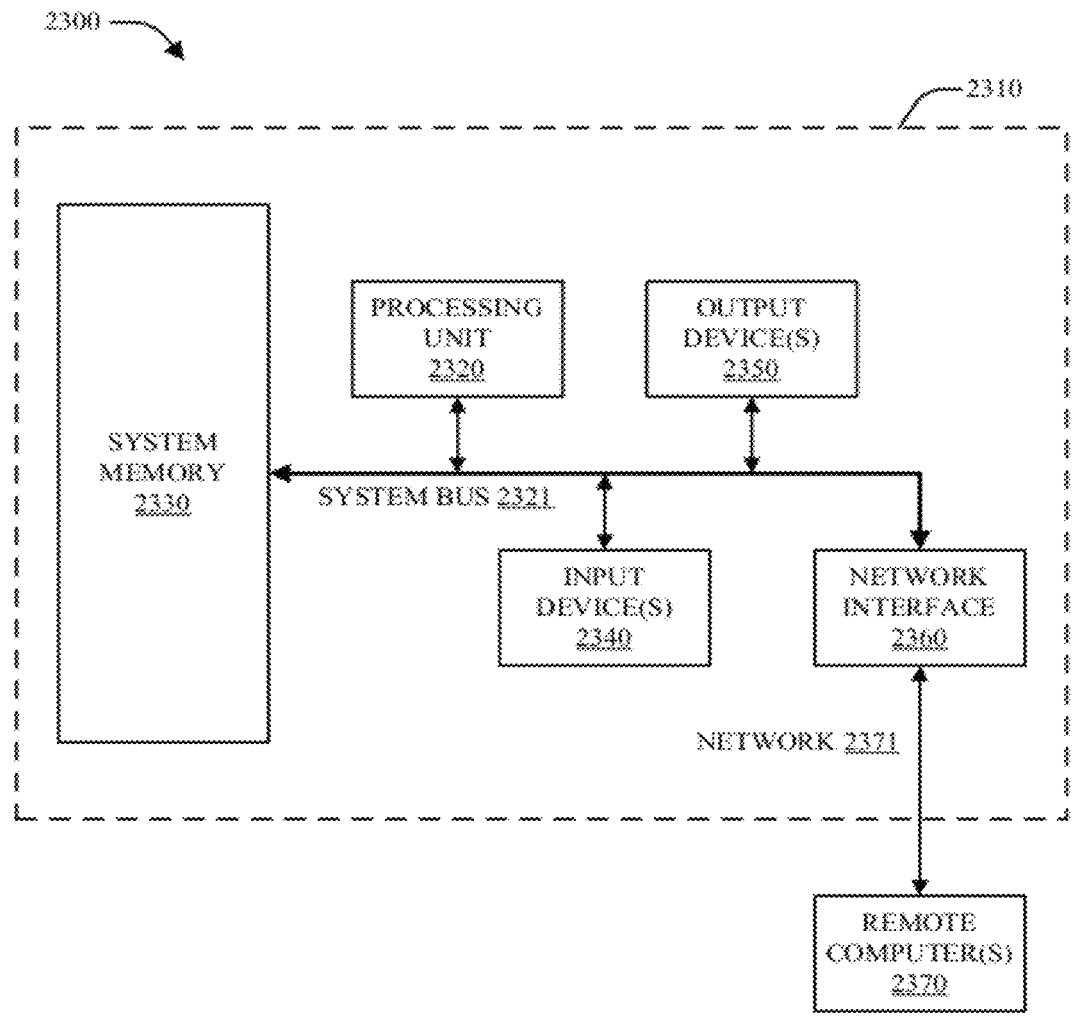
FIG. 23 illustrates an example computing architecture that is operable to execute various aspects described herein.

Turning to FIG. 23, a non-limiting example computing system or operating environment in which various aspects of the disclosed subject matter may be implemented is illustrated. One of ordinary skill in the art can appreciate that handheld, portable and other computing devices and computing objects of all kinds are contemplated for use in connection with the disclosed subject matter, e.g., anywhere that a communications system may be desirably configured. Accordingly, the below general purpose remote computer described below in FIG. 23 is but one example of a computing system in which the disclosed subject matter may be implemented.

Although not required, various aspects of the disclosed subject matter can partly be implemented via an operating system, for use by a developer of services for a device or object, and/or included within application software that operates in connection with the component(s) of the disclosed subject matter. Software may be described in the general context of computer-executable instructions, such as program modules, being executed by one or more computers, such as client workstations, servers or other devices. Those skilled in the art will appreciate that various aspects of the disclosed subject matter may be practiced with other computer system configurations and protocols.

FIG. 23 thus illustrates an example of a suitable computing system environment 2300 in which various aspects of the disclosed subject matter may be implemented, although as made clear above, the computing system environment 2300 is only one example of a suitable computing environment for a media device and is not intended to suggest any limitation as to the scope of use or functionality of the disclosed subject matter. Neither should the computing environment 2300 be interpreted as having any dependency or requirement relating to any one or combination of components illustrated in the example operating environment 2300.

With reference to FIG. 23, an example of a computing environment 2300 for implementing various aspects of the disclosed subject matter includes a general purpose computing device in the form of a computer 2310. Components of computer 2310 can include, but are not limited to, a processing unit 2320, a system memory 2330, and a system bus 2321 that couples various system components including the system memory to the processing unit 2320. The system bus 2321 can be any of several types of bus structures including a memory bus or memory controller, a peripheral bus, and a local bus using any of a variety of bus architectures.

Computer 2310 can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, Electrically Erasable Programmable ROM (EEPROM), flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 2330 can include computer storage media in the form of volatile and/or nonvolatile memory such as read only memory (ROM) and/or random access memory (RAM). A basic input/output system (BIOS), containing the basic routines that help to transfer information between elements within computer 2310, such as during start-up, can be stored in memory 2330. Memory 2330 typically also contains data and/or program modules that are immediately accessible to and/or presently being operated on by processing unit 2320. By way of example, and not limitation, memory 2330 can also include an operating system, application programs, other program modules, and program data.

The computer 2310 can also include other removable/non-removable, volatile/nonvolatile computer storage media. For example, computer 2310 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 2321 through a non-removable memory interface such as an interface, and a magnetic disk drive or optical disk drive is typically connected to the system bus 2321 by a removable memory interface, such as an interface.

A user can enter commands and information into the computer 2310 through input devices such as a keyboard and pointing device, commonly referred to as a mouse, trackball or touch pad. Other input devices can include a microphone, joystick, game pad, satellite dish, scanner, or the like. These and other input devices are often connected to the processing unit 2320 through user input 2340 and associated interface(s) that are coupled to the system bus 2321, but can be connected by other interface and bus structures, such as a parallel port, game port or a universal serial bus (USB). A graphics subsystem can also be connected to the system bus 2321. A monitor or other type of display device is also connected to the system bus 2321 via an interface, such as output interface 2350, which can in turn communicate with video memory. In addition to a monitor, computers can also include other peripheral output devices such as speakers and a printer, which can be connected through output interface 2350.

The computer 2310 can operate in a networked or distributed environment using logical connections to one or more other remote computers, such as remote computer 2370, which can in turn have media capabilities different from device 2310. The remote computer 2370 can be a personal computer, a server, a router, a network PC, a peer device or other common network node, or any other remote media consumption or transmission device, and can include any or all of the elements described above relative to the computer 2310. The logical connections depicted in FIG. 23 include a network 2371, such local area network (LAN) or a wide area network (WAN), but can also include other networks/buses. Such networking environments are commonplace in homes, offices, enterprise-wide computer networks, intranets and the Internet.

When used in a LAN networking environment, the computer 2310 is connected to the LAN 2371 through a network interface or adapter. When used in a WAN networking environment, the computer 2310 typically includes a communications component, such as a modem, or other means for establishing communications over the WAN, such as the Internet. A communications component, such as a modem, which can be internal or external, can be connected to the system bus 2321 via the user input interface of input 2340, or other appropriate mechanism. In a networked environment, program modules depicted relative to the computer 2310, or portions thereof, can be stored in a remote memory storage device. It will be appreciated that the network connections shown and described are exemplary and other means of establishing a communications link between the computers can be used.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

It is to be appreciated and understood that components (e.g., UE, AP, communication network, UE communication management component, notification communication management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
determining, by a system comprising a processor, whether a first data transfer of a set of data transfers and a second data transfer of the set of data transfers are to be bundled to form a data burst in response to determining whether a first jitter time window associated with the first data transfer at least partially overlaps a second jitter time window associated with the second data transfer based on a result of a comparison of first jitter information and second jitter information, wherein the first jitter information defines the first jitter time window as a first period of time during which the first data transfer is allowed to be transmitted and the second jitter information defines the second jitter time window as a second period of time during which the second data transfer is allowed to be transmitted, and wherein the set of data transfers is associated with a mobile device; and
transmitting, by the system, the data burst, comprising the first data transfer and the second data transfer, in response to determining that the first data transfer and the second data transfer are to be bundled to form the data burst.

2. The method of claim 1, further comprising:
identifying, by the system, the set of data transfers, wherein the set of data transfers relates to a set of applications and is associated with the mobile device;
identifying, by the system, data transfer parameters respectively associated with the set of data transfers; and
analyzing, by the system, the data transfer parameters, comprising jitter information respectively associated with the set of data transfers, to generate an analysis result, in accordance with at least one defined communication criterion, wherein the jitter information comprises the first jitter information and the second jitter information.

3. The method of claim 2, further comprising:
determining, by the system, that the first data transfer is to be bundled with the second data transfer to form the data burst, based on the analysis result; and
bundling, by the system, the first data transfer and the second data transfer to form the data burst.

4. The method of claim 2, further comprising:
comparing, by the system, a subset of the jitter information that indicates the first jitter time window associated with the first data transfer and the second jitter time window associated with the second data transfer, wherein the subset of the jitter information comprises the first jitter information and the second jitter information; and
determining, by the system, the first data transfer is to be bundled with the second data transfer to form the data burst in response to determining the first jitter time window associated with the first data transfer at least partially corresponds to the second jitter time window associated with the second data transfer based on the comparing.

5. The method of claim 2, further comprising:
comparing, by the system, a subset of the jitter information that indicates a third jitter time window associated with a third data transfer of the set of data transfers, wherein the subset of the jitter information comprises the second jitter information associated with the second data transfer and third jitter information that defines the third jitter window as a third period of time during which the third data transfer is allowed to be transmitted; and
determining, by the system, the third data transfer is not to be bundled with the second data transfer in response to determining the third jitter time window associated with the third data transfer does not correspond to the second jitter window associated with the second data transfer based on the comparing.

6. The method of claim 1, further comprising:
analyzing, by the system, a subset of communication connections associated with the mobile device;
obtaining, by the system, information relating to respective predicted data transfer times associated with respective communication connections of the subset of communication connections;
calculating, by the system, an estimated inter-transfer time for a communication connection based on the respective predicted data transfer times;
comparing, by the system, the estimated inter-transfer time to a specified tail threshold value associated with the subset of communication connections to generate a comparison result; and
determining, by the system, whether to trigger a transition of the mobile device from a data communication state to an idle communication state independent of the specified tail time threshold value based on the comparison result.

7. The method of claim 6, further comprising:
triggering, by the system, the transition of the mobile device from the data communication state to the idle communication state independent of the specified tail time threshold value in response to determining the estimated inter-transfer time is not less than a combination of the specified tail time threshold value plus a defined time margin.

8. The method of claim 7, further comprising:
generating, by the system, a tail termination signal; and
transmitting, by the system, the tail termination signal to a communication network device to facilitate termination of the tail.

9. The method of claim 6, further comprising:
maintaining, by the system, the mobile device in the data communication state at least until the specified tail time threshold value is reached, when the estimated inter-transfer time is less than a combination of the specified tail time threshold plus a defined time margin; and
transitioning, by the system, the mobile device from the data communication state to the idle communication state independent of the specified tail time threshold value in response to determining the specified tail time threshold value is reached, and in response to determining no other data transfer occurs on the subset of communication connections.

10. The method of claim 1, wherein the set of data transfers comprises a periodic data transfer and an aperiodic transfer.

11. A system, comprising:
a processor; and
a memory that stores executable instructions that, when executed by the processor, facilitate performance of operations, comprising:

determining whether a first data transfer of a set of data transfers and a second data transfer of the set of data transfers are to be grouped to form a data burst in response to determining whether it is determined that a first jitter time period associated with the first data transfer at least partially overlaps a second jitter time period associated with the second data transfer based on a result of comparing first jitter information and second jitter information, wherein the first jitter information defines the first jitter time period as a first period of time during which the first data transfer is permitted to be communicated and the second jitter information defines the second jitter time period as a second period of time during which the second data transfer is permitted to be communicated, and wherein the set of data transfers is associated with a wireless communication device; and scheduling communication of the data burst, comprising the first data transfer and the second data transfer, in response to determining that the first data transfer and the second data transfer are to be grouped to form the data burst.

12. The system of claim 11, wherein the operations further comprise:
communicating the data burst.

13. The system of claim 11, wherein the operations further comprise:
identifying the set of data transfers, wherein the set of data transfers relates to a set of applications and is associated with the wireless communication device, and wherein the set of data transfers comprises the first data transfer and the second data transfer;
identifying data transfer parameters respectively associated with the set of data transfers; and
analyzing the data transfer parameters, comprising jitter information respectively associated with respective data transfers in the set of data transfers, to generate an analysis result, in accordance with at least one defined communication criterion, wherein the jitter information comprises the first jitter information and the second jitter information.

14. The system of claim 13, wherein the operations further comprise:
determining the first data transfer and the second data transfer are to be grouped to form the data burst, based on the analysis result; and
grouping the first data transfer and the second data transfer to form the data burst.

15. The system of claim 13, wherein the operations further comprise:
comparing the first jitter information that indicates the first jitter time period associated with the first data transfer to the second jitter information that indicates the second jitter time period associated with the second data transfer; and
determining that the first jitter time period associated with the first data transfer at least partially overlaps the second jitter time period associated with the second data transfer based on the comparing.

16. The system of claim 13, wherein the operations further comprise:
comparing third jitter information that indicates a third jitter time period associated with a third data transfer of the set of data transfers to the second jitter time period associated with the second data transfer; and
determining the third data transfer is not to be grouped with the second data transfer in the data burst in response to determining the third jitter time period associated with the third data transfer does not overlap the second jitter time period associated with the second data transfer based on the comparing.

17. The system of claim 11, wherein the first data transfer is associated with a first application and the second data transfer is associated with a second application, and the first application is associated with a first application server and the second application is associated with a second application server.

18. The system of claim 11, wherein the data transfer parameters comprise a periodicity parameter, a transfer start time parameter, a call back parameter, and a jitter parameter.

19. The system of claim 18, wherein the operations further comprise:
facilitating a data transfer associated with the wireless communication device via an interface that comprises a data transfer parameter relating to the set of data transfers.

20. The system of claim 11, wherein the operations further comprise:
utilizing fast dormancy, in accordance with a specified protocol, to facilitate managing tail time relating to a data transfer associated with the wireless communication device.

21. The system of claim 11, wherein data transfer parameters relating to the set of data transfers comprise an application data parameter, a call back parameter, and a jitter parameter, wherein the jitter parameter indicates an amount of time that communication of the first data transfer to the wireless communication device is permitted to be delayed.

22. The system of claim 21, wherein the operations further comprise:
facilitating a data transfer associated with the wireless communication device via an interface that comprises a data transfer parameter relating to the set of data transfers, wherein the data transfer is a push notification relating to an application.

23. The system of claim 11, wherein the set of data transfers comprises a periodic data transfer and a non-periodic data transfer.

24. The system of claim 11, wherein the set of data transfers comprises a one-time data transfer and a non-periodic data transfer.

25. A non-transitory computer readable storage medium storing executable instructions that, in response to execution, cause a system comprising a processor to perform operations comprising:
determining whether a first data transfer of a set of data transfers and a second data transfer of the set of data transfers are to be grouped to form a data burst in response to determining whether a first jitter time period associated with the first data transfer at least partially corresponds with a second jitter time period associated with the second data transfer based on a result of an evaluation of first jitter data and second jitter data, wherein the first jitter data defines the first jitter time period as a first period of time during which the first data transfer is permitted to be transmitted and the second jitter data defines the second jitter time period as a second period of time during which the second data transfer is permitted to be transmitted, and wherein the set of data transfers is associated with a mobile device; and
facilitating transmitting the data burst, comprising the first data transfer and the second data transfer, in response to determining that the first data transfer and the second data transfer are to be grouped to form the data burst.

26. The non-transitory computer readable storage medium of claim 25, wherein the operations further comprise:
grouping the first data transfer and the second data transfer to form the data burst, in response to determining that the first data transfer and the second data transfer are to be grouped to form the data burst.

27. The non-transitory computer readable storage medium of claim 25, wherein the operations further comprise:
in connection with the evaluation, comparing the first jitter data that indicates the first jitter time period associated with the first data transfer to the second jitter data that indicates the second jitter time period associated with the second data transfer; and
determining that the first data transfer and the second data transfer are to be grouped to form the data burst in response to determining the first jitter time period associated with the first data transfer at least partially overlaps the second jitter time period associated with the second data transfer based on the comparing.

* * * * *